(12) United States Patent
Hirata et al.

(10) Patent No.: US 8,451,201 B2
(45) Date of Patent: May 28, 2013

(54) LIQUID CRYSTAL DISPLAY DEVICE DRIVE METHOD, LIQUID CRYSTAL DISPLAY DEVICE, AND TELEVISION RECEIVER

(75) Inventors: Mitsuaki Hirata, Mie (JP); Masayuki Katakami, Tsu (JP); Toshihide Tsubata, Tsu (JP); Makoto Shiomi, Tenri (JP); Shigeaki Mizushima, Ikoma (JP)

(73) Assignee: Sharp Kabushiki Kaisha, Osaka (JP)

( * ) Notice: Subject to any disclaimer, the term of this patent is extended or adjusted under 35 U.S.C. 154(b) by 1437 days.

(21) Appl. No.: 11/992,579

(22) PCT Filed: Sep. 28, 2006

(86) PCT No.: PCT/JP2006/319314
§ 371 (c)(1),
(2), (4) Date: Mar. 26, 2008

(87) PCT Pub. No.: WO2007/040139
PCT Pub. Date: Apr. 12, 2007

(65) Prior Publication Data
US 2009/0051707 A1      Feb. 26, 2009

(30) Foreign Application Priority Data
Sep. 30, 2005    (JP) .................... 2005-289431

(51) Int. Cl.
    *G09G 5/02*      (2006.01)
(52) U.S. Cl.
    USPC .............. 345/89; 345/1.1; 345/4; 345/690; 349/153; 349/110; 349/156; 348/731
(58) Field of Classification Search
    USPC .............. 345/690, 1.1, 4, 89; 349/153, 110, 349/156; 348/731
    See application file for complete search history.

(56) References Cited

U.S. PATENT DOCUMENTS

| 5,070,326 A | 12/1991 | Yoshimoto et al. |
| 5,216,414 A | 6/1993 | Fukutani et al. |

(Continued)

FOREIGN PATENT DOCUMENTS

| JP | 63-025629 | 2/1988 |
| JP | 64-049021 | 2/1989 |

(Continued)

OTHER PUBLICATIONS

U.S. Office Action dated Apr. 5, 2011.

(Continued)

*Primary Examiner* — Lun-Yi Lao
*Assistant Examiner* — Shaheda Abdin
(74) *Attorney, Agent, or Firm* — Harness, Dickey & Pierce, P.L.C.

(57) ABSTRACT

The method of driving a liquid crystal display in accordance with one embodiment of the present invention is a method of driving a liquid crystal display whereby a first liquid crystal panels produces a display from a first display signal and the second liquid crystal panel produces a display a second display signal derived from the first display signal, the first and second liquid crystal panels being stacked on top of each other. The luminance of the first liquid crystal panel is extended based on the luminance extension ratio obtained from the gray levels for dots contained in the first display signal and a logical maximum gray level of input image data. The luminance of the second liquid crystal panel which produces a display from the second display signal is lowered by the amount by which luminance is extended on the first liquid crystal panel. A liquid crystal display with high display quality is realized by restraining decrease in saturation which would otherwise become obtrusive when two liquid crystal panels are stacked.

8 Claims, 37 Drawing Sheets

U.S. PATENT DOCUMENTS

| | | | | |
|---|---|---|---|---|
| 5,250,932 | A | 10/1993 | Yoshimoto et al. | |
| 5,303,073 | A | 4/1994 | Shirota et al. | |
| 5,604,511 | A * | 2/1997 | Ohi | 345/98 |
| 6,236,392 | B1 | 5/2001 | Inamori | |
| 6,512,564 | B1 | 1/2003 | Yoshida et al. | |
| 6,661,488 | B1 | 12/2003 | Takeda et al. | |
| 6,724,452 | B1 | 4/2004 | Takeda et al. | |
| 6,906,762 | B1 | 6/2005 | Witehira et al. | |
| 7,034,789 | B2 * | 4/2006 | Takeuchi et al. | 345/90 |
| 7,167,224 | B1 | 1/2007 | Takeda et al. | |
| 7,224,421 | B1 | 5/2007 | Takeda et al. | |
| 7,253,861 | B2 | 8/2007 | Niiyama et al. | |
| 7,304,703 | B1 | 12/2007 | Takeda et al. | |
| 2001/0043295 | A1 | 11/2001 | Chen et al. | |
| 2001/0046008 | A1 | 11/2001 | Ueda et al. | |
| 2002/0030651 | A1 | 3/2002 | Yamamoto | |
| 2003/0086044 | A1 | 5/2003 | Inoue et al. | |
| 2003/0128299 | A1 | 7/2003 | Coleman et al. | |
| 2003/0198401 | A1 | 10/2003 | Shimazaki et al. | |
| 2004/0066388 | A1 | 4/2004 | Leather et al. | |
| 2004/0119924 | A1 | 6/2004 | Takeda et al. | |
| 2004/0183972 | A1 | 9/2004 | Bell | |
| 2004/0239866 | A1 | 12/2004 | Sasabayashi et al. | |
| 2005/0226526 | A1 | 10/2005 | Mitsunaga | |
| 2006/0066788 | A1 | 3/2006 | Utsumi et al. | |
| 2006/0125745 | A1 | 6/2006 | Evanicky | |
| 2006/0176260 | A1 | 8/2006 | Koyama | |
| 2006/0290594 | A1 | 12/2006 | Engel et al. | |
| 2007/0063925 | A1 * | 3/2007 | Yoshihara et al. | 345/4 |
| 2007/0064187 | A1 | 3/2007 | Takeda et al. | |
| 2008/0079755 | A1 | 4/2008 | Shiomi | |
| 2008/0165314 | A1 | 7/2008 | Takeda et al. | |
| 2008/0303995 | A1 | 12/2008 | Shimodaira et al. | |
| 2008/0303997 | A1 | 12/2008 | Takeda et al. | |
| 2009/0046212 | A1 | 2/2009 | Tsubata et al. | |
| 2009/0051707 | A1 | 2/2009 | Hirata et al. | |
| 2009/0109351 | A1 | 4/2009 | Shiomi | |
| 2009/0147186 | A1 | 6/2009 | Nakai et al. | |

FOREIGN PATENT DOCUMENTS

| | | |
|---|---|---|
| JP | 1-277215 | 11/1989 |
| JP | 1-309024 | 12/1989 |
| JP | 02-000023 | 1/1990 |
| JP | 4-97134 | 3/1992 |
| JP | 05-088197 | 4/1993 |
| JP | 05-257124 | 10/1993 |
| JP | 06-043516 | 2/1994 |
| JP | 06-110076 | 4/1994 |
| JP | 06-289833 | 10/1994 |
| JP | 6-306266 | 11/1994 |
| JP | 11-167106 | 6/1999 |
| JP | 2001-188120 | 7/2001 |
| JP | 2002-504764 | 2/2002 |
| JP | 2002-090536 | 3/2002 |
| JP | 2002-528743 | 9/2002 |
| JP | 2003-020255 | 1/2003 |
| JP | 2003-040649 | 2/2003 |
| JP | 2003-149730 | 5/2003 |
| JP | 2003-195343 | 7/2003 |
| JP | 2004-301878 | 10/2004 |
| JP | 2004-309553 | 11/2004 |
| JP | 2005-031552 | 2/2005 |
| JP | 2005-208522 | 8/2005 |
| JP | 2005-533275 | 11/2005 |
| WO | WO 2006/068224 | 6/2006 |

OTHER PUBLICATIONS

"Kankaku-juyo (Reception; Sensation)", search date: Sep. 15, 2006; URL< http:www.tmd.ac.jp/med/phy1/ptext/receptor.html>.

"Kankaku no Sokutei (Measurement of Sensation)", search date: Sep. 15, 2006; URL <http://www.oak.dti.ne.jp/~xkana/pyscho/intro/intro_03/>.

"Shinri-butsurigaku towananika (What is psychophysics)", search date: Sep. 15, 2006; URL <http://uchikawa-www.ip.titech.ac.jp/~masuda/J/principia/whatsVPP/whatsVPP.html>.

Restriction Requirement dated Jul. 12, 2011 in U.S. Appl. No. 12/449,992.

U.S. Office Action dated Oct. 17, 2011 for U.S. Appl. No. 12/311,499.

Notice of Allowance for U.S. Appl. No. 11/990,072 dated Oct. 21, 2009.

Notice of Allowance dated Aug. 3, 2012 for copending U.S. Appl. No. 12/311,499.

Office Action dated May 8, 2012 in U.S. Appl. No. 12/311,499.

* cited by examiner

Viewing Angle vs. Parallel Transmittance
[Azimuth = 45° (550 nm)]

Viewing Angle vs. Cross Transmittance [Azimuth = 45° (550 nm)]

Viewing Angle vs. Contrast Transmittance [Azimuth = 45° (550 nm)]

Nicol Angle vs. Cross Transmittance (Ideal Polarizer)

FIG. 17

| 60 | 100 | 100 | 100 | 100 |
|---|---|---|---|---|
| 40 | 100 | 100 | 100 | 100 |
| 20 | 20 | 20 | 20 | 20 |
| 40 | 40 | 50 | 50 | 40 |
| 40 | 40 | 50 | 50 | 40 |

FIG. 18

|  |  |  |  |  |
|---|---|---|---|---|
|  | 100 | 100 | 100 |  |
|  | 100 | 100 | 100 |  |
|  | 50 | 50 | 50 |  |
|  |  |  |  |  |

FIG. 19

| 100 | 100 | 100 | 100 | 100 |
|---|---|---|---|---|
| 100 | 100 | 100 | 100 | 100 |
| 100 | 100 | 100 | 100 | 100 |
| 50 | 50 | 50 | 50 | 50 |
| 50 | 50 | 50 | 50 | 50 |

FIG. 20

|  |  |  |  |  |
|---|---|---|---|---|
|  |  | 100 | 100 | 100 |  
|  |  | 83 | 83 | 83 |
|  |  | 67 | 67 | 67 |
|  |  |  |  |  |

FIG. 21

| 100 | 100 | 100 | 100 | 100 |
|---|---|---|---|---|
| 100 | 100 | 100 | 100 | 100 |
| 83 | 83 | 83 | 83 | 83 |
| 67 | 67 | 67 | 67 | 67 |
| 67 | 67 | 67 | 67 | 67 |

Gray Level vs. Luminance Characteristics (Relative Values)

Gray Level vs. Luminance Characteristics (Relative Values)

FIG. 30 (a)
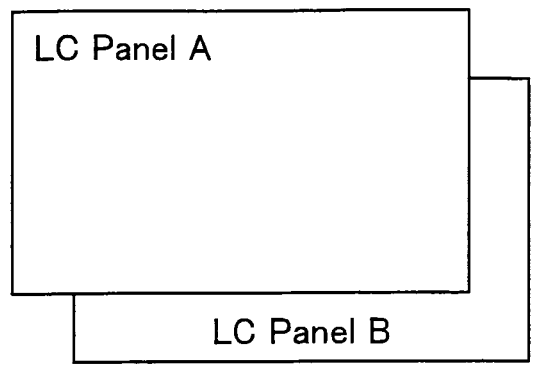
FIG. 30 (b)
LC Panel A 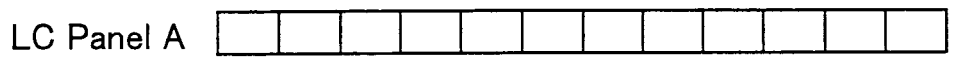
LC Panel B 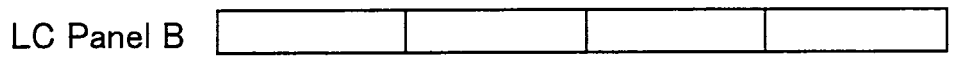
FIG. 30 (c)
LC Panel A 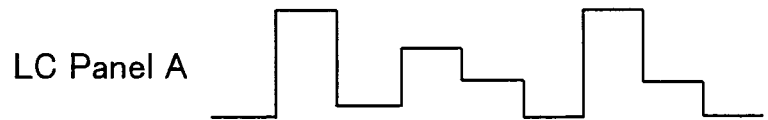
LC Panel B 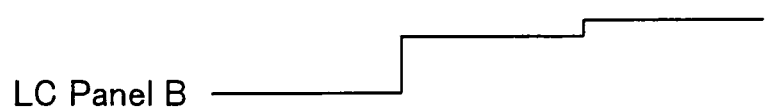

FIG. 32 (a)
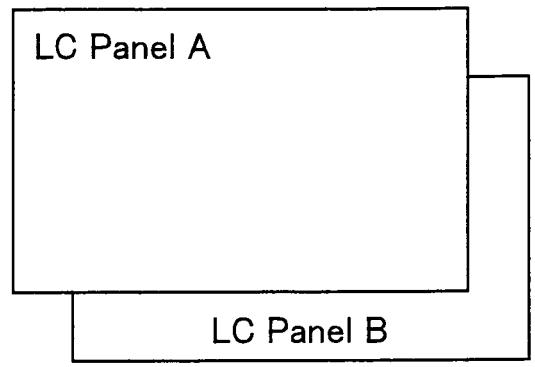
FIG. 32 (b)
LC Panel A 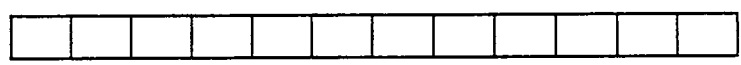
LC Panel B 
FIG. 32 (c)
LC Panel A 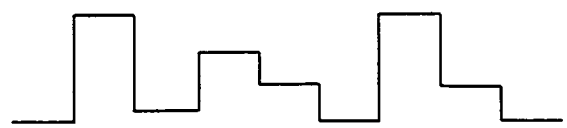
LC Panel B 

$V=0$ $V \neq 0$

Gray Level vs. Luminance Characteristics (Relative Values)

Gray Level vs. Luminance Characteristics (Relative Values)

LIQUID CRYSTAL DISPLAY DEVICE DRIVE METHOD, LIQUID CRYSTAL DISPLAY DEVICE, AND TELEVISION RECEIVER

TECHNICAL FIELD

The present invention relates to liquid crystal displays with improved contrast and television receivers incorporating the devices.

BACKGROUND ART

There exist various techniques for improving the contrast of a liquid crystal display. The following is examples disclosed in patent documents 1 to 7.

Patent document 1 discloses a technique of optimizing the relative amount and surface area ratio of the yellow component of pigment in a color filter to improve the contrast ratio. The technique successfully addresses the problem of poor contrast ratio of a liquid crystal display caused by pigment molecules in the color filter scattering and depolarizing polarized light. Patent document 1 states that the contrast ratio of a liquid crystal display improves from 280 to 420.

Patent document 2 discloses a technique of increasing the transmittance and polarizing capability of a polarizer to improve the contrast ratio. Patent document 2 states that the contrast ratio of a liquid crystal display improves from 200 to 250.

Patent documents 3 and 4 disclose a technique for improving contrast in guest-host mode which exploits absorption of light by a dichroic pigment.

Patent document 3 describes a method of improving contrast by way of a structure in which two guest-host liquid crystal cells are provided with a quarter-wave plate interposed between the two cells. Patent document 3 discloses omission of polarizers.

Patent document 4 discloses a liquid crystal display element in which a dichroic pigment is mixed with a liquid crystal used in dispersive liquid crystal mode. Patent document 4 states a contrast ratio of 101.

The techniques disclosed in patent documents 3 and 4 show relatively low contrast when compared to the other schemes. To further improve the contrast, various methods may be available: the light absorption by the dichroic pigment may be improved, the pigment content increased, or the thickness of the guest-host liquid crystal cell(s) increased. All these methods however lead to new problems, such as technical problems, poor reliability, and poor response properties.

Patent documents 5 and 6 disclose a method of improving contrast by an optical compensation scheme. The documents describe a liquid crystal panel and a liquid crystal display panel provided between a pair of polarizers. The liquid crystal panel performs optical compensation.

Patent document 5 improves a retardation contrast ratio from 14 to 35 in STN mode using a display cell and a liquid crystal cell which is provided to perform optical compensation.

Patent document 6 improves a contrast ratio from 8 to 100 by disposing a liquid crystal cell for optical compensation. The cell compensates for wavelength dependence of a liquid crystal display cell in, for example, TN mode when the display cell is displaying black.

Although the techniques disclosed in the patent documents achieve a 1.2- to 10-fold or even greater increase in contrast ratio, the absolute value of contrast ratio is no higher than about 35 to 420.

Another contrast enhancing technique is disclosed in patent document 7, for example. The document teaches a complex liquid crystal display in which two liquid crystal panels are stacked in such a manner that polarizers form crossed Nicols. Patent document 7 states that the stacking of two panels increases the contrast ratio to three to four digit values whilst the panel, if used alone, shows a contrast ratio of 100.

Patent document 1: Japanese Unexamined Patent Publication (Tokukai) 2001-188120 (published Jul. 10, 2001)
Patent document 2: Japanese Unexamined Patent Publication (Tokukai) 2002-90536 (published Mar. 27, 2002)
Patent document 3: Japanese Unexamined Patent Publication 63-25629/1988 (Tokukaisho 63-25629; published Feb. 3, 1988)
Patent document 4: Japanese Unexamined Patent Publication 5-2194/1993 (Tokukaihei 5-2194; published Jan. 8, 1993)
Patent document 5: Japanese Unexamined Patent Publication 64-49021/1989 (Tokukaisho 64-49021; published Feb. 23, 1989)
Patent document 6: Japanese Unexamined Patent Publication 2-23/1990 (Tokukaihei 2-23; published Jan. 5, 1990)
Patent document 7: Japanese Unexamined Patent Publication 5-88197/1993 (Tokukaihei 5-88197; published Apr. 9, 1993)

DISCLOSURE OF INVENTION

Patent document 7 is aimed at achieving increased gray levels by stacking two liquid crystal panels without increasing the gray levels of the individual liquid crystal panels; no concrete measures are taken to address poor saturation which could seriously degrade display quality.

The present invention, conceived in view of these problems, has an objective of restraining decreases in saturation which occur markedly when two liquid crystal panels are stacked, so as to realize a liquid crystal display with high display quality.

A method of driving a liquid crystal display in accordance with the present invention is, to solve the problems, is characterized in that it is a method of driving a liquid crystal display including two or more stacked liquid crystal panels and polarized light absorbing layers provided to form crossed Nicols across the liquid crystal panels, the liquid crystal panels outputting individual image data according to a video source, the method including the step of implementing luminance extension on a first liquid crystal panel, the first liquid crystal panel being one of the stacked liquid crystal panels which is disposed closer to a front of the display than are the other liquid crystal panels.

According to the arrangement, adjacent liquid crystal panels have polarized light absorbing layers provided to form crossed Nicols. Therefore, in the front direction, light leaks along the transmission axis of the polarized light absorbing layer, but the leak is blocked off by the absorption axis of the next polarized light absorbing layer. At oblique angles, if the Nicol angle, or the angle at which the polarization axes of the adjacent polarized light absorbing layers intersect, deviates somewhat from an original design, no increase in light intensity due to light leakage occurs. Black is less likely to lose its depth with an increase in the Nicol angle at oblique viewing angles.

From the foregoing, when two or more liquid crystal panels are stacked, there are provided at least three polarized light absorbing layers. The three polarized light absorbing layers disposed to form crossed Nicols allow for a greatly improved shutter performance both in the front and oblique directions. That in turn greatly improves contrast.

Besides, the first liquid crystal panel is subjected to luminance extension, and the second liquid crystal panel has lower luminance than the first liquid crystal panel, the first liquid crystal panel being one of the stacked liquid crystal panels which is disposed closer to a front of the display than are the other liquid crystal panels.

For example, the luminance of the first liquid crystal panel is extended based on the luminance extension ratio obtained from the gray levels for dots contained in the first display signal and a logical maximum gray level of input image data, and the luminance of the second liquid crystal panel which produces a display from the second display signal is lowered by the amount by which luminance is extended on the first liquid crystal panel. By so doing, the second liquid crystal panel has lower luminance than the first liquid crystal panel. Accordingly, when the two liquid crystal panels are stacked, the original luminance value is retained, and the chromaticity of each dot is preserved. Hence, saturation does not decrease. Besides, since the luminance of the second liquid crystal panel is reduced, the combined luminance changes smoothly; image displacement between the two liquid crystal panels becomes difficult to recognize visually when the panels are viewed from oblique angles.

The following explains more specific, preferable processes.

The first liquid crystal panel is a color liquid crystal panel, and at least one of the other liquid crystal panels is a black and white liquid crystal panel. The black and white liquid crystal panel is fed with a display signal subjected to smoothing whereby a gray level corresponding to one of dot signals for a pixel in the video source which gives a maximum gray level is obtained and the gray level obtained is not less than an original level. The color liquid crystal panel is fed with a display signal obtained by subjecting gray levels derived from an original signal from the video source to luminance extension correspondingly to an amount by which a gray level derived from the display signal for the black and white liquid crystal panel is lower than a reproducible maximum gray level.

The gray levels of the pixel fed to the black and white liquid crystal panel may be subjected to smoothing to such an extent that the gray levels do not exceed a maximum gray level for each pixel.

The smoothing may include obtaining a maximum gray level in an N×M pixel region, substituting the obtained gray level for a gray level of a central pixel of M×N dots, and subjecting the gray level of the central pixel to a smoothing filter.

The smoothing may be followed by a γ-correction of the gray levels of the dots obtained after smoothing.

If a gray level derived from dot data fed to the color liquid crystal panel is 0, and gray levels derived from dot data near a dot corresponding to the dot data are less than or equal to a threshold, gray levels derived from dot data for dots of the black and white liquid crystal panel which are positioned at corresponding sites may set to 0.

Another method of driving a liquid crystal display in accordance with the present invention is, to solve the problems, characterized in that it is a method of driving a liquid crystal display including two or more stacked liquid crystal panels and polarized light absorbing layers provided to form crossed Nicols across the liquid crystal panels, the liquid crystal panels outputting individual image data according to a video source, wherein if a γ value of an image data output of the liquid crystal display, $\gamma_{out}$, equals G(x), where x is a given gray level, $\gamma_1$ for an image data output of a first liquid crystal panel equals $G_1(x)$, where the first liquid crystal panel is one of the stacked liquid crystal panels which is disposed closer to a front of the display than the other liquid crystal panels, and $\gamma_2$ for image data outputs of the other liquid crystal panels equals $G_2(x)$, then $\gamma_{out}$=G(x) at least one gray level X satisfies:

$$G(x)=G_1(X)+G_2(X) \text{ and}$$

$$G_1(X) > G_2(X).$$

According to the arrangement, adjacent liquid crystal panels have polarized light absorbing layers provided to form crossed Nicols. Therefore, in the front direction, light leaks along the transmission axis of the polarized light absorbing layer, but the leak is blocked off by the absorption axis of the next polarized light absorbing layer. At oblique angles, if the Nicol angle, or the angle at which the polarization axes of the adjacent polarized light absorbing layers intersect, deviates somewhat from an original design, no increase in light intensity due to light leakage occurs. Black is less likely to lose its depth with an increase in the Nicol angle at oblique viewing angles.

From the foregoing, when two or more liquid crystal panels are stacked, there are provided at least three polarized light absorbing layers. The three polarized light absorbing layers disposed to form crossed Nicols allow for a greatly improved shutter performance both in the front and oblique directions. That greatly improves contrast.

Besides, if a γ value of an image data output of the liquid crystal display, $\gamma_{out}$, equals G(x), where x is a given gray level, $\gamma_1$, for an image data output of a first liquid crystal panel equals $G_1(x)$, and $\gamma_2$ for image data outputs of the other liquid crystal panels equals $G_2(x)$, then $\gamma_{out}$=G(x) at least one gray level X satisfies:

$$G(x)=G_1(X)+G_2(X) \text{ and}$$

$$G_1(X) > G_2(X).$$

Therefore, saturation reduction is restrained, and a good display is produced.

The first panel may be a color panel, and at least one of the other the second panels a black and white panel.

The following explains more specific, preferable processes.

A gray level for a dot of the black and white liquid crystal panel is set to a gray level which corresponds to a signal representing a maximum gray level derived from dot signals for a pixel in the video source.

The black and white liquid crystal panel may output image data having been subjected to smoothing.

$G_1(X_2)$ may be less than $G_2(X_2)$ near a black gray level $X_2$.

A value of $\gamma_1$ for an image data output of the first panel may be $G_1(x) > 0$ (not equal to 0) at all gray levels.

Preferably, $G_1(X) \geq 1.8$ at a gray level X.

The image data output of the first panel and the image data output of the second panel may have different spatial frequencies.

Interference between the liquid crystal panels is prevented, and saturation reduction is improved, by rendering the spatial frequencies of the first and second display signals different from each other in this manner.

Applying the method to a liquid crystal display enables reproduction of display images with high display quality free from saturation reduction.

A liquid crystal display in accordance with the present invention, to solve the problems, is characterized in that it is a method of driving a liquid crystal display including two or more stacked liquid crystal panels and polarized light absorbing layers provided to form crossed Nicols across the liquid crystal panels, the liquid crystal panels outputting individual image data according to a video source, wherein a first liquid crystal panel is a liquid crystal panel of normally black mode, the first liquid crystal panel being one of the stacked liquid crystal panels which is disposed closer to a front of the display than are the other liquid crystal panels.

The normally black mode may be vertical alignment mode.
The normally black mode may be IPS mode.
The normally black mode may be FSS mode.

Each liquid crystal panel used in the liquid crystal display in accordance with the present invention is characterized in that it includes: a vertical alignment liquid crystal layer; a first substrate and a second substrate facing each other across the liquid crystal layer; a first electrode provided on a side of the first substrate facing the liquid crystal layer and a second electrode provided on a side of the second substrate facing the liquid crystal layer; and at least one alignment film provided to contact the liquid crystal layer, wherein: dot regions are each divided into a first, a second, a third, and a fourth liquid crystal domain, liquid crystal molecules in the liquid crystal layer near a center with respect to a layer plane and a thickness direction exhibiting a tilt direction parallel to a predetermined, first direction in the first liquid crystal domain, a predetermined, second direction in the second liquid crystal domain, a predetermined, third direction in the third liquid crystal domain, and a predetermined, fourth direction in the fourth liquid crystal domain when a voltage is applied across the first and second electrodes; a difference between any given pair of the first, second, third, and fourth directions is substantially equal to an integral multiple of 90°; and the first, second, third, and fourth liquid crystal domains are adjacent to other liquid crystal domains and are arranged in a 2×2 matrix.

According to the arrangement, alignment controlling force for the liquid crystal, and hence response speed, are improved when compared to the provision of alignment controlling projections and electrode openings (slits).

The liquid crystal display, as well as liquid crystal displays to which is applied the method of driving a liquid crystal display in accordance with the present invention, may be used as a display in a television receiver containing: a tuner section for receiving television broadcast; and a display for displaying the television broadcast received by the tuner section.

BRIEF DESCRIPTION OF DRAWINGS

FIG. 17 is a diagram depicting a drive signal processing algorithm for a liquid crystal display of the present invention.

FIG. 18 is a diagram depicting a drive signal processing algorithm for a liquid crystal display of the present invention.

FIG. 19 is a diagram depicting a drive signal processing algorithm for a liquid crystal display of the present invention.

FIG. 20 is a diagram depicting a drive signal processing algorithm for a liquid crystal display of the present invention.

FIG. 21 is a diagram depicting a drive signal processing algorithm for a liquid crystal display of the present invention.

FIG. 30(a) is an illustration of an anti-moire scheme.
FIG. 30(b) is an illustration of an anti-moire scheme.
FIG. 30(c) is an illustration of an anti-moire scheme.

FIG. 32(a) is an illustration of an anti-moire scheme.
FIG. 32(b) is an illustration of an anti-moire scheme.
FIG. 32(c) is an illustration of an anti-moire scheme.

BEST MODE FOR CARRYING OUT INVENTION

Figure 8:
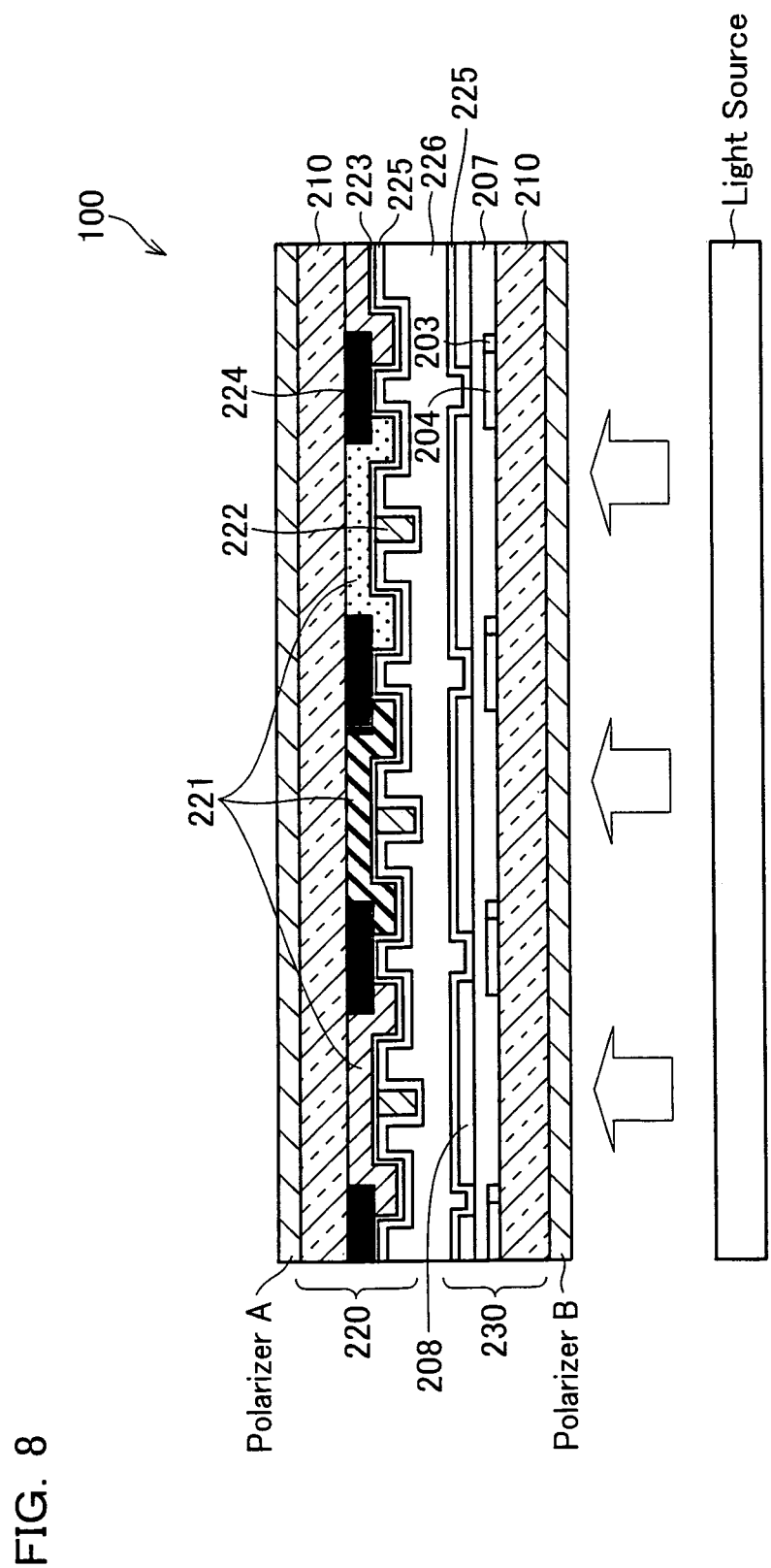
FIG. 8 is a schematic cross-sectional view of a liquid crystal display with a single liquid crystal panel.

Referring to FIG. 8, a typical liquid crystal display contains a liquid crystal panel and polarizers A, B attached to the panel. The panel contains a color filter substrate and a driver substrate. The description here will focus on the MVA (multidomain vertical alignment) liquid crystal display.

Figure 9:
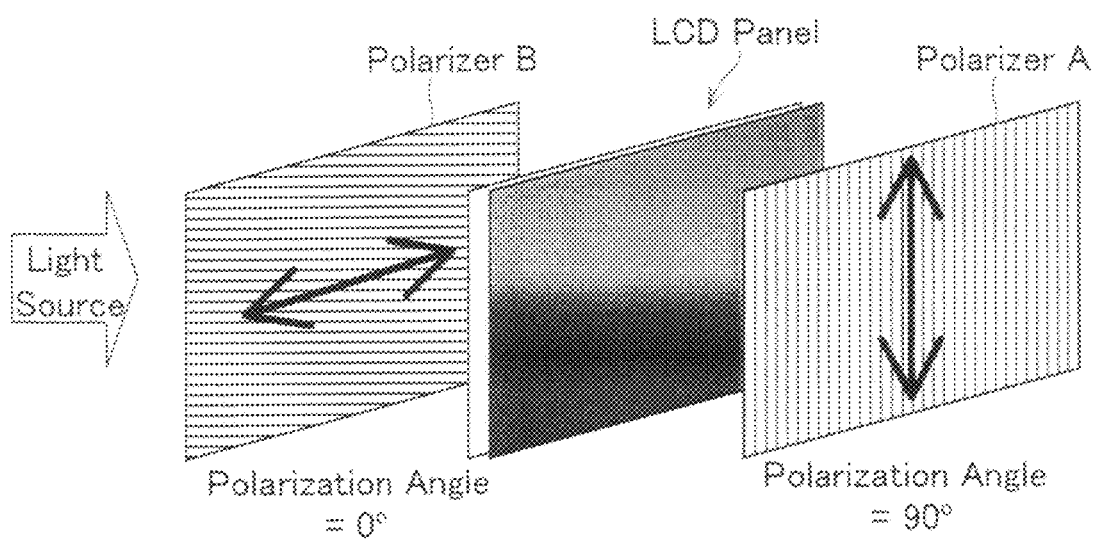
FIG. 9 illustrates the positional relationship of polarizers and panels in the liquid crystal display shown in FIG. 8.

The polarizers A, B, as shown in FIG. 9, are positioned so that their polarization axes are orthogonal to each other. The azimuth of the direction in which the liquid crystal aligns when a threshold voltage is applied to pixel electrodes 208 (FIG. 8) is set to 45° with respect to the polarization axes of the polarizers A, B, Under these conditions, the liquid crystal layer in the liquid crystal panel rotates the axis of incident light which has been polarized by the polarizer A; the light thus comes out of the polarizer B. When the voltage applied to the pixel electrodes is less than or equal to the threshold voltage, the liquid crystal aligns vertical to the substrate. The polarization angle of the incident light does not change, producing a black display. In MVA mode, the liquid crystal under applied voltage aligns in four directions (multidomain) to deliver a large viewing angle.

Vertical alignment refers to a state in which liquid crystal molecules align in such a manner that their axes (axis orientation) point at about 85° or greater to the surface of a vertical alignment film.

Contrast improvement has a limit with the double polarizer structure shown in FIG. 9. The inventors of the present invention have found that three polarizers, disposed to form crossed Nicols, used in combination with two liquid crystal display panels provides an improved shutter performance both in the front and oblique directions.

The following will discuss a contrast improvement mechanism.
Specifically, the inventors have made the following findings.
Front Direction Light leaked in the direction of the transmission axis of crossed Nicols due to depolarization (scattering of CF, for example) in the panel. In the triple polarizer structure, the third polarizer is positioned so that its absorption axis matches with the light leaking in the direction of the transmission axis of the second polarizer. The leakage is thus eliminated.

(2) Oblique Directions

Changes in leakage become less sensitive to an increasing Nicol angle φ of a polarizer, that is, black is less likely to lose its depth with an increasing Nicol angle φ at oblique viewing angles.

From these findings, the inventors have confirmed that the triple polarizer structure greatly improves the contrast of the liquid crystal display. The following will discuss a contrast improvement mechanism in reference to FIGS. 10(a) to 10(c), FIGS. 11(a) to 11(d), FIGS. 12(a) to 12(c), FIG. 13(a), FIG. 13(b), FIGS. 14(a) to 14(c), FIG. 15(a), FIG. 15(b), FIG. 16(a), FIG. 16(b), and Table 1. A double polarizer structure will be referred to as structure I, and a triple polarizer structure as structure II. The contrast improvements in oblique directions are attributable essentially to polarizer structure. The modeling here is based only on polarizers, involving no liquid crystal panel.

Figure 10:
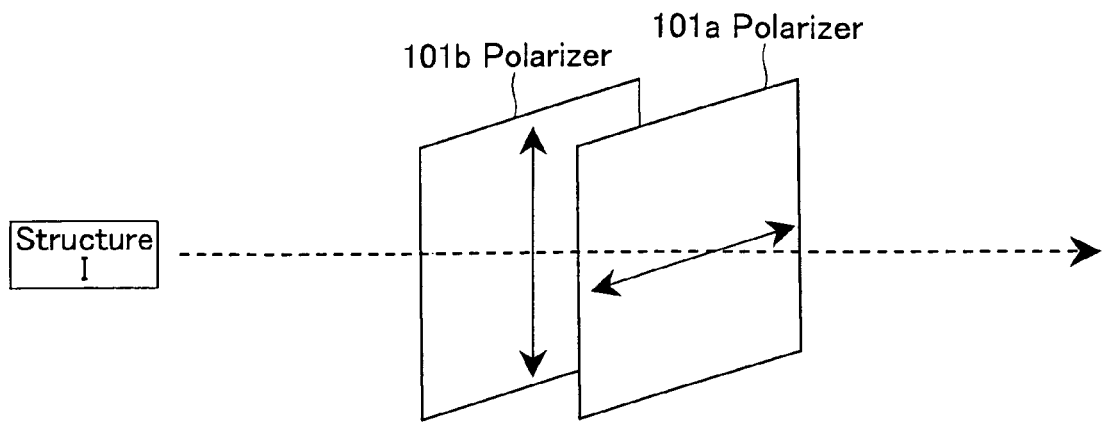
FIG. 10(a) illustrates a contrast improvement mechanism.
FIG. 10(b) illustrates a contrast improvement mechanism.
FIG. 10(c) illustrates a contrast improvement mechanism.
Figure 10:
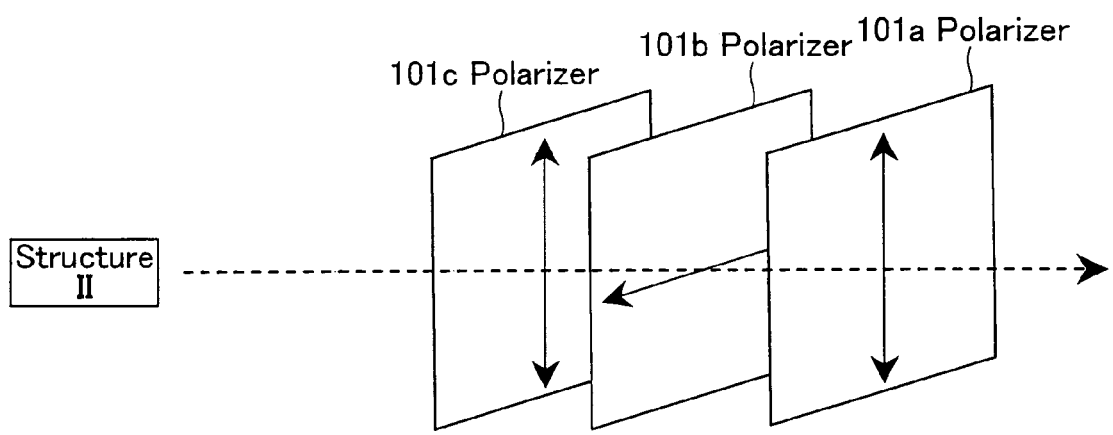
Figure 10:
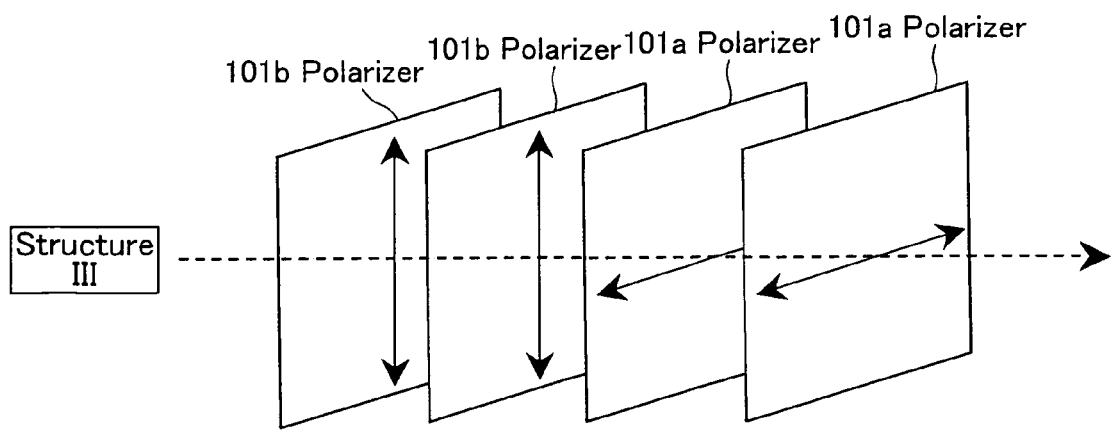

FIG. 10(a) depicts structure I with a single liquid crystal display panel, an example of two polarizers 101a, 101b disposed to form crossed Nicols. FIG. 10(b) depicts structure II, an example of three polarizers 101a, 101b, 101c disposed to form crossed Nicols. Since structure II includes two liquid crystal display panels, there are two pairs of polarizers which are disposed to form crossed Nicols. FIG. 10(c) depicts an example of a polarizer 101a and a polarizer 101b disposed face to face to form crossed Nicols; an additional polarizer of the same polarization direction is disposed outside each of the polarizers. Although FIG. 10(c) shows four polarizers, those polarizers which form crossed Nicols are only two of them that sandwich a liquid crystal display panel.

The transmittance at which the liquid crystal display panel produces a black display is modeled by treating that transmittance as the transmittance when polarizers are disposed to form crossed Nicols without a liquid crystal display panel, that is, a cross transmittance. The resultant transmittance model is referred to as a black display. Meanwhile, the transmittance at which the liquid crystal display panel produces a white display is modeled by treating that transmittance as the transmittance when polarizers are disposed to form parallel Nicols without a liquid crystal display panel, that is, a parallel transmittance. The resultant transmittance model is referred to as a white display. FIGS. 11(a) to 11(d) are graphs representing examples of the wavelength vs. transmittance relationship of a transmission spectrum when the polarizer is viewed from the front and at oblique angles. The modeled transmittances are ideal values of transmittances in white and black displays for polarizers disposed to form crossed Nicols which sandwiches the liquid crystal display panel.

Figure 11:
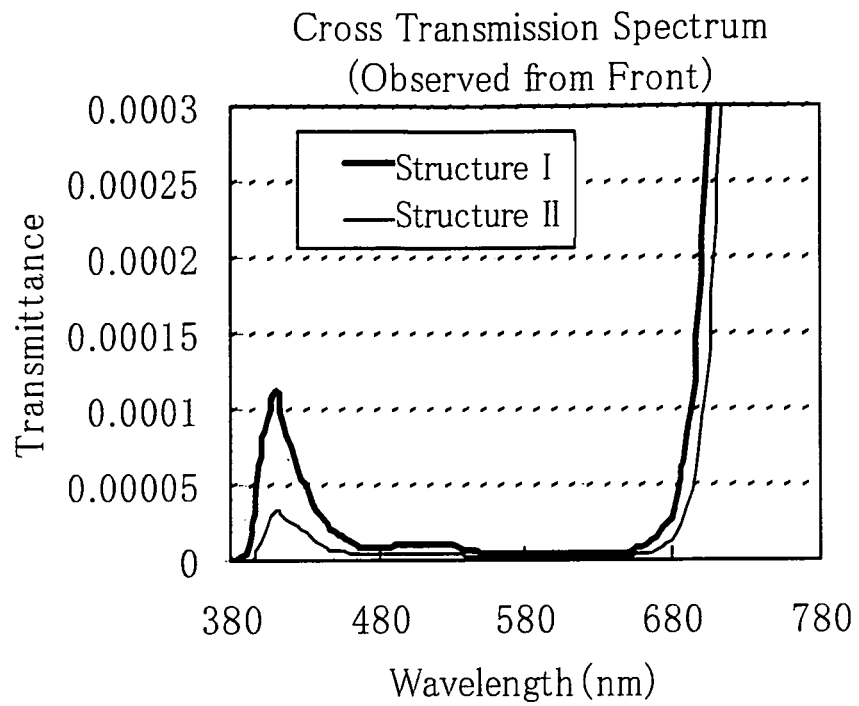
FIG. 11(a) illustrates a contrast improvement mechanism.
FIG. 11(b) illustrates a contrast improvement mechanism.
FIG. 11(c) illustrates a contrast improvement mechanism.
FIG. 11(d) illustrates a contrast improvement mechanism.
Figure 11:
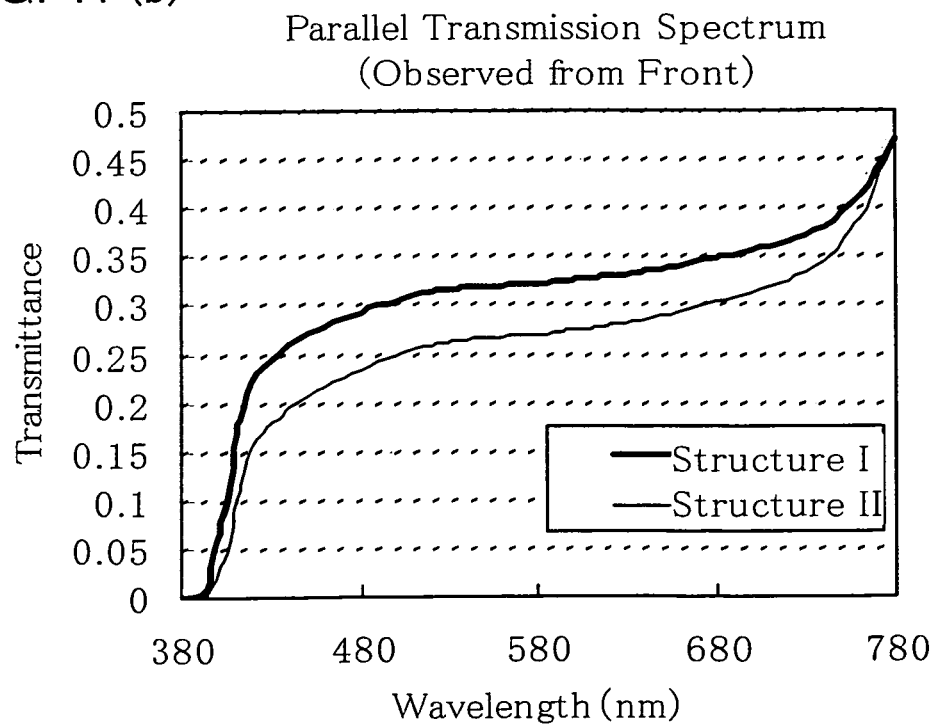
Figure 11:
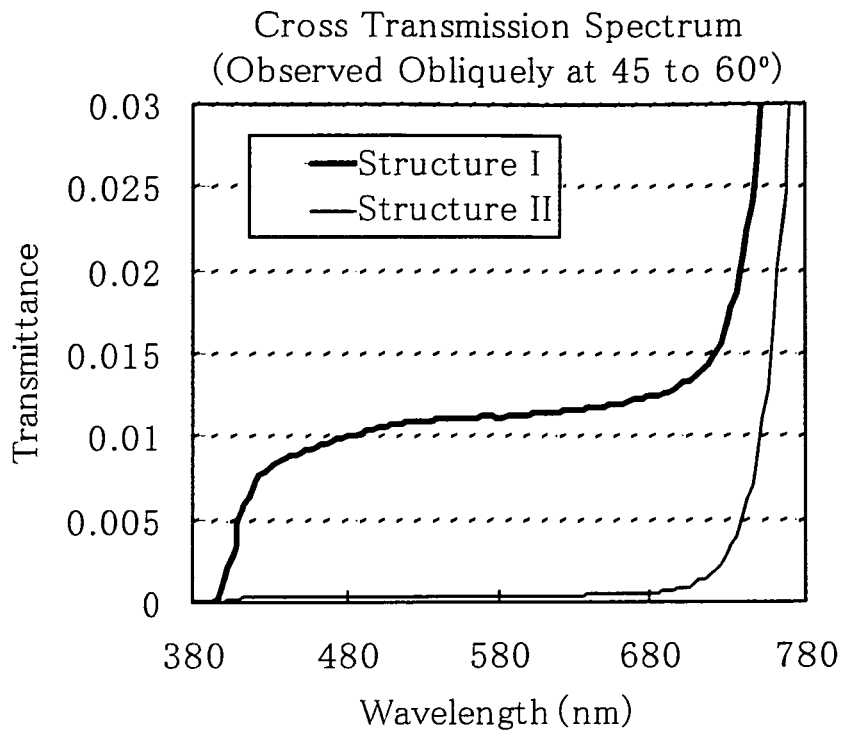
Figure 11:
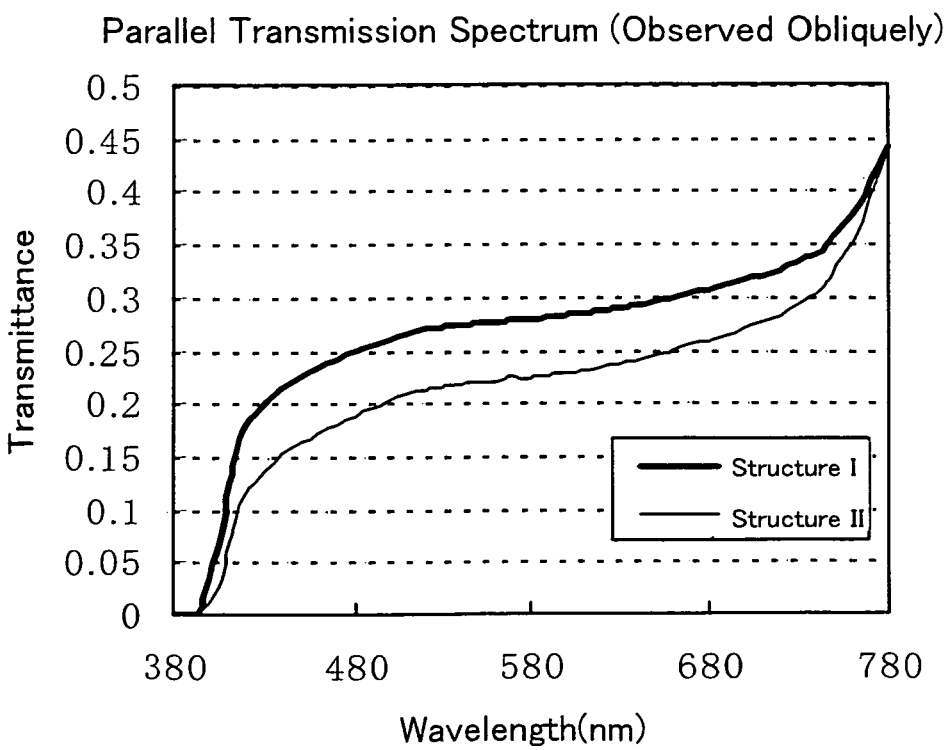

FIG. 11(a) is a graph showing the wavelength vs. cross transmittance relationship of a transmission spectrum for structures I, II for comparison when polarizers are viewed from the front. The graph demonstrates that structures I, II exhibit similar transmittance properties when a black display is viewed from the front.

FIG. 11(b) is a graph showing the wavelength vs. parallel transmittance relationship of a transmission spectrum for structures I, II for comparison when polarizers are viewed from the front. The graph demonstrates that structures I, II exhibit similar transmittance properties when a white display is viewed from the front.

FIG. 11(c) is a graph showing the wavelength vs. cross transmittance relationship of a transmission spectrum for structures I, II for comparison when polarizers are viewed at oblique angles (azimuth=45°–polar angle 60°). The graph demonstrates that structure II exhibits an almost zero transmittance at many of the wavelengths shown, whilst structure I transmits a small amount of light at many of the wavelengths shown, when a black display is viewed at oblique angles. To put it differently, the double polarizer structure suffers light leakage (hence, loses crispness in blacks) when a black display is viewed at oblique viewing angles. On the other hand, the triple polarizer structure successfully restrains light leakage (hence, retains crispness in blacks) when a black display is viewed at oblique viewing angles.

FIG. 11(d) is a graph showing the wavelength vs. parallel transmittance relationship of a transmission spectrum for structures I, II for comparison when polarizers are viewed at oblique angles (azimuth=45°–polar angle 60°). The graph demonstrates that structures I, II exhibit similar transmittance properties when a white display is viewed at oblique angles.

As shown in FIGS. 11(b), 11(d), white appears almost the same regardless of the number of polarizers used, in other words, the number of Nicol pairs provided by polarizers and also regardless of whether the display is viewed from the front or at oblique angles.

However, as shown in FIG. 11(c), black appears less crisp on structure I (one Nicol pair) at oblique viewing angles, but remains crisp on structure II (two Nicol pairs) at oblique viewing angles.

Table 1 shows, as an example, the values of transmittance at 550 nm for the front and oblique angles (azimuth=45°–polar angle 60°).

the other hand, structure I exhibits an increased transmittance at oblique viewing angles. At oblique viewing angles, blacks appear markedly less crisp on structure I than on structure II.

Figure 12:
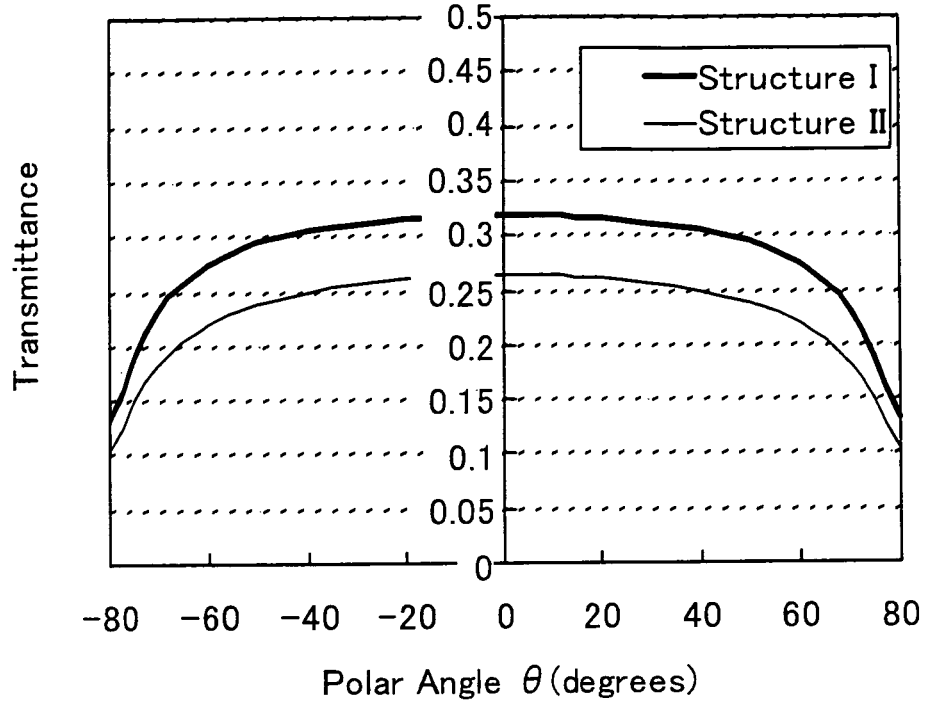
FIG. 12(a) illustrates a contrast improvement mechanism.
FIG. 12(b) illustrates a contrast improvement mechanism.
FIG. 12(c) illustrates a contrast improvement mechanism.
Figure 12:
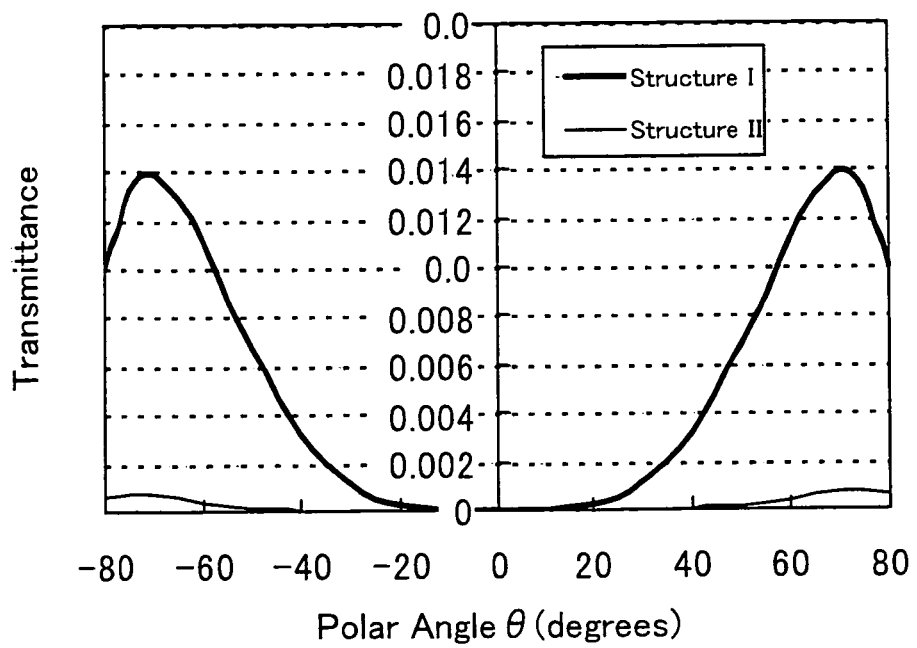
Figure 12:
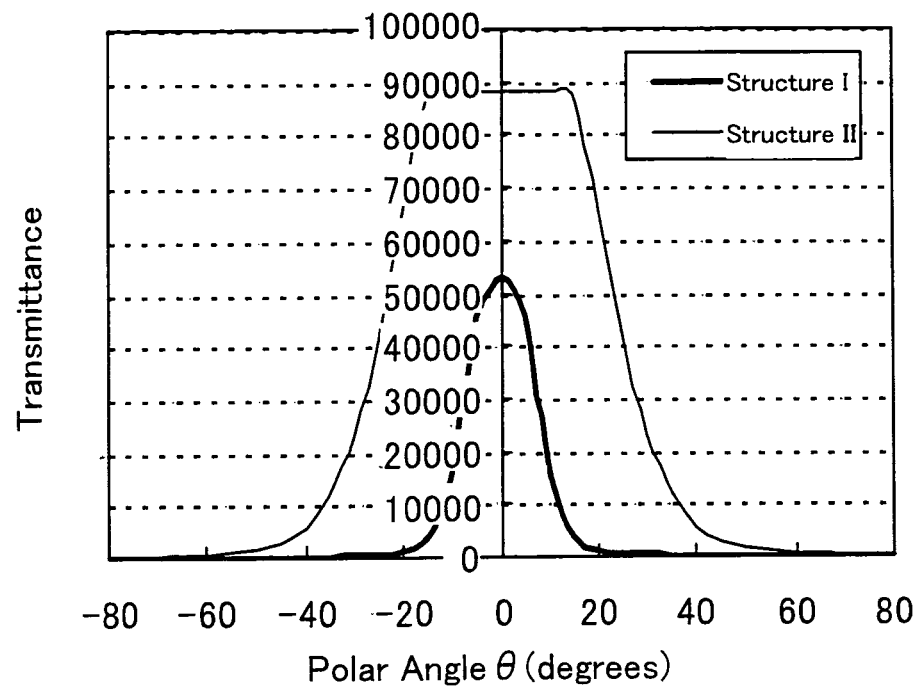

FIG. 12(c) is a graph representing the relationship between the polar angle and the contrast. The graph demonstrates that structure II exhibits far better contrast than structure I. The graph for structure II in FIG. 12(c) is "clipped off" near 0°. This particular part of the graph is actually a smooth curve; it is clipped because the transmittance for black drops so sharply by orders of magnitude and renders calculation impractical.

Figure 13:
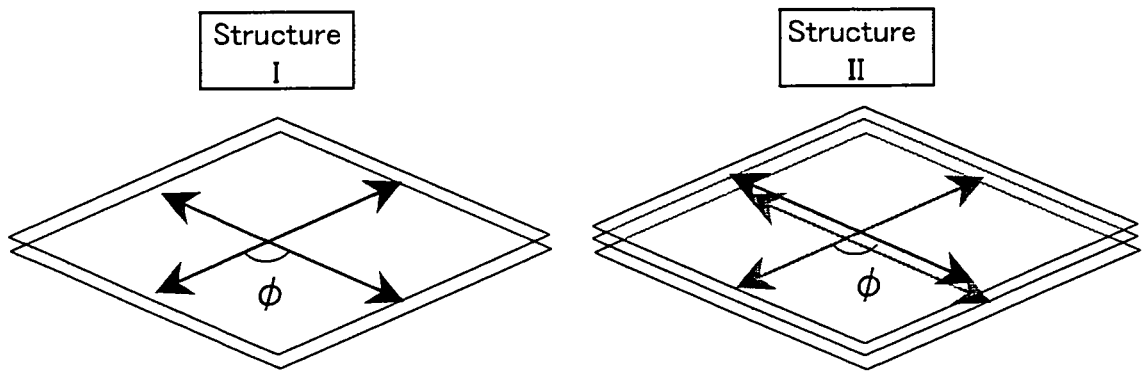
FIG. 13(a) illustrates a contrast improvement mechanism.
FIG. 13(b) illustrates a contrast improvement mechanism.
Figure 13:
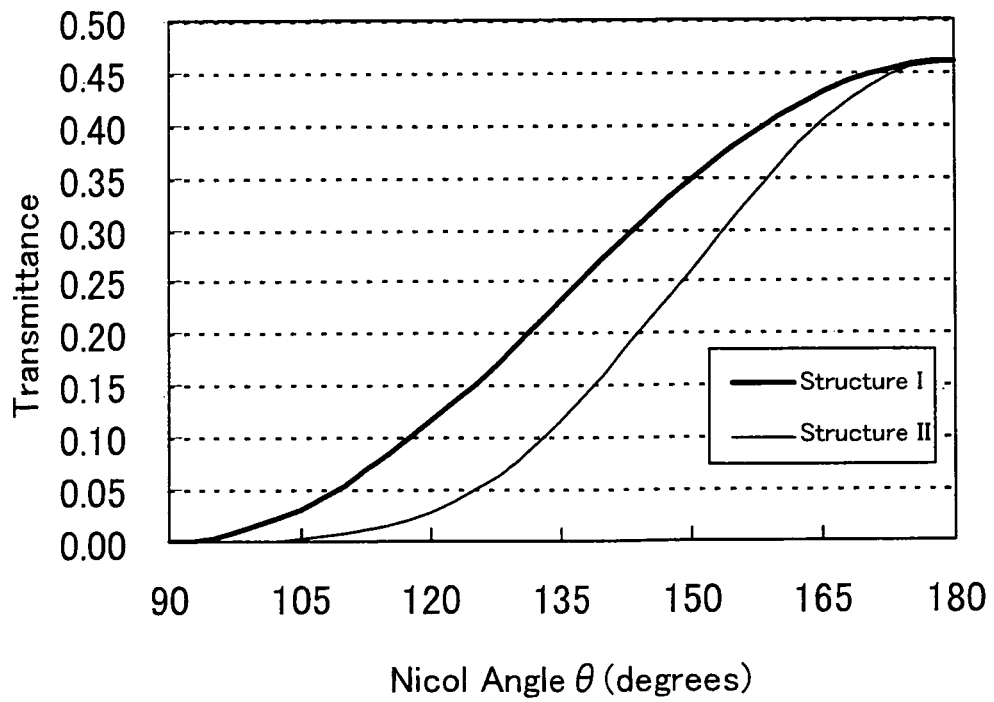

Next will be described the phenomenon that changes in leakage become less sensitive to an increasing Nicol angle φ of a polarizer, that is, black is less likely to lose its crispness with an increasing Nicol angle φ at oblique viewing angles, in reference to FIGS. 13(a), 13(b). The polarizer Nicol angle φ is an angle in a state that, as shown in FIG. 13(a), the polarization axes of the oppositely positioned polarizers are skew. FIG. 13(a) is a perspective view of polarizers which are positioned to form crossed Nicols; the figure shows the Nicol angle φ deviating from 90° (the deviation is the change in the Nicol angle).

FIG. 13(b) is a graph representing the relationship between the Nicol angle φ and the cross transmittance. Calculations are carried out based on an ideal polarizer (parallel Nicol transmittance=50%; crossed Nicol transmittance=0%). The graph demonstrates that the transmittance changes less with a change in the Nicol angle φ in structure II than in structure I in producing black display. In other words, the triple polarizer structure is less affected by a change in the Nicol angle φ than the double polarizer structure.

TABLE 1

|  | Front | | | Oblique position (45° to 60°) | | |
| --- | --- | --- | --- | --- | --- | --- |
|  | Structure I | Structure II | II/I | Structure I | Structure II | II/I |
| Parallel | 0.319 | 0.265 | 0832 | 0.274499 | 0.219084 | 0.798 |
| Crossed | 0.000005 | 0.000002 | 0.4 | 0.01105 | 0.000398 | 0.0360 |
| Parallel/Crossed | 63782 | 132645 | 2.1 | 24.8 | 550.5 | 22.2 |

In Table 1, "Parallel" denotes parallel transmittance, or the transmittance in white display; "Cross" denotes cross transmittance, or the transmittance in black display; and "Parallel/Cross" therefore denotes contrast.

Table 1 demonstrates that the contrast for the front on structure II is about twice as high as that on structure I and also that the contrast for oblique angles on structure II is about 22 times as high as that on structure I. The contrast for oblique angles shows great improvements.

Now, referring to FIGS. 12(a) to 12(c), viewing angle performance will be described for white display and black display. Assume in the description an azimuth of 45° with respect to polarizers and a wavelength of 550 nm.

FIG. 12(a) is a graph representing the relationship between the polar angle and the transmittance in white display. The graph demonstrates that structures I and II share similar viewing angle performance (parallel viewing angle performance), albeit structure II exhibits a lower transmittance than structure I across the range.

FIG. 12(b) is a graph representing the relationship between the polar angle and the transmittance in black display. The graph demonstrates that structure II well restrains the transmittance at oblique viewing angles (≈polar angle±80°). On Next, the thickness dependence of the polarizer will be described in reference to FIGS. 14(a) to 14(c). The thickness of the polarizer is adjusted as in structure III in which, as shown in FIG. 10(c), polarizers of the same polarization axis direction are added one by one on a pair of crossed Nicols polarizers. FIG. 10(c) shows an example of a pair of crossed Nicols polarizers 101a, 101b with another pair of polarizers 101a, 101b of the same polarization axis direction sandwiching the first pair. In this case, the structure contains a pair of crossed Nicols polarizers and two other polarizers; thus, "one crossed pair −2." Likewise, with each additional polarizer, "one crossed pair −3," "one crossed pair −4," . . . To draw the graphs in FIGS. 14(a) to 14(c), measurements are made on an assumption that azimuth=45° and polar angle=60°.

Figure 14:
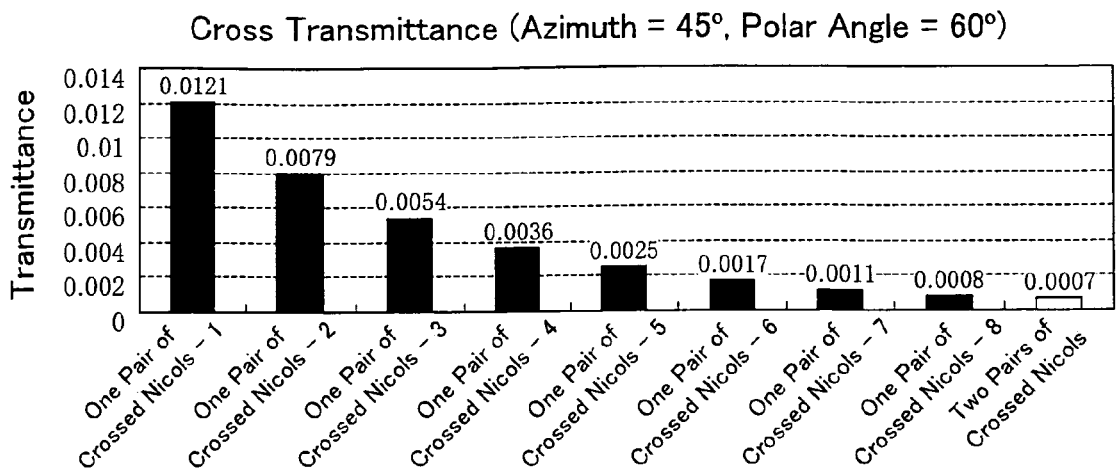
FIG. 14(a) illustrates a contrast improvement mechanism.
FIG. 14(b) illustrates a contrast improvement mechanism.
FIG. 14(c) illustrates a contrast improvement mechanism.
Figure 14:
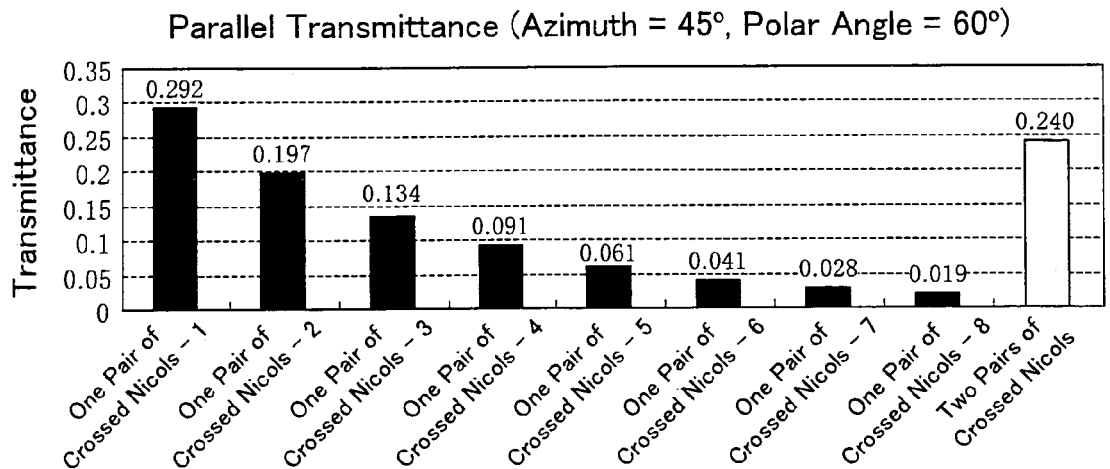
Figure 14:
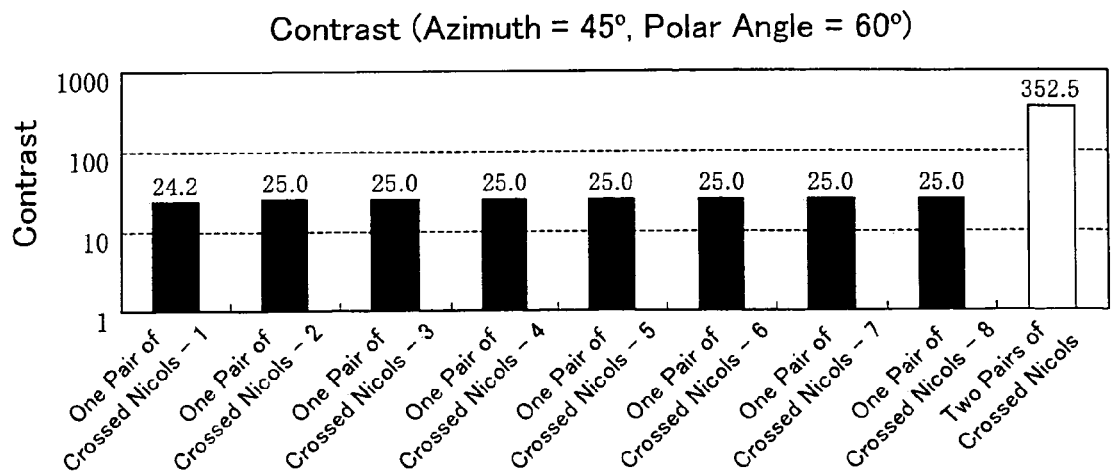

FIG. 14(a) is a graph representing the relationship between the thickness and the transmittance (cross transmittance) of a pair of crossed Nicols polarizers in producing black display. The graph also shows a transmittance for a structure with two pairs of crossed Nicols polarizers for comparison.

FIG. 14(b) is a graph representing the relationship between the thickness and the transmittance (parallel transmittance) of a pair of crossed Nicols polarizers in producing white display. The graph also shows a transmittance for a structure with two pairs of crossed Nicols polarizers for comparison.

The graph in FIG. 14(a) demonstrates that stacking polarizers reduces the transmittance in black display. Meanwhile, the graph in FIG. 14(b) demonstrates that stacking polarizers reduces the transmittance in white display. Simply stacking polarizers for the sake of prevention of reduced crispness in black display leads, undesirably, a decrease in the transmittance in white display.

FIG. 14(c) is a graph representing the relationship between the thickness and the contrast of a pair of crossed Nicols polarizers. The graph also shows contrast for two pairs of crossed Nicols polarizers for comparison.

As discussed above, the graphs in FIGS. 14(a) to 14(c) demonstrate that the structure with two pairs of crossed Nicols polarizers restrains loss of crisp blacks in black display and at the same time prevents reduced transmittance in white display. Besides, the two pairs of crossed Nicols polarizers consist of three polarizers; the pairs improve contrast by large amounts, as well as do not add to the total thickness of the liquid crystal display.

Figure 15:
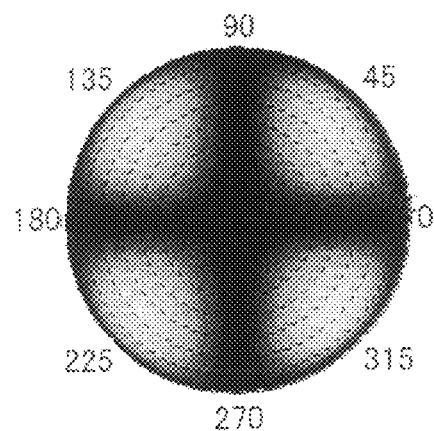
FIG. 15(a) illustrates a contrast improvement mechanism.
FIG. 15(b) illustrates a contrast improvement mechanism.
Figure 15:
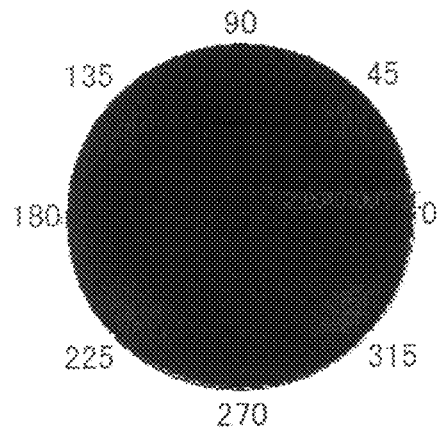

FIGS. 15(a), 15(b) show viewing angle characteristics of crossed Nicol transmittance in a specific manner. FIG. 15(a) shows the viewing angle characteristics of crossed Nicols in structure I, i.e., a double polarizer structure with a pair of crossed Nicols. FIG. 15(b) shows the viewing angle characteristics of crossed Nicols in structure II, i.e., a triple polarizer structure with two pairs of crossed Nicols.

The diagrams in FIGS. 15(a), 15(b) demonstrate that the structure with two pairs of crossed Nicols is almost free from degrading crispness in blacks (attributable to little increase in the transmittance in black display). This advantage of the structure is evident at 45°, 135°, 225°, and 315°.

Figure 16:
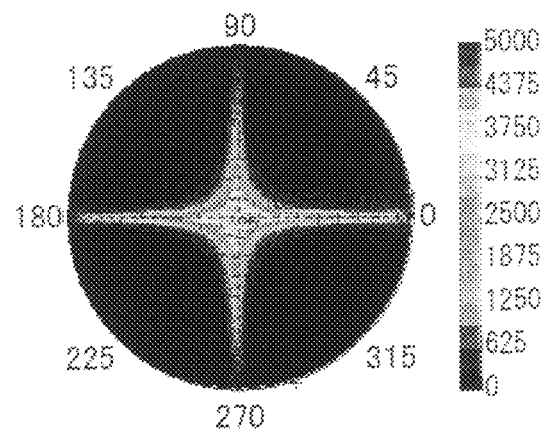
FIG. 16(a) illustrates a contrast improvement mechanism.
FIG. 16(b) illustrates a contrast improvement mechanism.
Figure 16:
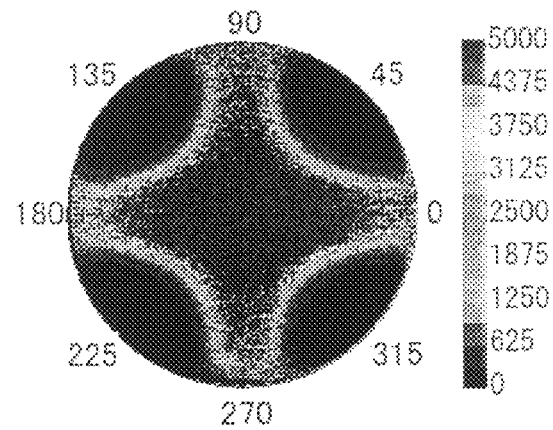

FIGS. 16(a), 16(b) show viewing angle characteristics of contrast (parallel/cross luminance) in a specific manner.

FIG. 16(a) shows the viewing angle characteristics of contrast in structure I, i.e., a double polarizer structure with a pair of crossed Nicols. FIG. 16(b) shows the viewing angle characteristics of contrast in structure II, i.e., a triple polarizer structure with two pairs of crossed Nicols.

The diagrams in FIGS. 16(a), 16(b) demonstrate that the structure with two pairs of crossed Nicols exhibits improved contrast than the structure with a pair of crossed Nicols.

Now, referring to FIGS. 1 to 9, the following will describe this contrast improvement mechanism being applied to the liquid crystal display. For simplicity, two liquid crystal panels are used.

Figure 1:
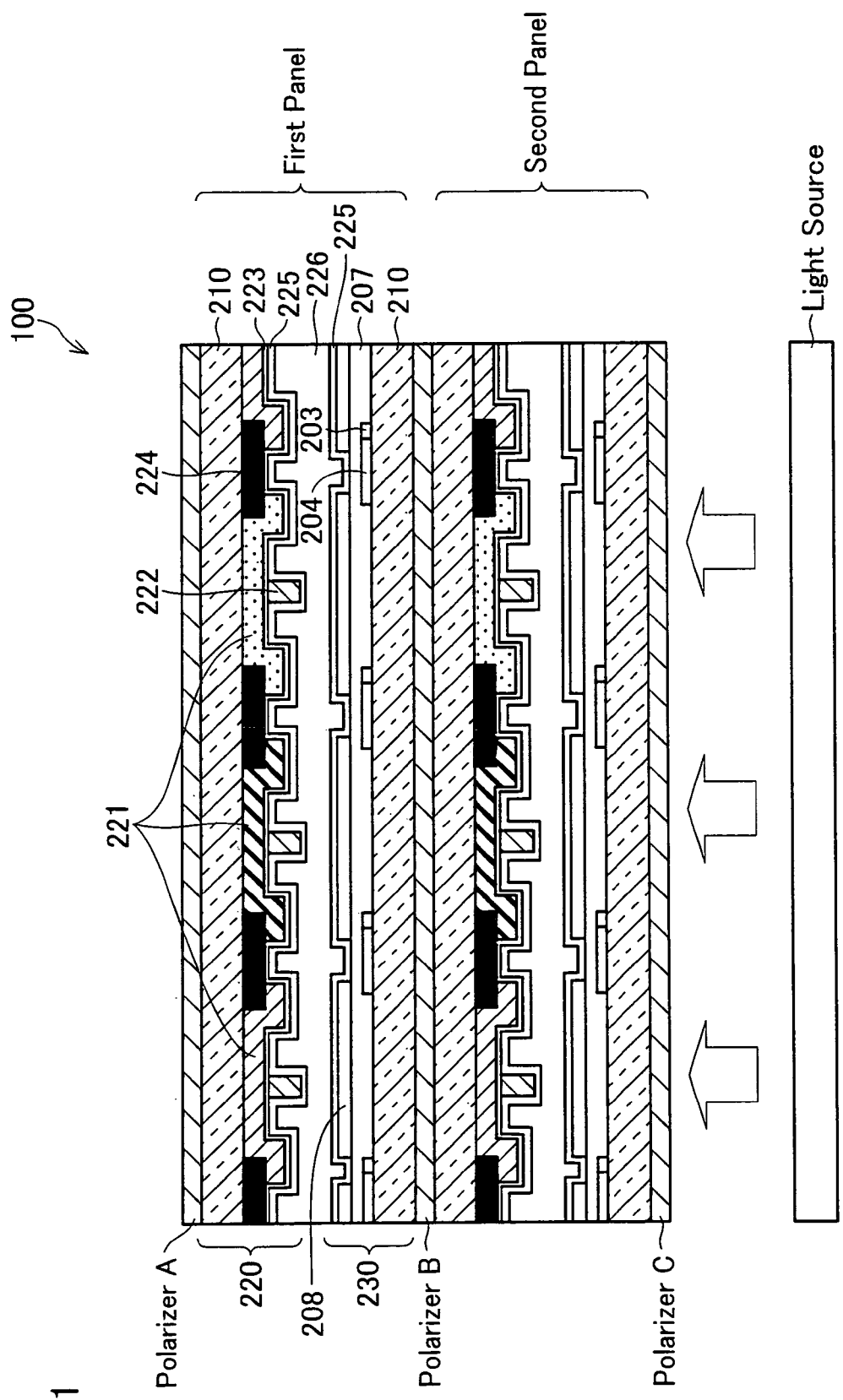
FIG. 1 is a schematic cross-sectional view of a liquid crystal display, illustrating an embodiment of the present invention.

FIG. 1 is a schematic cross-section of a liquid crystal display 100 in accordance with the present embodiment.

The liquid crystal display 100 includes panels and polarizers being stacked alternately on top of each other as shown in FIG. 1. The two panels are termed a first and a second. The three polarizers are denoted by A, B, and C.

Figure 2:
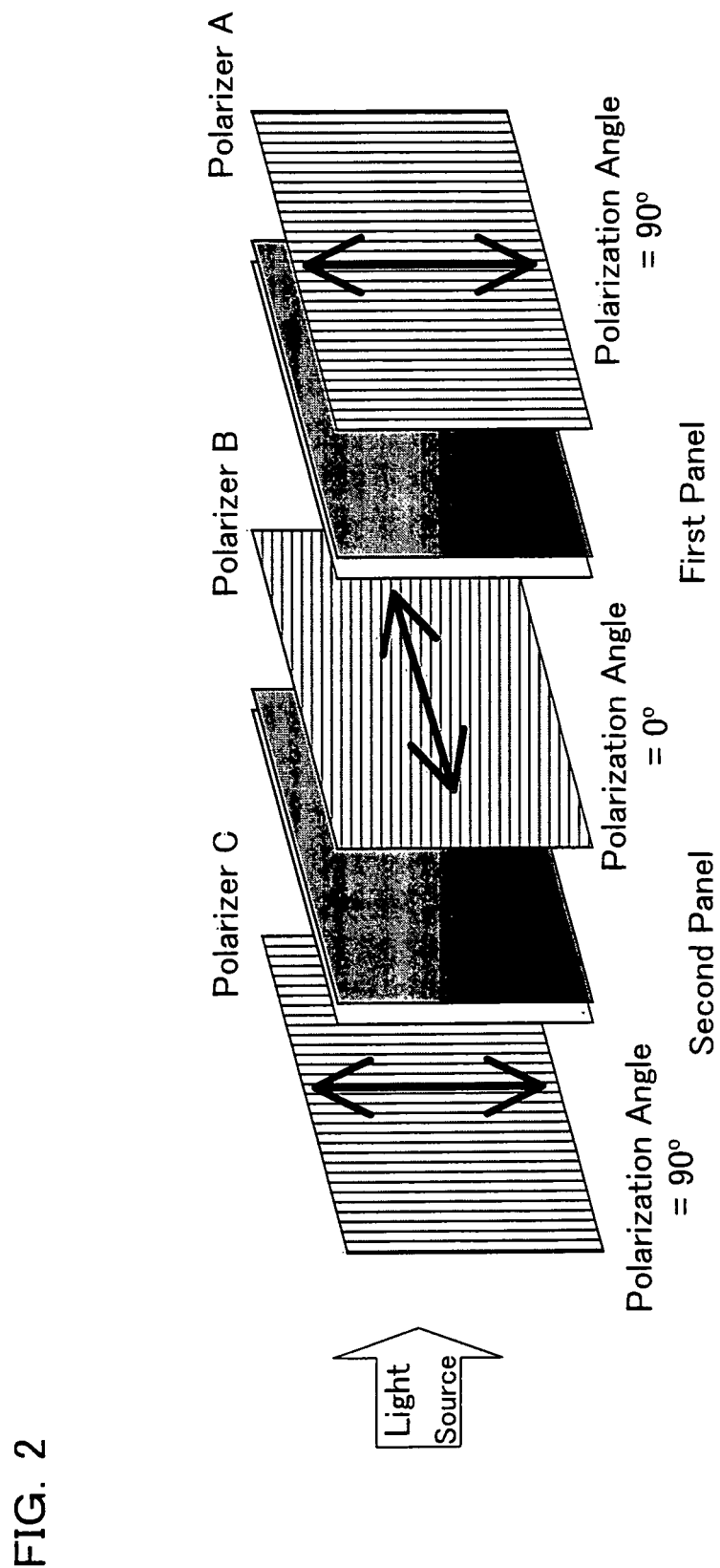
FIG. 2 illustrates the positional relationship of polarizers and panels in the liquid crystal display shown in FIG. 1.

FIG. 2 is an illustration of the joining of the polarizers and the liquid crystal panels in the liquid crystal display 100 shown in FIG. 1. In FIG. 2, the polarizers A, B, C are positioned so that the polarization axis of the polarizer B is perpendicular to those of the polarizers A, C. The polarizers A and B form a pair of crossed Nicols, and the polarizers B and C form another pair.

Each of the first and second panels is a pair of transparent substrates (a color filter substrate 220 and an active matrix substrate 230) with liquid crystal being sealed in between. Each panel has a means of switching between a state in which the polarized light incident to the polarizer A from the light source is rotated by about 90°, a state in which the polarized light is not rotated, and any intermediate states as desired, by electrically changing the alignment of the liquid crystal.

The first and second panels each have a color filter and is capable of producing an image using a plurality of pixels. This display function is achieved by some display modes: TN (twisted nematic) mode, VA (vertical alignment) mode, IPS (in-plain switching) mode, FFS (fringe field switching) mode, and combinations of these modes. Among these modes, VA is suitable because the mode exhibits high contrast without combining with any other modes. Although the description here will focus on MVA (multidomain vertical alignment) mode, IPS and FFS modes are also sufficiently effective because both operate in normally black mode. The liquid crystal is driven by active matrix driving using TFTs (thin film transistors). For a detailed description of MVA manufacturing methods, see Japanese Unexamined Patent Publication 2001-83523 (Tokukaihei 2001-83523), for example.

The first and second panels in the liquid crystal display 100 have the same structure. Each panel includes a color filter substrate 220 and an active matrix substrate 230 positioned face to face as mentioned above and also contains spacers (not shown) to maintain the substrates at a specific distance from each other. The spacers are, for example, plastic beads or resin columns erected on the color filter substrate 220. Liquid crystal is sealed between the two substrates (the color filter substrate 220 and the active matrix substrate 230). A vertical alignment film 225 is formed on the surface of each substrate which comes in contact with the liquid crystal. The liquid crystal is nematic liquid crystal with negative dielectric anisotropy.

The color filter substrate 220 includes a transparent substrate 210 with a color filter 221, a black matrix 224, and other components built on the substrate 210. The substrate 220 is provided also with alignment controlling projections 222 which control the alignment direction of the liquid crystal.

Figure 3:
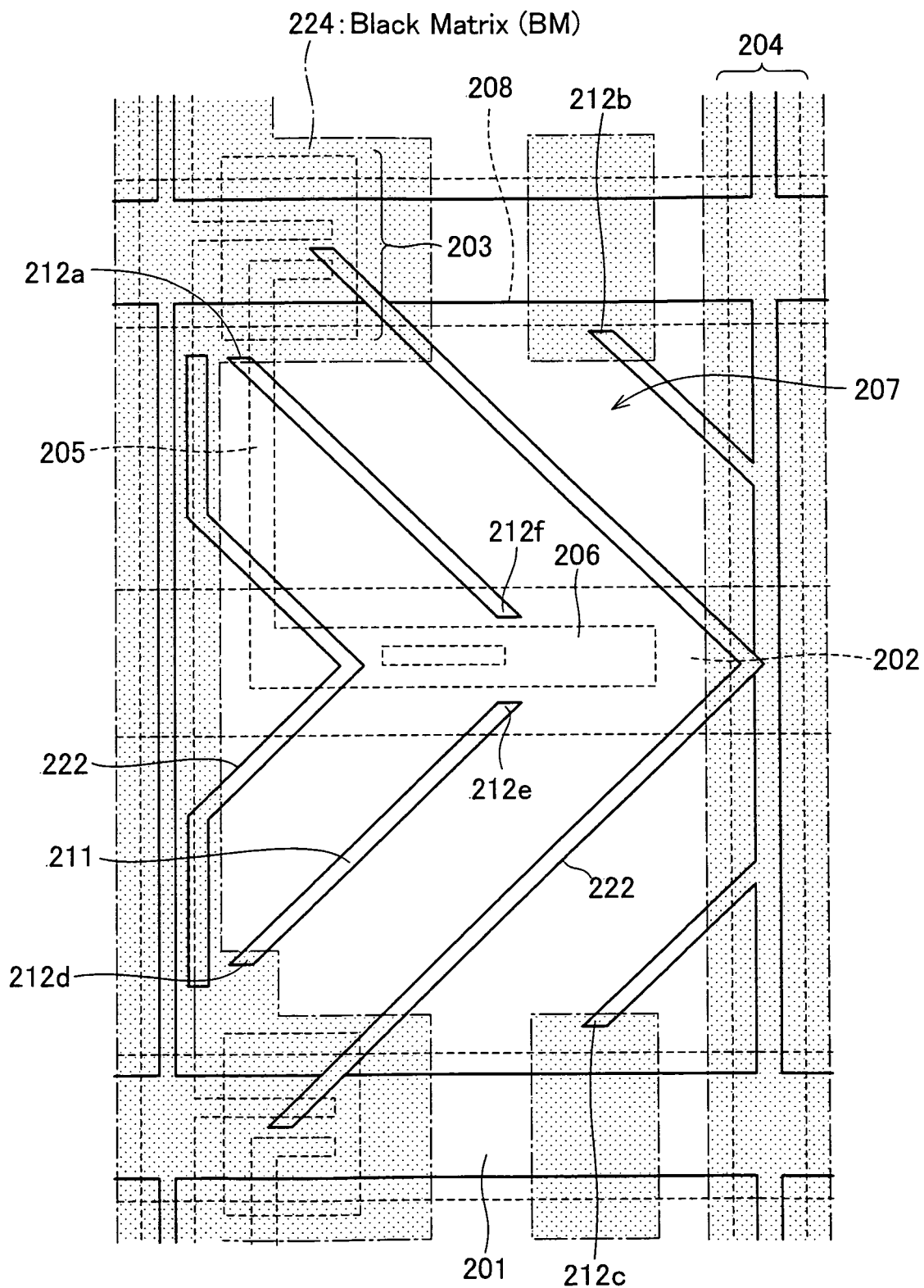
FIG. 3 is a plan view of a pixel electrode and its neighborhood in the liquid crystal display shown in FIG. 1.

The active matrix substrate 230 includes, as shown in FIG. 3, a transparent substrate 210 with TFT elements 203, pixel electrodes 208, and other components built on the substrate 210. The substrate 230 is provided also with alignment control slit patterns 211 which controls the alignment direction of the liquid crystal. Note that the alignment controlling projections 222 and the black matrix 224 shown in FIG. 3 are projection of real patterns formed on the color filter substrate 220 onto the active matrix substrate 230. The black matrix 224 blocks unnecessary light which, if transmitted, would degrade display quality. As a threshold or higher voltage is applied to the pixel electrodes 208, liquid crystal molecules fall perpendicular to the projections 222 and the slit patterns 211. In the present embodiment, the projections 222 and the slit patterns 211 are formed so that liquid crystal molecules align at an azimuth of 45° with respect to the polarization axis of the polarizer.

As described in the foregoing, the first and second panels are constructed so that the red (R), green (G), and blue (B) pixels of one of the color filters 221 are positioned to match those of the other color filter 221 when viewed normal to the panels. Specifically, the R dots of the first panel are positioned to match those of the second panel; the G dots of the first panel are positioned to match those of the second panel; and the B dots of the first panel are positioned to match those of the second panel, viewed normal to the panels.

Figure 4:
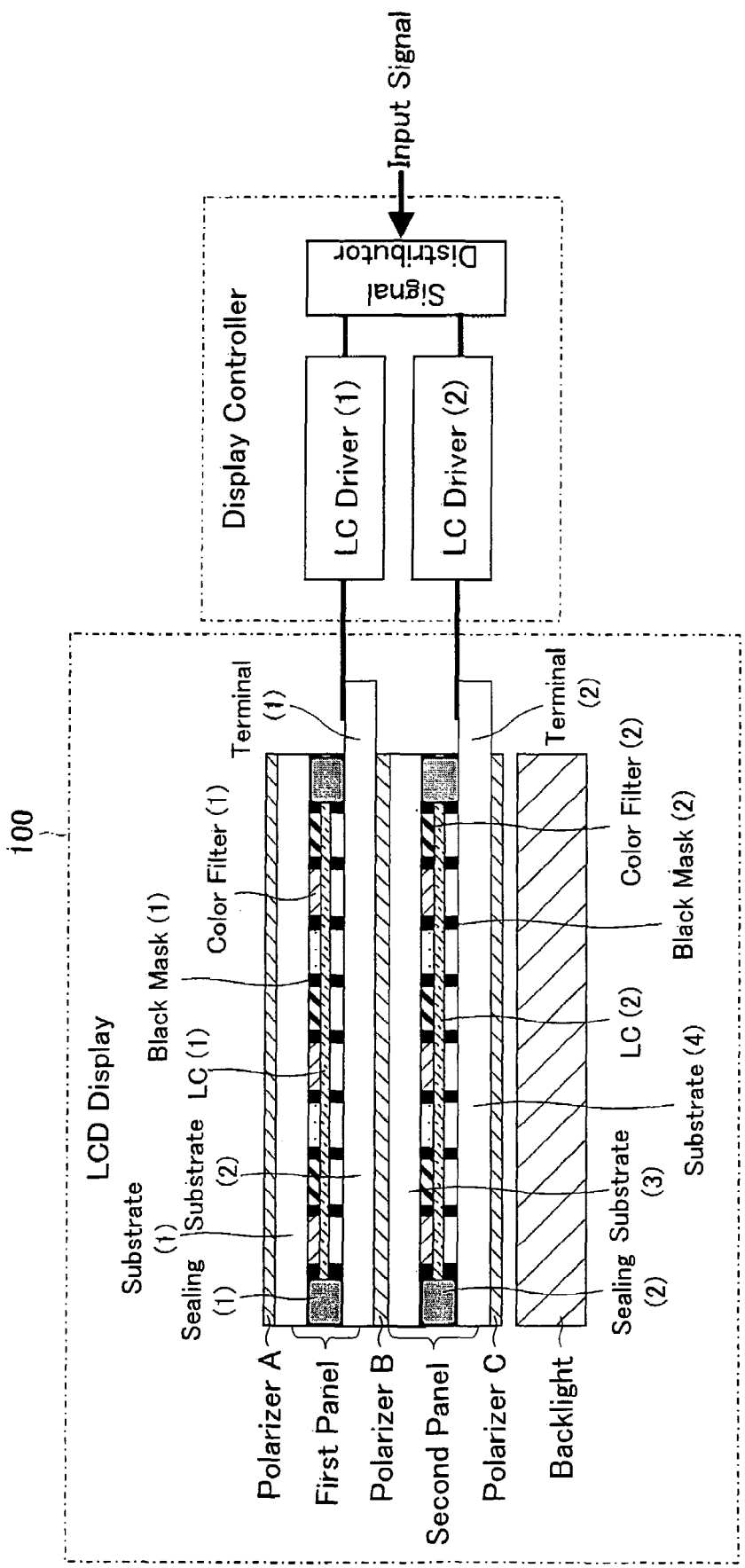
FIG. 4 is a schematic structural diagram of a drive system which drives the liquid crystal display shown in FIG. 1.

FIG. 4 is a schematic of a drive system for the liquid crystal display 100 constructed as above.

The drive system contains a display controller required to display video on the liquid crystal display 100.

As a result, the liquid crystal panel is capable of outputting suitable images according to input signals.

The display controller contains a first and a second panel drive circuit (1), (2) which drive the first and the second panel respectively with predetermined signals. The display controller also contains a signal distribution circuit section which distributes video source signals to the first and second panel drive circuits (1), (2).

The input signals refer not only to video signals from a TV receiver, VTR, or DVD player, but also to those produced by processing these signals.

Therefore, the display controller is adapted to send signals to the panels in such a manner that the liquid crystal display 100 can display suitable images.

The display controller sends suitable electric signals to the panels according to incoming video signals and is composed of drivers, circuit boards, panel drive circuits, and other components.

Figure 5:
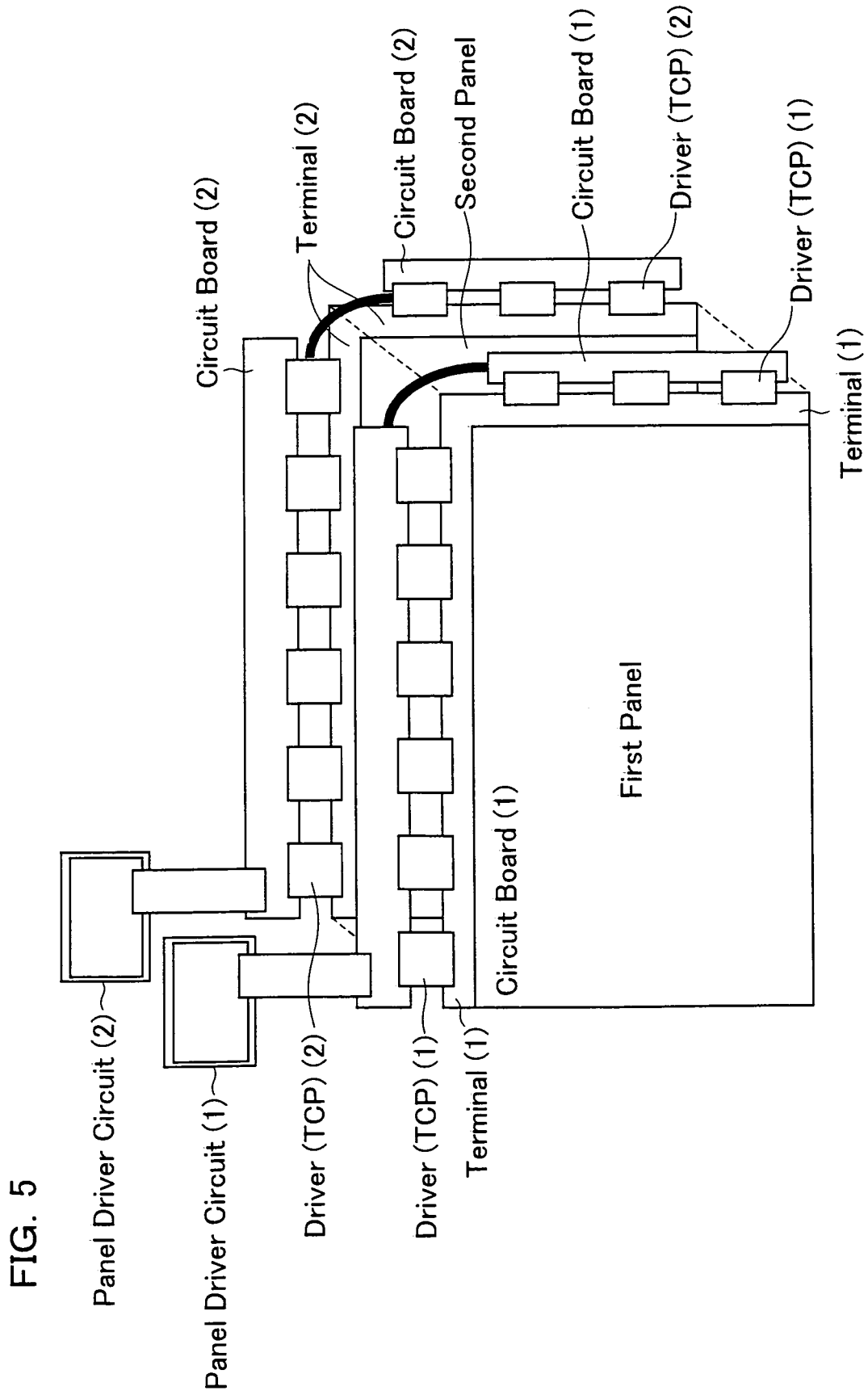
FIG. 5 illustrates connections between drivers and panel drive circuits in the liquid crystal display shown in FIG. 1.

FIG. 5 illustrates connections between the first and second panels and the respective panel drive circuits. The polarizers are omitted in FIG. 5.

The first panel drive circuit (1) is connected via a driver (TCP) (1) to terminals (1) provided on the circuit board (1) of the first panel. In other words, the driver (TCP) (1) is connected to the first panel, coupled by the circuit board (1), and connected to the panel drive circuit (1).

The second panel drive circuit (2) is connected to the second panel in the same manner as the first panel drive circuit (1) is to the first panel; no further description is given.

Next will be described an operation of the liquid crystal display 100 constructed as above.

The pixels in the first panel are driven according to display signals. The corresponding pixels in the second panel (those which appear overlapping the pixels in the first panel when viewed normal to the panels) are driven in association with the first panel. When the combination of the polarizer A, the first panel, and the polarizer B (construction 1) transmits light, so does the combination of the polarizer B, the second panel, and the polarizer C (construction 2); when construction 1 does not transmit light, nor does the construction 2.

The first and second panels may be fed with identical image signals or associated, but different signals.

Next will be described a manufacturing method for the active matrix substrate 230 and the color filter substrate 220.

A manufacturing method for the active matrix substrate 230 will be first described.

Metal films (e.g. Ti/Al/Ti) are stacked by sputtering on a transparent substrate 10 to form scan signal lines (gate wires, gate lines, gate voltage lines, or gate bus lines) 201 and auxiliary capacitance lines 202 as shown in FIG. 3. A resist pattern is formed on the films by photolithography and dry etched in an etching gas (e.g. chlorine-based gas) to remove the resist. That simultaneously forms the scan signal lines 201 and the auxiliary capacitance lines 202 on the transparent substrate 210.

Thereafter a gate insulating film is formed of a silicon nitride (SiNx) and other materials, an active semiconductor layer is formed of amorphous silicon and other materials, and a low resistance semiconductor layer is formed of amorphous silicon and other materials doped with, for example, phosphor, all by CVD. Then, metal films (e.g. Al/Ti) are stacked by sputtering to form data signal lines (source wires, source lines, source voltage lines, or source bus lines) 204, drain lead-out lines 205, and auxiliary capacitance forming electrodes 206. A resist pattern is formed on the films by photolithography and dry etched in an etching gas (e.g. chlorine-based gas) to remove the resist. That simultaneously forms the data signal lines 204, the drain lead-out lines 205, and the auxiliary capacitance forming electrodes 206.

An auxiliary capacitance is formed between an auxiliary capacitance line 202 and an auxiliary capacitance forming electrode 206 with an intervening gate insulating film about 4000 angstrom thick.

Thereafter, the low resistance semiconductor layer is dry etched, for example, in a chlorine gas to form TFT elements 203 and thus separate the sources from the drains.

Next, an interlayer insulating film 207 of, for example, an acrylic-based photosensitive resin is formed by spin coating. Contact holes (not shown) which electrically connect the drain lead-out lines 205 to the pixel electrodes 208 are formed by photolithography. The interlayer insulating film 207 is about 3-μm thick.

Furthermore, pixel electrodes 208 and a vertical alignment film (not shown) are formed in this order to complete the manufacture.

The present embodiment is an MVA liquid crystal display as mentioned earlier and has slit patterns 211 in the pixel electrodes 208 made of ITO and other materials. Specifically, a film is formed by sputtering, followed by a resist pattern being formed by photolithography. Then, etching is carried out in an etching solution, e.g. iron(III) chloride, to form pixel electrode patterns as shown in FIG. 3.

That concludes the manufacture of the active matrix substrate 230.

The reference numerals 212a, 212b, 212c, 212d, 212e, 212f in FIG. 3 represent electrical connection sections of the slit in the pixel electrode 208. In the electrical connection sections of the slit, alignment is disturbed, resulting in alignment anomaly. Besides, a positive voltage is applied to the gate wire (slits 212a to 212d) to turn on the TFT element 203 generally for periods on the order of microseconds, whereas a negative voltage is applied to turn off the TFT element 203 generally for periods on the order of milliseconds; a negative voltage is applied for most of the time. Thus, if the slits 212a to 212d are disposed on the gate wires, ionic impurities contained in the liquid crystal may concentrate due to a gate negative DC application component. The alignment anomaly and ionic impurity concentration may cause the slits 212a to 212d to be spotted as display non-uniformities. The slits 212a to 212d therefore need to be disposed where they do not overlap the gate wires. The slits 212a to 212d are better hidden with the black matrix 224 as shown in FIG. 3.

Next will be described a manufacturing method for the color filter substrate 220.

The color filter substrate 220 contains a color filter layer, an opposite electrode 223, a vertical alignment film 225, and alignment controlling projections 222 on the transparent substrate 210. The color filter layer contains the color filters (three primary colors [red, green, and blue]) 221 and the black matrix (BM) 224.

First, a negative, acrylic-based photosensitive resin solution containing dispersed fine carbon particles is applied onto the transparent substrate 210 by spin coating and dried to form a black photosensitive resin layer. Subsequently, the black photosensitive resin layer is exposed to light using a photomask and developed to form the black matrix (BM) 224. The BM is formed so as to have respective openings for a first color layer (e.g. red layer), a second color layer (e.g. green layer), and a third color layer (e.g. blue layer) in areas where the first, second, and third color layers will be provided (the openings are provided corresponding to the pixel electrodes). More specifically, referring to FIG. 3, a BM pattern is formed like an island, and a light blocking section (BM) is formed on the TFT elements 203. The BM pattern shields from light anomalous alignment regions which occur in the slits 212a to 212d of electrical connection sections in the slit 212a to 212f in the pixel electrodes 208. The light blocking section prevents increases in leak current induced by external light hitting the TFT elements 203.

After applying a negative, acrylic-based photosensitive resin solution containing a dispersed pigment by spin coating, the solution is dried, exposed to light using a photomask, and developed to form a red layer.

The same steps are repeated to form the second color layer (e.g. green layer) and the third color layer (e.g. blue layer). That completes the manufacture of the color filters 221.

Furthermore, the opposite electrode 223 is formed of a transparent electrode, such as ITO, by sputtering. A positive, phenolnovolak-based photosensitive resin solution is then applied by spin coating. The solution is dried, exposed to light using a photomask, and developed to form the vertical alignment controlling projections 222. Then, columnar spacers (not shown) are formed to establish a cell gap for the liquid crystal panel by applying an acrylic-based photosensitive resin solution, exposing the solution to light using a photomask, and developing and curing the resin.

That completes the manufacture of the color filter substrate 220.

The present embodiment uses a BM made of resin. The BM may be made of a metal. The three primary colors of the color layers may not be red, green, and blue; they may be cyan, magenta, and yellow as an example, and there also may be provided a white layer.

Now, the color filter substrate 220 and the active matrix substrate 230 manufactured as above are joined to form a liquid crystal panel (first and second panels) by the following method.

First, a vertical alignment film 225 is formed on the surfaces of the color filter substrate 220 and the active matrix substrate 230 which come in contact with the liquid crystal. Specifically, before the formation of the alignment film, the substrate is baked for degassing and washed. The alignment film is then baked. After that, the substrate is washed and baked for degassing. The vertical alignment films 225 establish the alignment direction of the liquid crystal 226.

Next will be described a method for sealing the liquid crystal between the active matrix substrate 230 and the color filter substrate 220.

One of available liquid crystal sealing methods is vacuum injection, which is described here briefly: A thermosetting sealing resin is disposed around the substrate with an injection hole being left open for the injection of liquid crystal. The injection hole is immersed in liquid crystal in vacuum to drive out air from the closed space so that the liquid crystal can move in instead. Finally, the injection hole is sealed using, for example, a UV-setting resin. The vacuum injection however is undesirably time-consuming for the manufacture of a liquid crystal panel for vertical alignment mode, compared to the manufacture of a horizontal alignment panel. Dropwise liquid crystal dispensing/joining is employed here.

A UV-setting sealing resin is applied to the periphery of the active matrix substrate whilst liquid crystal is dispensed dropwise onto the color filter substrate. An optimal amount of liquid crystal is dispensed dropwise regularly inside the sealing so that the liquid crystal establishes a desired cell gap.

The pressure inside the joining device is reduced to 1 Pa to join the color filter substrate which has the sealing resin disposed thereon and the active matrix substrate which has the liquid crystal dispensed dropwise thereon. After the substrates are joined to each other at the low pressure, the pressure is changed back to the atmospheric pressure to collapse the sealing, leaving a desired gap in the sealing section.

The resultant structure with a desired cell gap in the sealing section is irradiated with UV radiation in a UV projection device for preliminary setting of the sealing resin. The structure is then baked in order to completely set the sealing resin. At this stage, the liquid crystal moves into every corner inside the sealing resin, filling up the cell. After the baking, the structure is separated into individual liquid crystal panels. That completes the manufacture of the liquid crystal panel.

In the present embodiment, the first and second panels are manufactured by the same process.

Next will be described the mounting of components to the first and second panels manufactured as above.

Here, the first and second panels are washed, and polarizers are attached to the panels. Specifically, polarizers A and B are attached respectively to the front and the back of the first panel as shown in FIG. 4. A polarizer C is attached to the back of the second panel. The polarizers may be stacked together with other layers, such as optical compensation sheets, where necessary.

Then drivers (liquid crystal driver LSI) are connected. Here, the drivers are connected using TCPs (tape career packages).

For example, an ACF (anisotropic conductive film) is attached to the terminals (1) of the first panel by preliminary compression as shown in FIG. 5. The TCPs (1) carrying the drivers are punched out of the carrier tape, aligned with panel terminal electrodes, and heated for complete compression/attachment. Thereafter, the input terminals (1) of the TCPs (1) are connected to the circuit board (1) using an ACF. The circuit board (1) is provided to couple the driver TCPs (1) together.

Next, two panels are joined. The polarizer B has an adhesive layer on each side. The surface of the second panel is washed, and the laminates of the adhesive layers of the polarizer B on the first panel are peeled off. The first and second panels, after being precisely aligned, are joined. Bubbles may be trapped between the panel and the adhesive layer during the joining process; it is therefore desirable to join the panels in vacuum.

Alternatively, the panels may be joined by another method as follows. An adhesive agent which sets at normal temperature or at a temperature not exceeding the panel's thermal resistance temperature (e.g. epoxy adhesive agent) is applied to the periphery of the panels. Plastic spacers are scattered, and, for example, fluorine oil is sealed. Preferred materials are optically isotropic liquids with a refractive index close to that of a glass substrate and as stable as liquid crystal.

The present embodiment is applicable to cases where the terminal face of the first panel and that of the second panel are at the same position as illustrated in FIGS. 4 and 5. The terminals may be disposed in any direction with respect to the panel and attached to the panel by any method. For example, they may be fixed mechanically without using adhesive.

To reduce the parallax caused by the thickness of the internal glass, the substrates of the two panels which face each other are preferably reduced in thickness to a minimum.

If glass substrates are used, thin substrates are straightly available on the market. Feasible substrate thicknesses may vary from one manufacturing line to another and depending on the dimensions of the liquid crystal panel and other conditions. An example is 0.4-mm thick glass for inner substrates.

The glass may be polished or etched. Glass can be etched by publicly known techniques (e.g. Japanese Patents 3524540 and 3523239). Typically, a chemical treatment solution such as a 15% aqueous solution of hydrofluoric acid is used. Any parts which should not be etched including the terminal face are coated with an acid-proof, protective material. The glass is then immersed in the chemical treatment solution for etching, after which the protective material is removed. The etching reduces the thickness of the glass to about 0.1 mm to 0.4 mm. After joining the two panels, a lighting system called a backlight is attached to complete the manufacture of the liquid crystal display 100.

Now, the following will describe concrete examples of the lighting system which are suitable to the present invention. The present invention is however not limited to the arrangement of the lighting system discussed below; any changes may be made where necessary.

Figure 6:
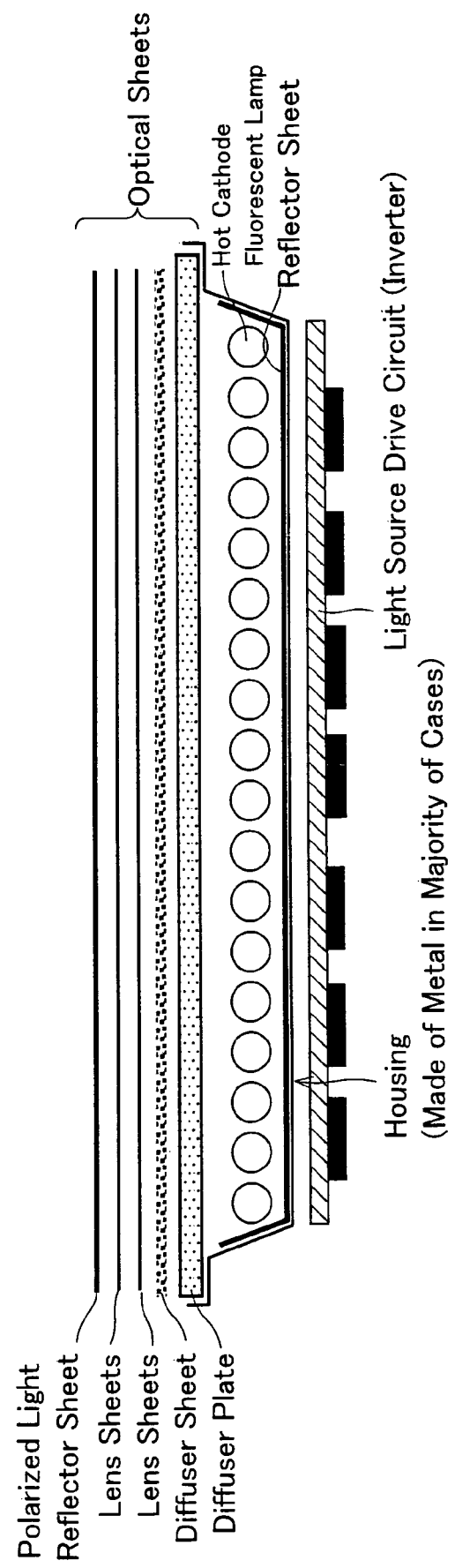
FIG. 6 is a schematic structural diagram of a backlight provided in the liquid crystal display shown in FIG. 1.

The liquid crystal display 100 of the present invention, due to its display mechanism, needs a more powerful backlight than conventional panels. In addition, the display 100 absorbs notably more of short wavelengths than conventional panels; the light source should be a blue one that emits more intense light at short wavelengths. FIG. 6 shows an example of the lighting system which meets these conditions.

Hot cathode fluorescent lamps are used for the liquid crystal display 100 of the present invention to obtain luminance similar to conventional panels. The prominent feature of the hot cathode fluorescent lamp is that it outputs about 6 times as intense light as a cold cathode fluorescent lamp with typical specifications.

Taking a 37-inch WXGA-format display as an example of the standard liquid crystal display, 18 of the lamps are arranged on an aluminum housing. Each lamp has an external diameter (=φ) of 15 mm. The housing includes a white reflector sheet made of resin foam for efficient usage of the light emitted backward from the lamps. The power supply for the lamps is provided on the back of the housing to drive the lamps on the household power supply.

Next, a translucent white resin plate is necessary to eliminate images of the lamps in the housing because the lamps are used for direct backlighting. A 2-mm thick plate member made primarily of polycarbonate is placed on the housing for the lamps. Polycarbonate exhibits high resistance to wet warping and heat deformation. On top of the member are provided optical sheets (namely, from the bottom, a diffuser sheet, two lens sheets, and a polarized light reflector sheet), so as to achieve predetermined optical effects. With these specifications, the backlight is about 10 times as bright as typical conventional specifications: i.e., 18 cold cathode fluorescent lamps (φ=4 mm), two diffuser sheets, and a polarized light reflector sheet. The 37-inch liquid crystal display of the present invention is hence capable of about 400 cd/m$^2$ luminance.

The backlight discharges as much as 5 times more heat than a conventional backlight. The heat is progressively discharged to air from a fin and forcefully ejected through air flow created by a fan, both being provided on the back of the back chassis.

The mechanical members of the lighting system double as major mechanical members for a whole liquid crystal module. The backlight is attached to the fabricated panels which already have a complete set of components mounted thereto. A liquid crystal display controller (including panel drive circuits and signal distributors), a light source power supply, and in some cases a general household power supply are also attached to completes the manufacture of the liquid crystal module. The backlight is attached to the fabricated panels which already have a complete set of components mounted thereto, and a framework is disposed to hold the panels together. That completes the manufacture of the liquid crystal display of the present invention.

The present embodiment uses a direct backlighting system using a hot cathode fluorescent lamp. Alternatively, the lighting system, depending on application, may be of a projection type or an edge-lit type. The light source may be cold cathode fluorescent lamps, LEDs, OELs, or electron beam fluorescence tubes. Any optical sheets may be selected for a suitable combination.

In the embodiment above, the slits are provided in the pixel electrodes of the active matrix substrate, and the alignment controlling projections are provided on the color filter substrate, so as to control the alignment direction of the vertical alignment liquid crystal molecules. As another embodiment, the slits and projections may be transposed. Furthermore, slits may be provided in the electrodes of both substrates. An MVA liquid crystal panel may be used which has alignment controlling projections on the surfaces of the electrodes of both the substrates.

Figure 37:
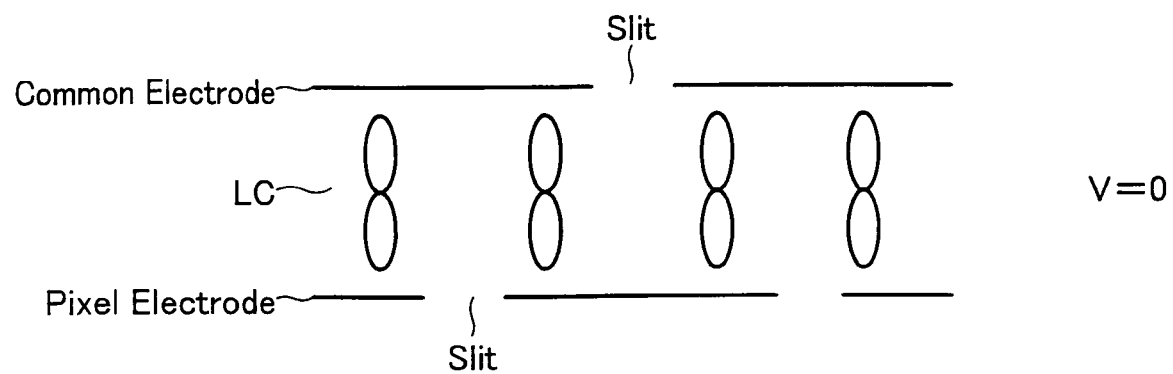
FIG. 37(a) is an illustration of a state where no voltage is being applied to electrodes in a PVA scheme.
FIG. 37(b) is an illustration of a state where voltage is being applied to electrodes in a PVA scheme.
Figure 37:
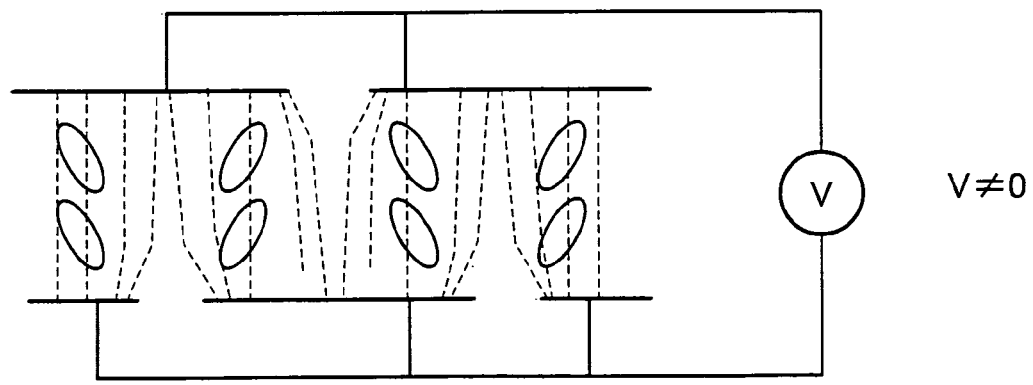

FIGS. 37(*a*), 37(*b*) are schematic cross-sectional views of electrodes for the substrates with slits, that is, a PVA (patterned vertical alignment) scheme. The alignment film is a vertical alignment film. The liquid crystal has negative dielectric anisotropy. FIG. 37(*a*) shows a state under zero application voltage; the liquid crystal is vertical. FIG. 37(*b*) shows a state under non-zero application voltage; the tilt direction of the liquid crystal is determined using an oblique electric field created by the slits in the electrodes. The angle of a polarizer in the PVA scheme is applicable like with MVA.

Besides the MVA type, a pair of vertical alignment films may be used which establish orthogonal pre-tilt directions (alignment treatment directions). Alternatively, VA mode in which liquid crystal molecules are twist-aligned may be used. VATN mode, mentioned earlier, may also be used. VATN mode is preferable in the present invention because contrast is not reduced by the light leaking through the alignment controlling projections. The pre-tilt is established by, for example, optical alignment.

Figure 7:
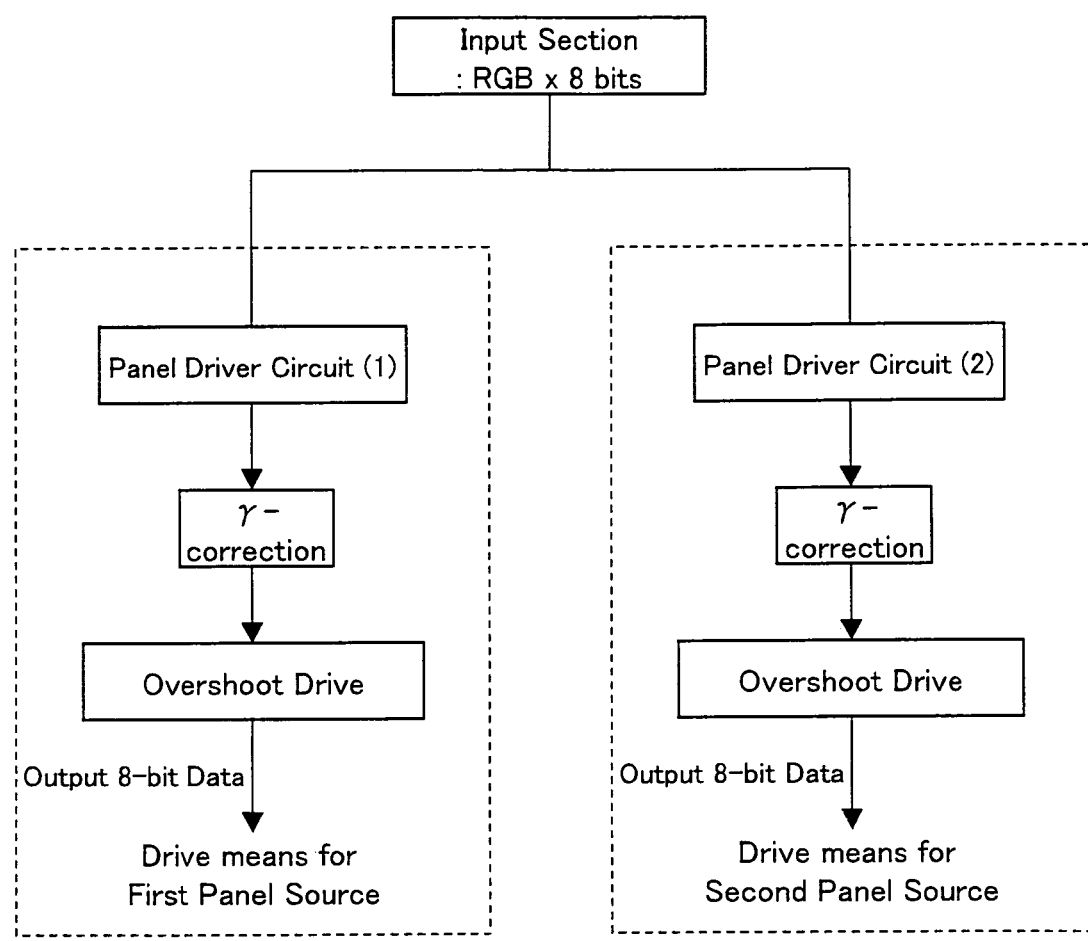
FIG. 7 is a block diagram of a display controller, a drive circuit which drives the liquid crystal display shown in FIG. 1.

Referring to FIG. 7, the following will describe a concrete example of a driving method implemented by the display controller of the liquid crystal display 100 constructed as above. Assume 8-bit (256 gray levels) inputs and 8-bit liquid crystal drivers.

The panel drive circuit (1) in the display controller section performs γ-correction, overshooting, and other drive signal processing on input signals (video source) to output 8-bit gray level data to a source driver (source drive means) for the first panel.

Meanwhile, the panel drive circuit (2) performs γ-correction, overshooting, and other signal processing to output 8-bit gray level data to a source driver (source drive means) for the second panel.

Both the first and second panels are able to handle 8-bit data; the resultant output is 8-bit images. The output and input signals have a one-to-one relationship. Input signals are faithfully reproduced.

According to patent document 7, when the gray level changes from a low to a high, the gray level on each panel does not increase continuously. For example, when the luminance increases from 0 to 1, 2, 3, 4, 5, 6, . . . , the gray levels on the first and second panels change from (0, 0) to (0, 1), (1, 0), (0, 2), (1, 1), (2, 0) . . . Thus, the gray level on the first panel changes from 0 to 0, 1, 0, 1, 2. The gray level on the second panel changes from 0 to 1, 0, 2, 1, 0. Neither gray levels increase monotonously. However, overdrive and many other signal processing technologies for liquid crystal displays require that gray level changes to be monotonous because the technologies use algorithm which involves interpolation calculations. To handle the non-monotonous changes, all the gray level data should be stored in memory. That may lead to increased circuit complexity and cost for display control circuitry and ICs.

If the output light from the second panel was absolutely entirely incident to a corresponding dot of the first panel, joining the first and second panels as described above would result in producing a display with no dot information being lost, hence no reduction in saturation. Actually, however, the distance between the two panels is not zero due to the presence of, for example, a glass substrate or a polarizer. In addition, the light emitted by the light source for the liquid crystal display is not completely parallel and spread. Light propagating obliquely from surroundings dots mixes. Therefore, the colors of surroundings dots mix, resulting in an achromatic color, when attempting to display a particular middle grayscale level. The phenomenon reduces saturation of particular middle grayscale levels.

Especially, when the second panel is a black and white panel, the saturation drops markedly because the panel itself does not have a color information display function.

The present invention will describe in the following embodiments measures of restraining reductions in saturation when two panels are stacked.

Embodiment 1

The present embodiment will describe a drive signal processing algorithm for two stacked liquid crystal display panels which causes no saturation reduction or oblique image displacement. For the convenience of description, suppose that there are 5×5 pixels and also that the image area for smoothing (M×N pixels=3×3 pixels).

(1) Obtain the maximum value of the RGB signals for each dot from input signals. FIG. 17 shows the gray levels for the pixels obtained that way.

(2) Next, give a maximum value for 3×3 dots to the pixel at the center. FIG. 18 shows the resultant values. Give peripheral pixels the value of an adjacent pixel as shown in FIG. 19. Calculate an average value for 3×3 pixels from the resultant values shown in FIG. 19 and give the average value to the pixel at the center of the 3×3 pixels as shown in FIG. 20. Give peripheral pixels the value of an adjacent pixel as shown in FIG. 21.

(3) Divide the full gray level (255 for 8 bit signals) by the value of each pixel in FIG. 21 and designate the quotient as the luminance extension ratio for a dot of a CF-equipped panel. Extend the luminance of the dot by the extension ratio.

(4) For a non-CF-equipped panel, input the reciprocal of the luminance extension ratio, in other words, the value shown in FIG. 21, to the dots.

In the example above, N=3; in practice, however, N is from 3 to 49. To reduce calculations, every two pixels may be skipped in the calculation of average values in step (2). Also, after step (2), the data may be subjected to a γ-correction.

In the present embodiment, smoothing is done by simple averaging; a different smoothing method may be employed provided that the maximum value for the RGB dots of a pixel does not fall below that value.

The processing does not change the luminance values of original signals and retains the chromaticity of the pixels. Hence, saturation does not decrease, and the luminance of the non-CF-equipped, lower panel parallel to the surface changes smoothly. Image displacement between the two panels becomes difficult to recognize visually when the panels are viewed from oblique angles.

Figure 22:
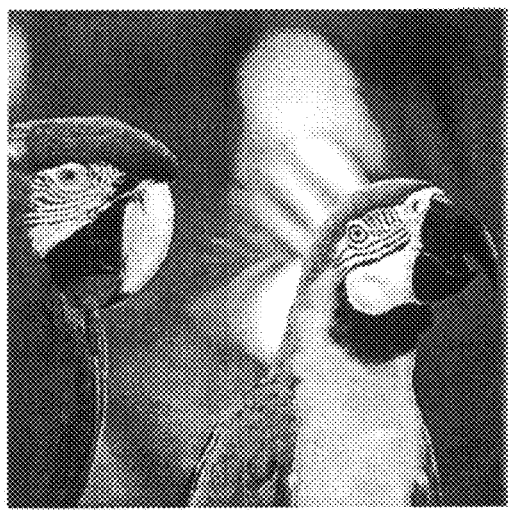
FIG. 22 is an illustration showing an example of a display produced from an original image signal.
Figure 23:
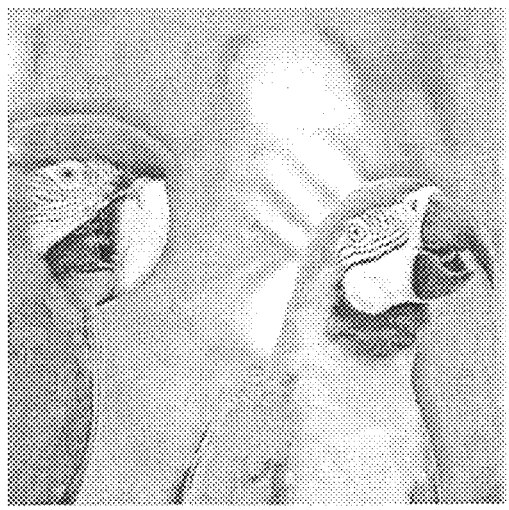
FIG. 23(a) is an illustration showing an example of a display produced on a panel equipped with a color filter from the original image signal shown in FIG. 22.
FIG. 23(b) is an illustration showing an example of a display produced on a panel equipped with no color filter from the original image signal shown in FIG. 22.
Figure 23:

FIG. 23(a) shows, as an example of the invention, an image produced on an upper panel after the above-mentioned signal conversion on the original signal image shown in FIG. 22. FIG. 23(b) shows, as an example of the invention, an image produced on a lower panel after the above-mentioned signal conversion on the original signal image shown in FIG. 22.

Embodiment 2

A method will be described, as another embodiment of the present invention, which eases saturation reduction caused by the γ value for the image data outputs of the first and second panels. Suppose in the present example that the first panel is a color panel and the second panel is a black and white panel. The invention is however equally effective if both panels are color panels.

EXAMPLES OF THE INVENTION

The γ value for a display device is given by $i = k \times E^{\gamma}$, where E is an input signal for a gray level, i is an output (luminance), and k is a constant. Therefore, $\log i = \log k + \gamma \cdot \log E$, and the γ value is the slope of a log·log graph.

Since γ for TV signals is specified to G=0.45, γ for display devices is typically $G_{out} \approx 2.2$. In practice, however, γ is rarely set to a constant value across the entire gray levels, but continuously varied from about 1.8 to about 2.6, in liquid crystal displays and other display devices due to black display where luminance is not zero and for the purpose of signal processing in saturation adjustment.

Consequently, γ does not give a single straight line, but a curved line, across the gray levels. γ is defined as the slope of the tangential line at each gray level point. In practical use, however, the slope of the tangential line is approximated by the slope of a straight line linking close gray level points (immediately adjacent gray level points).

Giving the γ value as a function G(x) of gray level x, the $\gamma_{out}$ value for an ultimate image data output is given by $$G(x) = G_1(x) + G_2(x),$$

where $G_1(x)$ is the $\gamma_1$ value for the image data output of the color panel, and $G_2(x)$ is the γ value for the image data output of the black and white panel. In the present invention, the $\gamma_{out}$ value, or G(x), is set, for at least one gray level X, so as to satisfy the relationships $G(x) = G_1(X) + G_2(X)$ and $G_1(X) > G_2(X)$.

Figure 24:
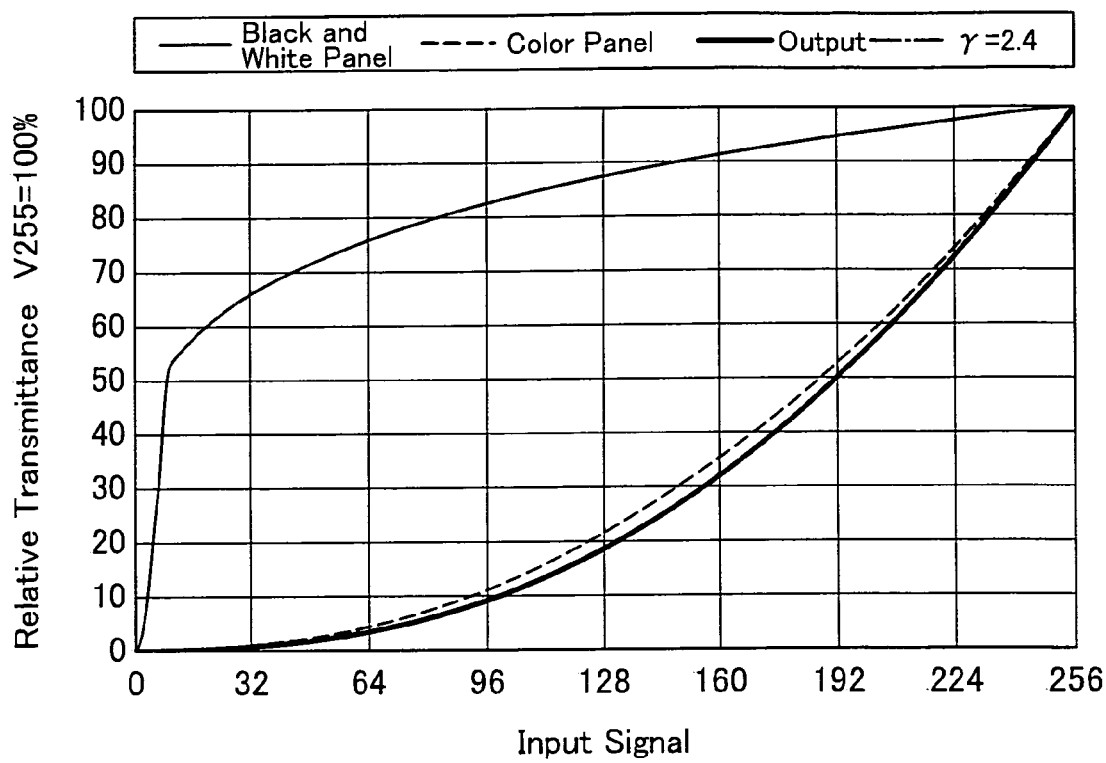
FIG. 24 is a graph representing gray level-luminance characteristics.
Figure 25:
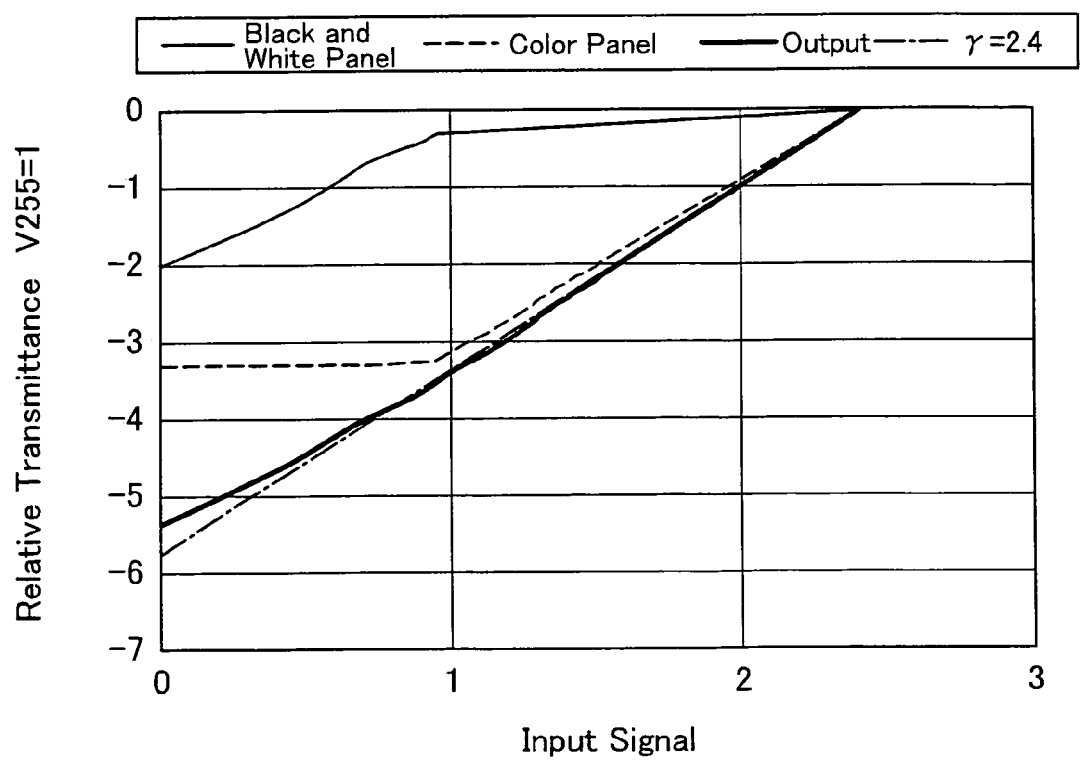
FIG. 25 is a logarithmic graph representing the gray level-luminance characteristics shown in FIG. 24.

Specifically,

In this example, the $\gamma_1$ value for the image data output of the color panel is $G_1(X) = 2.2$, and the $\gamma_2$ value for the image data output of the black and white panel is $G_2(x) = 0.2$, so that $\gamma_{out}$ of the output for a range of greater than or equal to about 10 gray levels (X>10) is about 2.4. For a range of less than or equal to about 10 gray levels ($X_2 < 10$), since the CR of the color panel alone is low, the $\gamma_1$ value for the image data output of the color panel is almost zero, hence $G_1(X_2) = 0$. By setting the $\gamma_2$ value for the image data output of the black and white panel for a range of less than or equal to about 10 gray levels, $G_2(x_2) \approx 1.7$, the $\gamma_{out}$ value for the image data output approximately equals 2.4 across the entire grayscale (see FIGS. 24, 25).

In this example, the settings are made so that the inequality, $G_1(X) > G_2(X)$, holds almost across an entire range of 10 or more gray levels. Saturation however does improve at any gray level X so long as the inequality, $G_1(X) > G_2(X)$, holds at least at that gray level. When that is the case, preferably, $G_1(X_3) = G_2(X_3)$ at the other gray levels $x_3$ in view of saturation improvement. Nevertheless, the inequality, $G_1(X_3) < G_2(X_3)$, may hold at some or all of the other gray levels because another saturation improving method, like the one described in example 1, may also be used together to improve the saturation.

Figure 26:
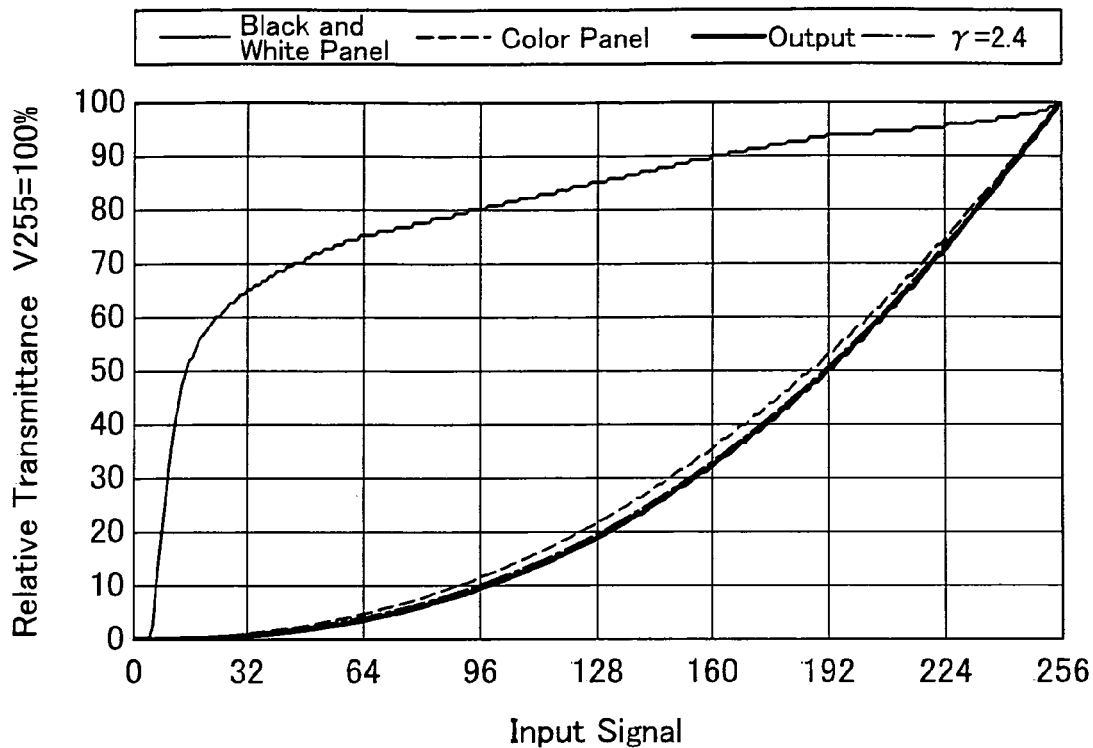
FIG. 26 is a graph representing gray level-luminance characteristics.
Figure 27:
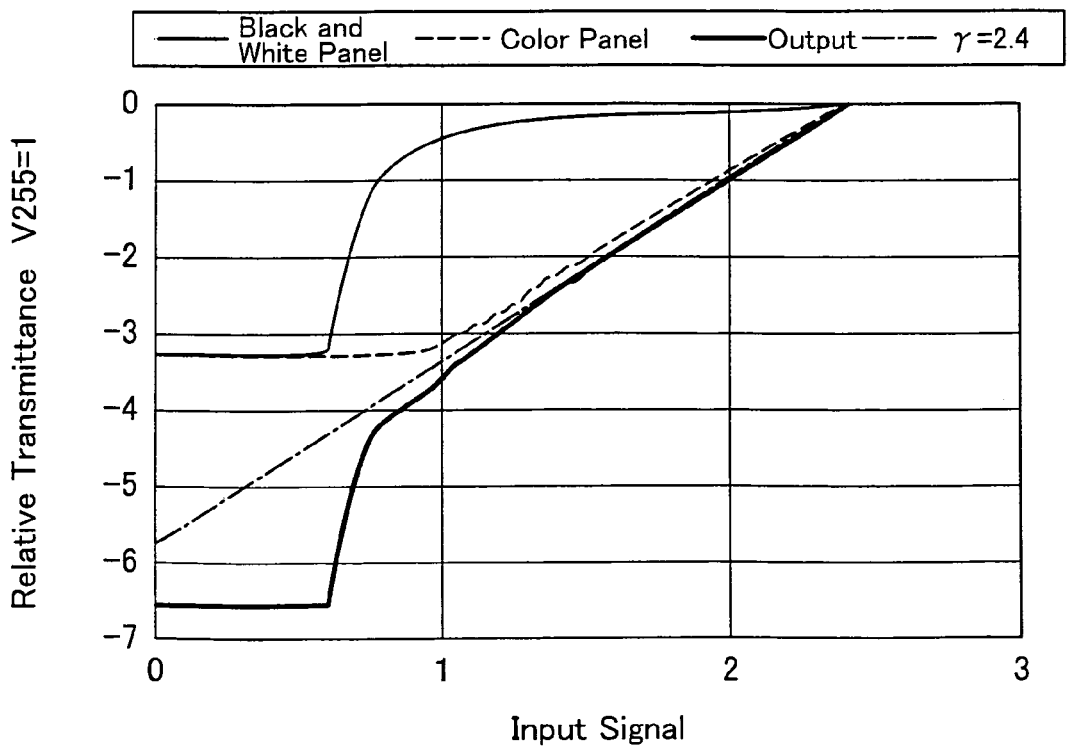
FIG. 27 is a logarithmic graph representing the gray level-luminance characteristics shown in FIG. 26.
Figure 38:
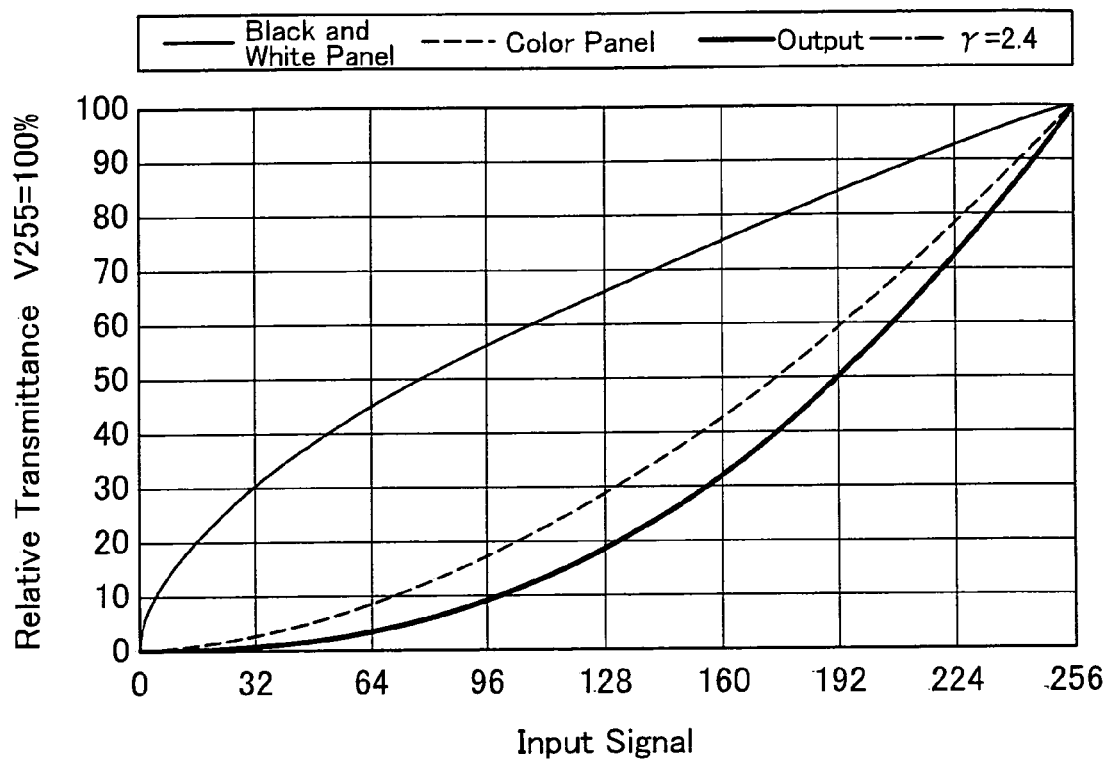
FIG. 38 is a graph representing gray level-luminance characteristics.
Figure 39:
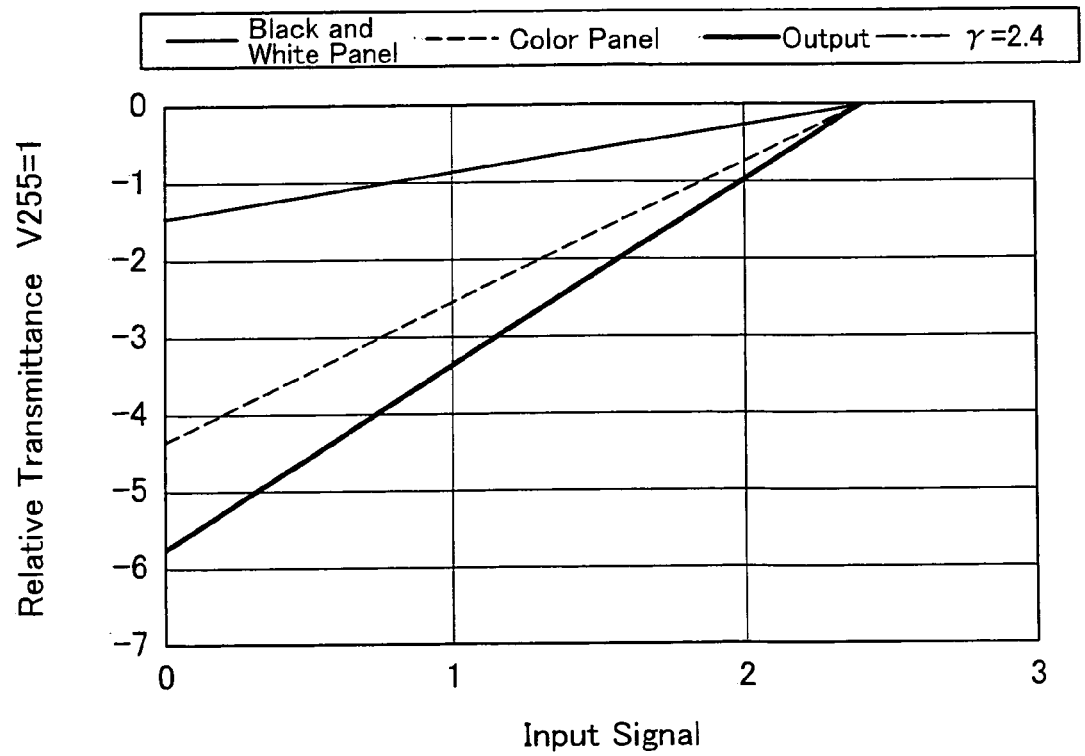
FIG. 39 is a logarithmic graph representing the gray level-luminance characteristics shown in FIG. 38.

The inequality, $G_1(X) > G_2(X)$, may of course hold at all gray levels as in FIGS. 38, 39.

γ for the black and white panel with a 10 or less gray level display capability may have an inflection point as shown in FIGS. 26, 27, in which cases images are produced with crisp blacks.

As described in the foregoing, by appropriately setting γ for the color panel and the black and white panel, liquid crystal displays are obtained, in which saturation decreases less, images no longer blur due to the parallax between the black and white panel and the color panel, and sufficient contrast is achieved.

These γ settings regulate an output image on the basis of an input signal. The settings are determined through measurement of the luminance and other parameters contained the image data output with respect to the input signal.

The input signal may be a video source or a display signal based on it.

The γ settings may be made by the controller for the liquid crystal panel, the circuit processing the output signal to the liquid crystal controller, or both.

Similar effects are achieved if an active γ technique is used together by which technique the γ value is varied depending on the input signal, provided that the first panel and the second panel satisfy the relationship detailed above.

The greater the $γ_1$ value for the image data output of the first panel, the more effects it produces. Saturation reduction is restrained to a practically sufficient level by setting $γ_1$ to 1.8 or greater.

Furthermore, if the data for the black and white panel have a gray level corresponding to a maximum gray level of the RGB signals, the foregoing effects are achieved, and good images are produced by preventing interference between the panels.

Furthermore, by subjecting the display signals for the black and white panel to smoothing, image displacement between the two panels becomes difficult to recognize visually when the panels are viewed from oblique angles.

Now, signal processing for the panel containing no color filter, that is, the black and white panel, will be described in more detail.

Figure 40:
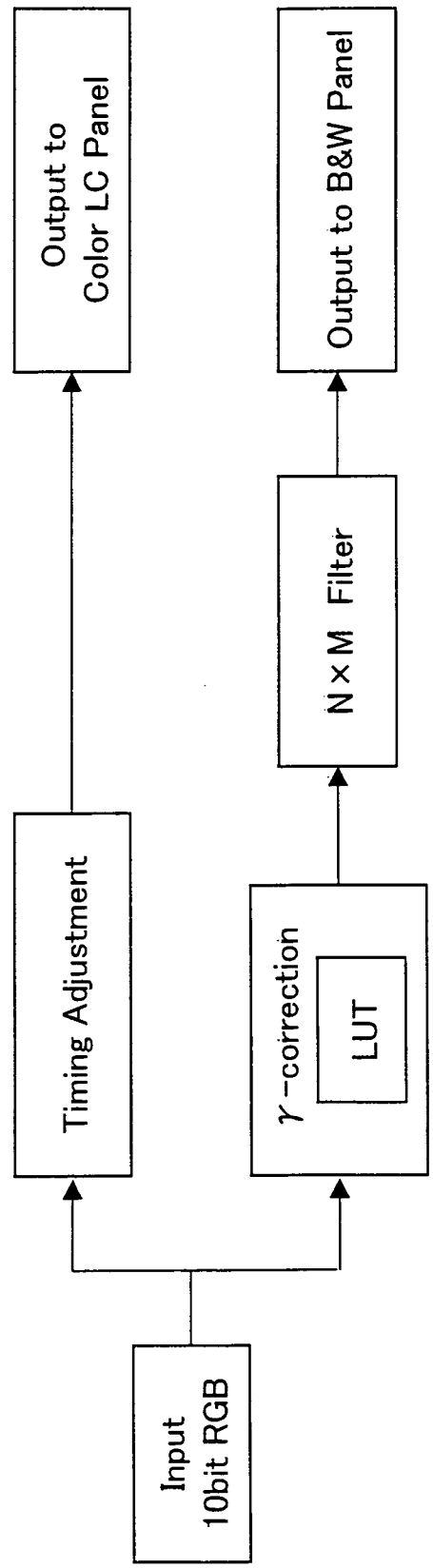
FIG. 40 is a block diagram for signal processing by a liquid crystal panel.
Figure 41:
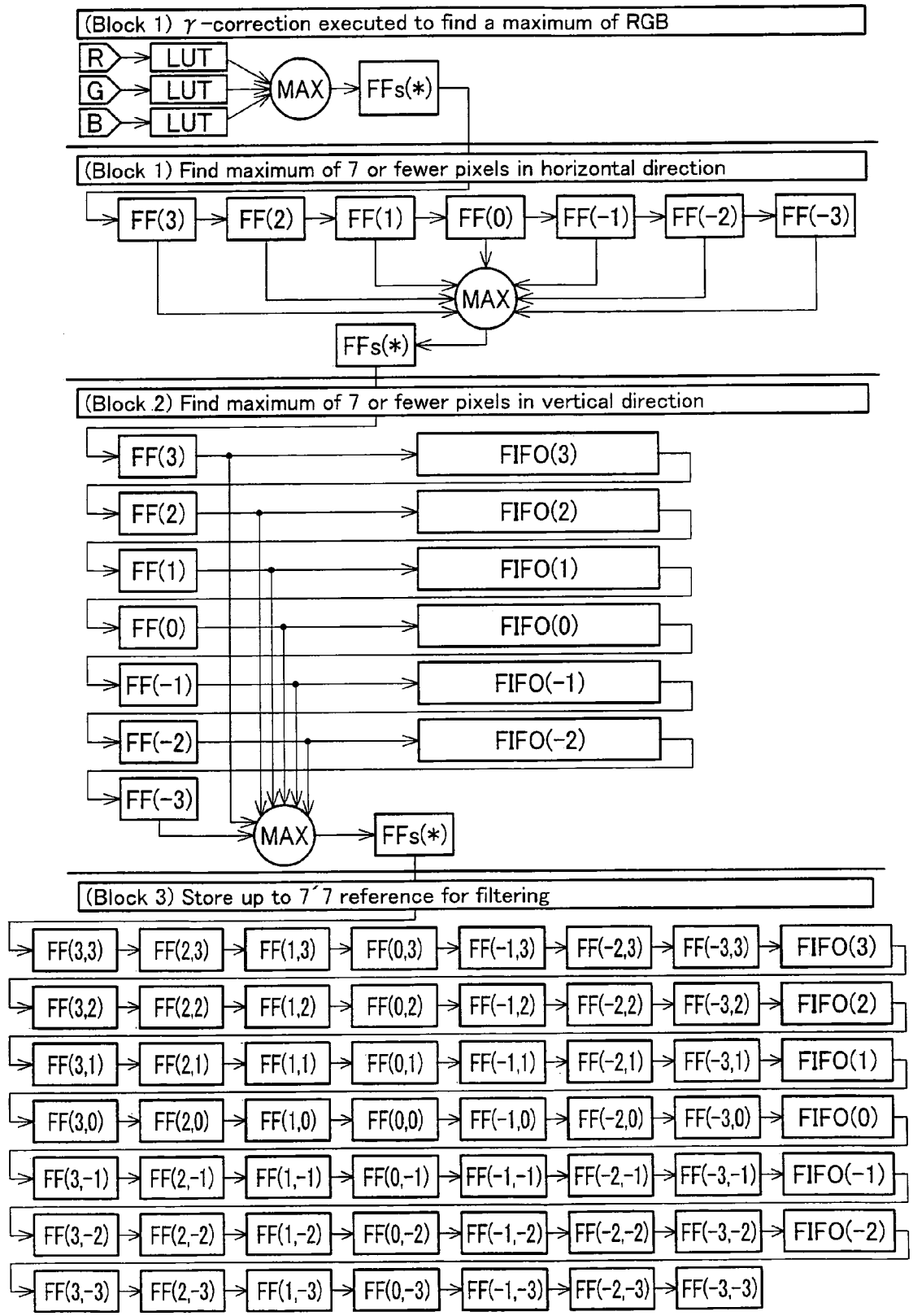
FIG. 41 is an illustration of flow diagram for data lines in the block diagram in FIG. 40.

FIG. 40 is a block diagram for the signal processing. Input signals described by the signal processing system are digital RGB signals. To handle a YPbPr TV signal, the signal is converted in advance to RGB signals. FIG. 41 is a flow diagram for data lines. The following description will be given in reference to the flow diagram.

First, input signals are γ-corrected. This is to render γ for output signals equal to the intended γ. The γ-correction is carried out by referring to a LUT. The gray levels given by the LUT need to have at least the same number of bits as the input signal. Typically, 10 bits (1024 gray levels) is needed for HD-SDI TV signals.

Next, a maximum value is found in each RGB set of data.

Next, smoothing is carried out. The size of the smoothing is determined in advance considering parallax Dparallax when viewed at an oblique angle.

Dparallax is given by the following equations:

$$D\text{parallax} = D\text{gap} \times \tan(\sin^{-1}(1/n) \times \sin(\theta))$$

where θ is an oblique angle, Dgap is the distance between the liquid crystal layer in the color liquid crystal panel and the liquid crystal layer in the black and white liquid crystal panel, and n is the average refractive index of the material in the gap. The maximum value of θ is 90°. Practically, θ needs to be no less than 45° to 60°. The actual smoothing distances DN, DM are decided so as to obtain a value close to the Dparallax calculated from the equation.

In the present example, Dgap is about 1.8 mm, and the refractive index n of the gap is 1.5. The Dparallax is 0.9 mm at a practically necessary angle of 45° and 1.4 mm at 60°. Since the pixel size is about 0.43 mm for a 37-inch full HD (resolution=1920×1080) of the present example, a 7×7 matrix (N=7, M=7) is used from one side 1.4 mm/0.43 mm≈3. Since the refractive index n is never less than 1.3 with current materials, the average $D_{ave}$ of $D_N$ and $D_M$ has a maximum value of 2.2 mm and is preferably less than or equal to this value.

Next, the algorithm by which is determined a value of a given pixel (xn, yn) starts with finding a maximum value in the matrix. In other words, the algorithm finds a maximum value for 7 pixels, xn−3 to xn+3. Then, a maximum is found for 7 pixels, yn−3 to yn+3. The values are registered in 7×7 matrix format, and an average of those values is designated a final value.

Here, a Gaussian distribution may be created by changing a computation filter table for average values.

That mitigates image displacement caused by dark parts of the black and white panel coming out of bright parts due to parallax.

Another preferred algorithm decides a maximum value $N_{MAX} \times M_{MAX}$ for an N×M matrix in advance, finds, for example, a difference $E_{NM}$ between a maximum gray level and a minimum gray level in a 5×5 matrix ($N_{MAX}=5$, $M_{MAX}=5$), and corrects smoothing size based on $E_{NM}$. In other words, if $E_{NM} \leq 10$, N=1, M=1; if $11 \leq E_{NM} \leq 100$, N=3, M=3; and if $101 \leq E_{NM}$, N=5, M=5. These values are recorded in registers as flags. The maximization and average are carried out on each of given pixels (xn, yn) using an N×M matrix. This processing reduces blurring attributable to smoothing.

In the process above, synchronization needs to be made with the color panel. However, signals are delayed by about 2 lines in the signal processing for the 5×5 matrix and by three lines in the signal processing for a 7×7 matrix. Thus, a corresponding delay is desirably introduced on the part of the color panel.

Figure 28:
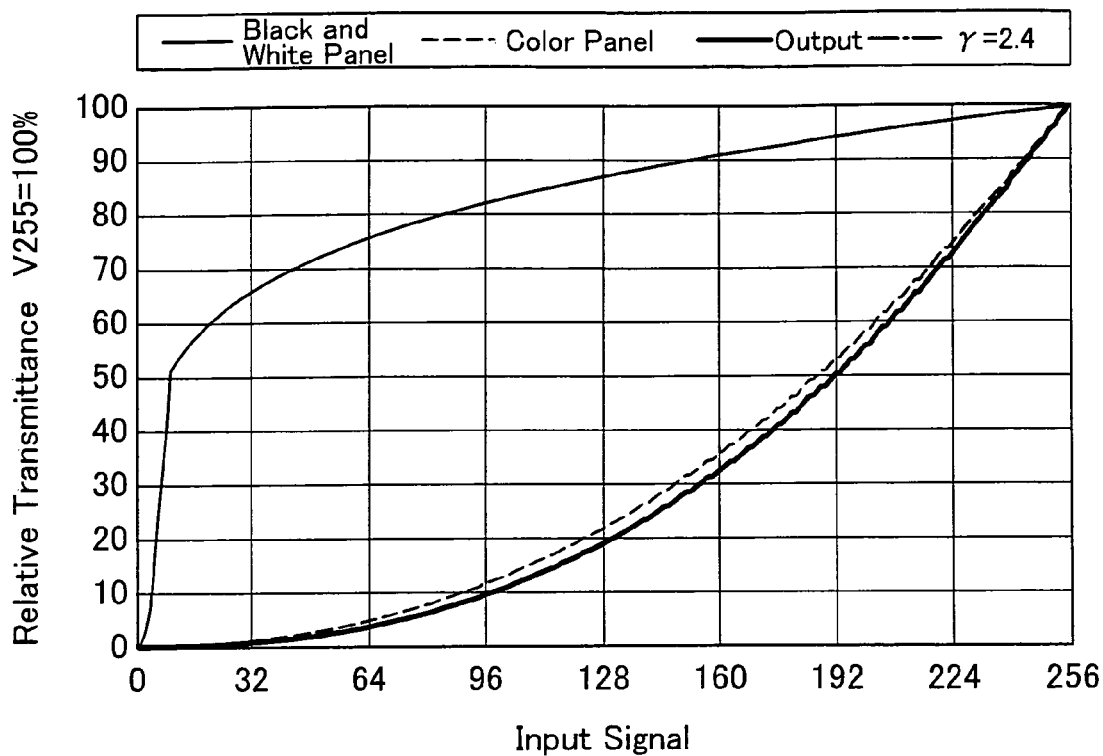
FIG. 28 is a graph representing gray level-luminance characteristics.
Figure 29:
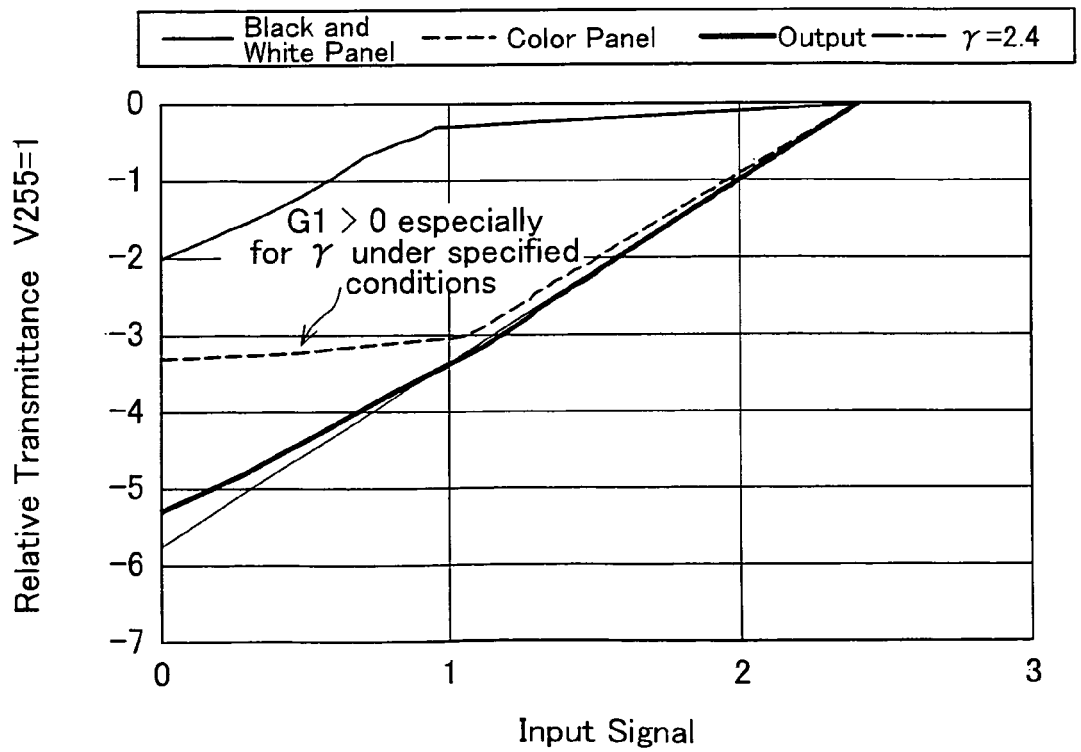
FIG. 29 is a logarithmic graph representing the gray level-luminance characteristics shown in FIG. 28.

By additionally setting the $γ_1$ value for the image output of the first panel so that $G_1(x) > 0$ across the gray levels, black crushing caused by finite contrast on the liquid crystal panel is corrected. That in turn produces images with a greater contrast feel (see FIGS. 28, 29).

As discussed in embodiment 3, 4 below, by additionally changing the spatial frequency of the display data for the color panel and the black and white panel, interference occurring between the panels is prevented. Consequently, the luminance value of the original signal is retained, and the chromaticity of each pixel is preserved. Hence, saturation does not decrease, and the luminance of the non-CF-equipped, lower panel parallel to the surface changes smoothly. Image displacement between the two panels becomes difficult to recognize visually when the panels are viewed from oblique angles.

Embodiment 3

Figure 31:
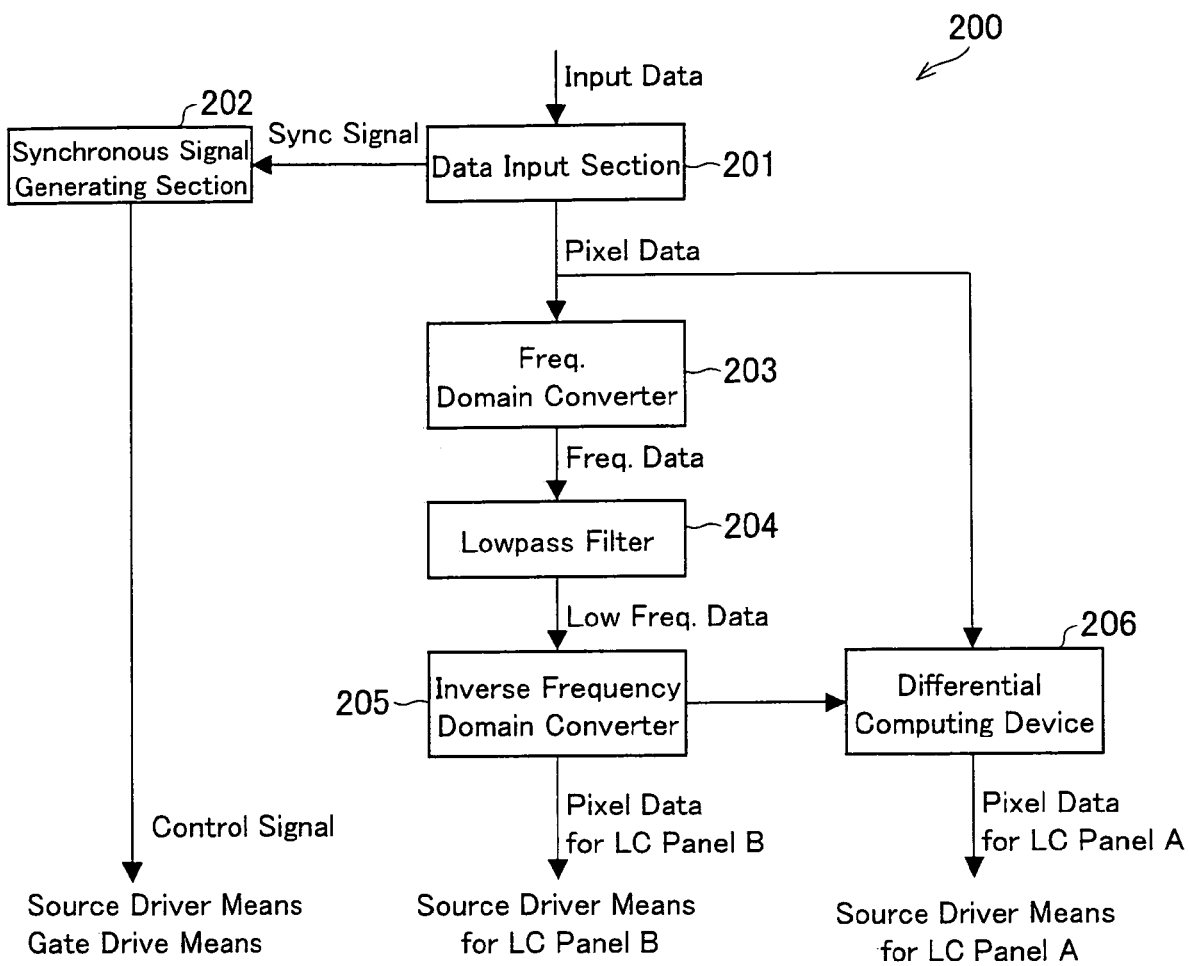
FIG. 31 is a block diagram of a display controller implementing the anti-moire scheme illustrated in FIG. 30.

The following will describe another embodiment of the present invention in reference to FIGS. 30 and 31. The first panel is liquid crystal panel A, and the second panel is liquid crystal panel B.

Two liquid crystal panels are stacked on top of one another for use as shown in FIG. 30(a). Assume that the resolution of liquid crystal panel B is lower than the resolution to be displayed.

Interference occurs between liquid crystal panel A and liquid crystal panel B because the liquid crystal panels contain fine pixels as shown in FIG. 30(*b*). The interference causes moire patterns.

Accordingly, the spatial frequency of the display data for liquid crystal panels A and B are changed as shown in FIG. 30(*c*) so as to eliminate interference between liquid crystal panels A and B. That reduces moire patterns caused by the interference.

The control shown in FIG. 30(*c*) is implemented as follows.
(1) Convert input data to spectral data through DCT, FFT, etc.
(2) Divide into low frequency components using lowpass filters.
(3) Convert the low frequency components back to original spatial data using inverse DCT, inverse FFT, etc. to produce a display on liquid crystal panel B. To accommodate the low resolution, skip a number of samplings of data.
(4) because display data for pixels is the display on liquid crystal panel A×the display on liquid crystal panel B Through these procedures, the display on liquid crystal panel A is determined from the difference between display data and the display on liquid crystal panel B.

The description above is based on one dimensional data. The display on the liquid crystal panel is two dimensional, and the actual display is produced from two dimensional data.

Specific control is implemented by a display controller 200 containing, for example, a data input section 201, a synchronous signal generating section 202, a frequency domain converter 203, a lowpass filter 204, an inverse frequency domain converter 205, and a differential computing device 206 as shown in FIG. 31.

The data input section 201 separates input data to a synchronous signal and pixel data for individual pixels. The section 201 is arranged to supply the synchronous signal to the succeeding stage, or the synchronous signal generating section 202, and supply the pixel data to the succeeding stages, or the frequency domain converter 203 and the differential computing device 206.

The synchronous signal generating section 202 generates, from the synchronous signal from the data input section 201, control signals by which source drive means and gate drive means are controlled.

For example, the following three control signals are generated to control the source drive means: a source start pulse, a source latch pulse, and a source clock.

The following two control signals are generated to control the gate drive means: a gate start pulse and a gate shift clock.

The frequency domain converter 203 is arranged to convert the pixel data from the data input section 201 to spatial frequency data and supply the spatial frequency data to the succeeding stage, or the lowpass filter 204. The frequency domain conversion is typically done by two-dimensional FFT conversion, two-dimensional DCT conversion, etc.

The lowpass filter 204 is arranged to filter the frequency data from the frequency domain converter 203, passing only low frequency data, and supply the low frequency data to the succeeding stage, or the inverse frequency domain converter 205.

The inverse frequency domain converter 205 is arranged to inverse convert the low frequency data (opposite to the frequency domain converter 203), supplying the data after the inverse conversion as pixel data for liquid crystal panel B to the source drive means for the liquid crystal panel B and the differential computing device 206.

The inverse frequency domain converter 205 carries out, as the inverse frequency conversion, inverse two-dimensional FFT conversion, inverse two-dimensional DCT conversion, etc. A number of sampling points of data are skipped to match the pixels in liquid crystal panel B.

The differential computing device 206 is arranged to compute differences between data from the data input section 201 (raw data) and the data for liquid crystal panel B from the inverse frequency domain converter 205, correct pixel data for liquid crystal panel A so that the display becomes original data, and supply the pixel data after the correction to the source drive means for liquid crystal panel A.

As described in the foregoing, in the present embodiment, the interference between the two panels is prevented by changing the spatial frequency of display data. Thus, a drive signal processing algorithm is provided which reduces saturation and which does not cause oblique image displacement.

Embodiment 4

Figure 33:
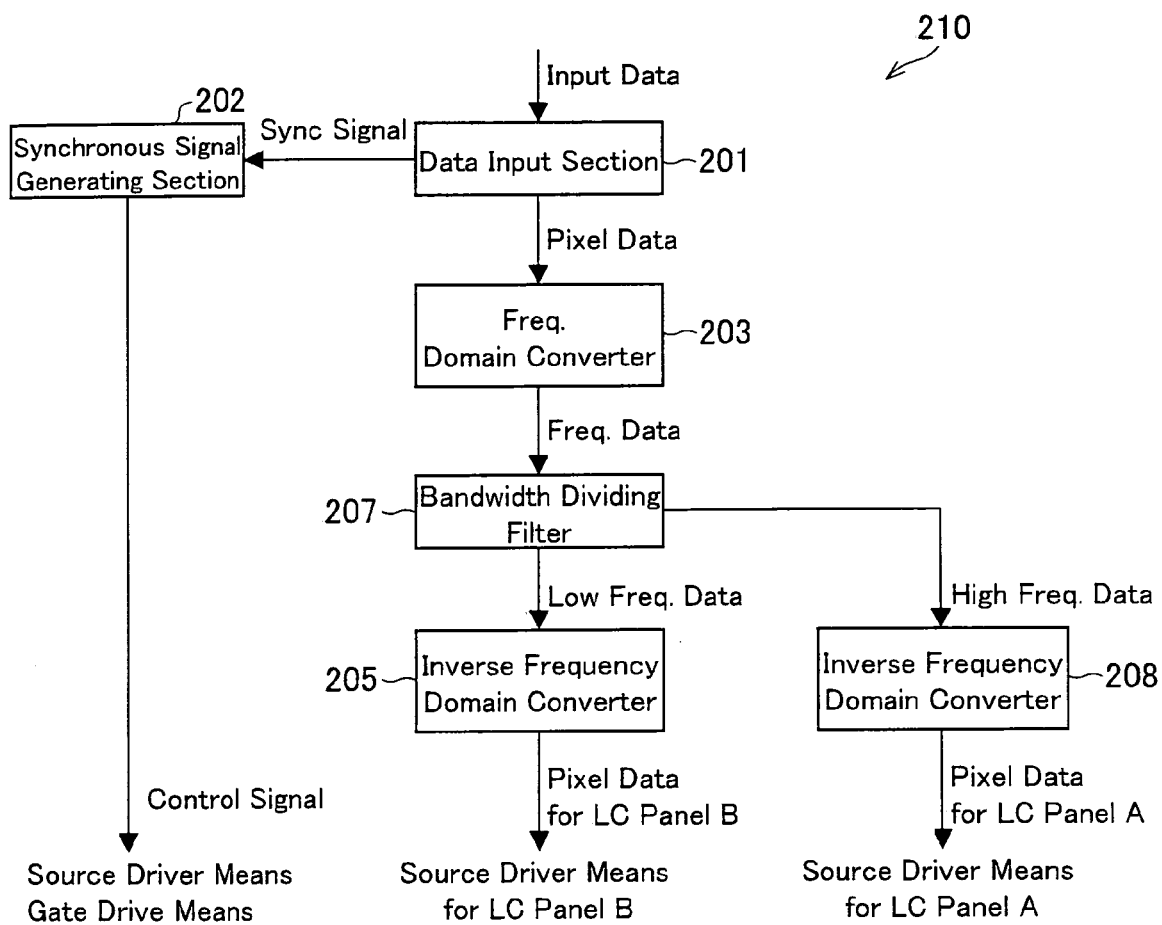
FIG. 33 is a block diagram of a display controller implementing the anti-moire scheme illustrated in FIG. 32.

The following will describe another embodiment of the present invention in reference to FIGS. 32 and 33. The first panel is liquid crystal panel A, and the second panel is liquid crystal panel B.

Two liquid crystal panels are stacked on top of one another for use as shown in FIG. 32(*a*). Assume that the two liquid crystal panels have an equal resolution.

As shown in FIG. 32(*b*), the liquid crystal panels have pixels so fine that interference occurs between liquid crystal panel A and liquid crystal panel B which in turn causes moire.

Accordingly, the spatial frequencies of the display data for liquid crystal panels A and B are changed as shown in FIG. 32(*c*) so as to eliminate interference between liquid crystal panels A and B. The change reduces moire caused by the interference.

The control shown in FIG. 32(*c*) is implemented as follows.
(1) Convert input data to spectral data through DCT, FFT, etc.
(2) Divide into high frequency components and low frequency components using dividing filters.
(3) Convert the high frequency components back to original spatial data through inverse DCT, inverse FFT, etc. for a display on liquid crystal panel A.
(4) Convert the low frequency components back to original spatial data through inverse DCT, inverse FFT, etc. for a display on liquid crystal panel B.

Through these procedures, the display on liquid crystal panel A is determined from the difference between display data and the display on liquid crystal panel B.

The description above is based on one dimensional data. The display on the liquid crystal panel is two-dimensional, and the actual display is produced from two-dimensional data.

Specific control is implemented by a display controller 210 containing, for example, a data input section 201, a synchronous signal generating section 202, a frequency domain converter 203, a bandwidth dividing filter 207, an inverse frequency domain converter 205, and an inverse frequency domain converter 208 as shown in FIG. 33.

The data input section 201 separates input data to a synchronous signal and pixel data for individual pixels. The section 201 is arranged to supply the synchronous signal to the succeeding stage, or the synchronous signal generating section 202, and supply the pixel data to the succeeding stage, or the frequency domain converter 203.

The synchronous signal generating section 202 generates, from the synchronous signal from the data input section 201, control signals by which source drive means and gate drive means are controlled.

For example, the following three control signals are generated to control the source drive means: a source start pulse, a source latch pulse, and a source clock.

The following two control signals are generated to control the gate drive means: a gate start pulse and a gate shift clock.

The frequency domain converter 203 is arranged to convert the pixel data from the data input section 201 to spatial frequency data and supply the spatial frequency data to the succeeding stage, the bandwidth dividing filter 207. The frequency domain conversion is typically done by two-dimensional FFT conversion, two-dimensional DCT conversion, etc.

The bandwidth dividing filter 207 is arranged to divided data into high frequency components and low frequency components, supplying the low frequency data to the inverse frequency domain converter 205 connected to the source drive means for liquid crystal panel B and the high frequency data to the inverse frequency domain converter 208 connected to the source drive means for liquid crystal panel A.

If the frequency data is simply divided into two sets of components, a lowpass filter and a highpass filter may be used.

The bandwidth dividing filter, as opposed to lowpass and highpass filters, is capable of dividing data into a plurality of frequency ranges and hence advantageously compatible for each set of panels.

The inverse frequency domain converter 205 is arranged to inverse convert the low frequency data (opposite to the frequency domain converter 203), supplying the data after the inverse conversion as pixel data for liquid crystal panel B to the source drive means for liquid crystal panel B.

The inverse frequency domain converter 208 is arranged to inverse convert the high frequency data (opposite to the frequency domain converter 203), supplying the data after the inverse conversion as pixel data for liquid crystal panel A to the source drive means for liquid crystal panel A.

The inverse frequency domain converters 205, 208 carry out, as the inverse frequency conversion, inverse two-dimensional FFT conversion, inverse two-dimensional DCT conversion, etc.

As described in the foregoing, in the present embodiment, the interference between the two panels is prevented by changing the spatial frequency of display data. Thus, a drive signal processing algorithm is provided which reduces saturation and which does not cause oblique image displacement.

Embodiment 5

The following will describe another embodiment of the present invention in which reduction in saturation caused by a panel is restrained.

In this example, reduction in saturation is restrained by using as the first panel a liquid crystal panel which works in normally black mode. An image may be mixed with ambient light, lowering saturation, in the second panel; resulting excessive intensity of low gray levels, hence reduction in saturation, is restrained by using as the first panel a normally black panel with high contrast.

At the same time, the same γ-correction as in embodiment 2 is also carried out to produce a large γ for the first panel, which in turn produces images with a greater contrast feel. VA (vertical alignment) mode, IPS (in-plain switching) mode, and FFS (fringe field switching) mode are a few examples of normally black panels with high contrast.

Now, MVA mode used preferably in the present invention will be described in detail.

Figure 42:
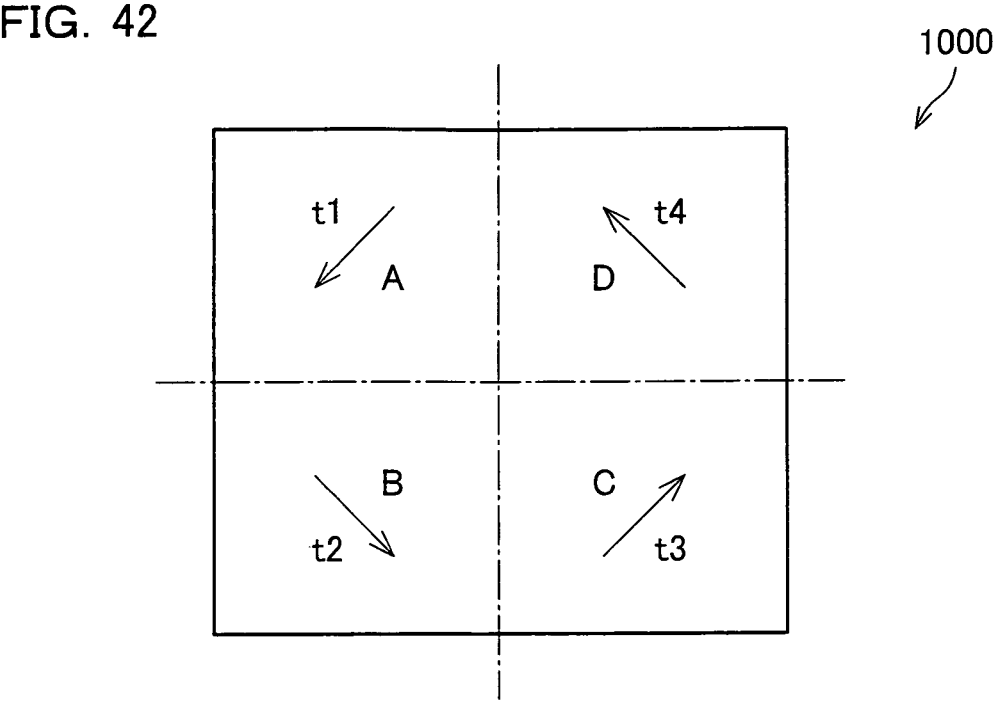
FIG. 42 is an illustration of a relationship between domains in an MVA mode.

A pixel region 1000 shown in FIG. 42 is divided into four segments. FIG. 42 shows the pixel region 1000 corresponding to a substantially square pixel electrode for the sake of simplicity. However, the present invention is by no means limited by the shape of pixel regions.

The pixel region 1000 contains four domains A, B, C, and D of liquid crystal. Each domain has a different tilt direction (reference alignment direction) denoted by t1, t2, t3, and t4 in the figure. The difference between any given pair of the tilts is substantially equal to an integral multiple of 90°. The domains A, B, C, and D have equal areas. They provide an example of optimal 4-segment structure in terms of viewing angles performance. The four domains form a 2×2 matrix.

The VA liquid crystal layer, taken as an example in this embodiment, contains a nematic liquid crystal material with negative dielectric anisotropy. An alignment film is provided on each side of the liquid crystal layer. There is about a 90° difference between the pre-tilt direction furnished by one of the alignment films and the pre-tilt direction furnished by the other alignment film. The tilt angle (reference alignment direction) is set to halfway between the two pre-tilt directions. No chiral agent is added. When a voltage is applied to the liquid crystal layer, the liquid crystal molecules in the neighborhood of the alignment film are twisted by alignment controlling force of the alignment film. Chiral agents may be added where necessary. This particular type of VA mode in which a pair of vertical alignment films, which gives orthogonal pre-tilt directions (alignment processing directions), is used to twist the liquid crystal molecule is sometimes called VATN (Vertical Alignment Twisted Nematic) mode.

The pre-tilt direction refers to the alignment direction of a liquid crystal molecule imparted by an alignment film, in particular, the azimuth in the display plane. In this situation, the angle between the liquid crystal molecule and the surface of the alignment film is termed the pre-tilt angle. The pre-tilt direction is defined by rubbing or optically treating the alignment film. A combination of two alignment films, disposed across the liquid crystal layer, which define different pre-tilt directions enables the construction of the 4-segment structure. The pixel region, divided into four segments, has four liquid crystal domains (or simply "domains"). Each liquid crystal domain defines a distinct tilt direction (or "reference alignment direction") of liquid crystal molecules near the center of the liquid crystal layer with respect to the in-plane and thickness directions when a voltage is applied to the liquid crystal layer. The tilt direction (reference alignment direction) dominantly affects the viewing angles dependence of the domain.

The tilt direction is expressed in its azimuth. The azimuth is referenced to the horizontal direction of the displayed image and measured anticlockwise (comparing the display plane to the face of a clock, the 3 o'clock direction is the 0° azimuth; the anticlockwise rotation is positive). The viewing angle performance is averaged out for good display by setting the tilt directions of the four liquid crystal domains so that the difference between any given pair of the tilt directions is substantially equal to an integral multiple of 90° (for example, 12, 9, 6, and 3 o'clock directions, although not consistent with FIG. AA). In addition, in view of uniform viewing angle performance, the four liquid crystal domains preferably occupy substantially equal areas in the pixel region. Specifically, the difference between the largest and smallest of the four liquid crystal domains is preferably 25% or less of the largest one.

The alignment film comes to be able to define pre-tilt directions for liquid crystal molecules by, for example, rubbing or optical treatment. Other known methods include transferring fine structures formed in advance on the bed of the alignment film to the surface of the alignment film and forming fine structures on the surface of the alignment film by oblique vapor deposition of SiO or a like inorganic substance. Rubbing and optical treatment are favorable in view of mass production capability. Optical treatment is especially preferred because it is a non-contact process; unlike rubbing, it involves no friction, hence no electrostatic charge, and provides a better yield. Use of an optical alignment film containing a photosensitive group lowers the irregularities of the pre-tilt angle within 1° or less. The photosensitive group is preferably at least one of photosensitive groups of the 4-chalcone group, the 4'-chalcone group, the coumarin group, and the cinnamoyl group.

IPS mode will be described next.

Figure 43:
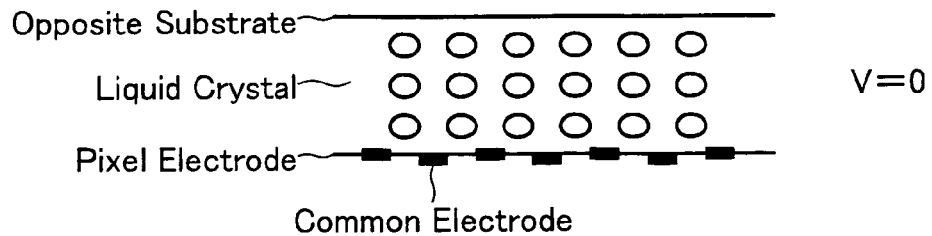
FIG. 43(a) is a schematic cross-sectional view illustrating an IPS mode.
FIG. 43(b) is a schematic cross-sectional view illustrating an IPS mode.
FIG. 43(c) is a schematic plan view of a pixel for an IPS mode.
FIG. 43(d) is a schematic plan view of a pixel for an IPS mode.
Figure 43:
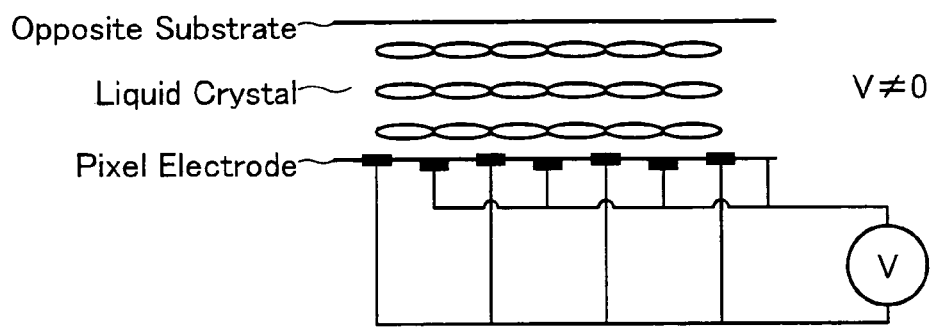
Figure 43:
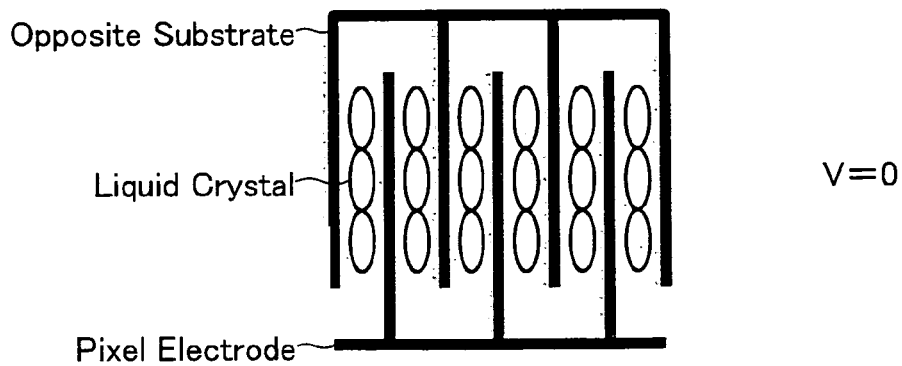
Figure 43:
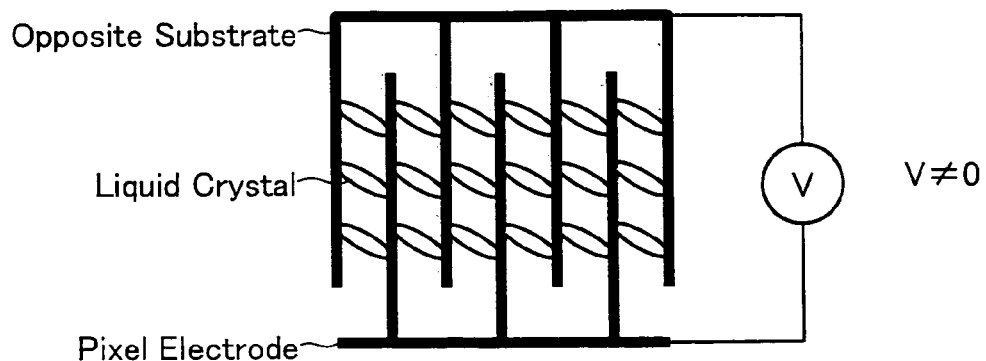

In IPS mode, an electric field parallel to the substrates is applied to rotate liquid crystal in planes parallel to the substrates. FIGS. 43(a) to 43(d) are schematic diagram of IPS mode. FIGS. 43(a), 43(b) are schematic cross-sectional views, and FIGS. 43(c), 43(d) are schematic plan views of pixels. In IPS, a horizontal alignment film and ordinary liquid crystal with positive dielectric anisotropy are used.

FIGS. 43(a), 43(c) show a state under zero applied voltage. The liquid crystal aligns along the rubbing direction of the horizontal alignment film (not shown).

FIGS. 43(b), 43(d) show a state under non-zero applied voltage. Electrodes, arranged like comb teeth, create horizontal electric fields which rotate the alignment direction of the liquid crystal in a horizontal plane.

Unlike other modes, the opposite substrate has no electrodes. The polarizers, one on each substrate, are disposed at 0° and 90° with respect to the rubbing direction. Variations of the IPS mode are also possible. For example, the electrodes may be slightly bent around the middle. Another variation is FFS mode in which upper and lower electrodes are disposed across an insulating film with the lower flat electrodes in pixels to generate a fringe field.

Embodiment 6

The present embodiment will describe use of polarizer performance (polarizing capability) to improve contrast.

The inventors have found from results of experiments that even if the polarizers positioned to form crossed Nicols have the same polarizing capability, the effects of the polarizers on improvement of contrast, that is, the amount of leaking light from the crossed Nicols, are not uniform. Polarizing capability is an indicator for polarizing capability (capability to produce linearly polarized light) and given by the following equation:

$$P(\text{polarizing capability}) = \sqrt{\{(Tp-Tc)/(Tp+Tc)\}} \times 100 \, (\%)$$

where Tp is a parallel transmittance, and Tc is a cross transmittance.

Polarizing capability generally increases with increasing polarizer thickness.

Figure 44:
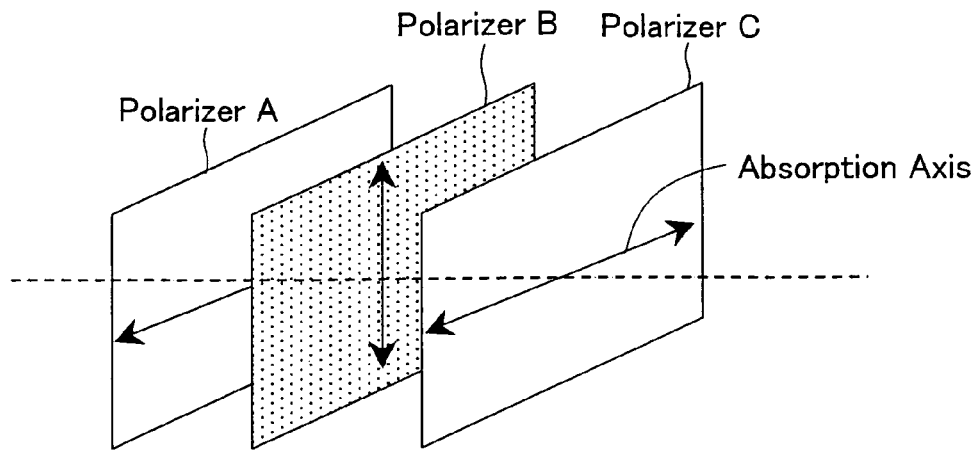
FIG. 44(a) is an illustration of an example layout of polarizers with which polarizing capability improvement is achieved to lower leakage from crossed Nicols.
FIG. 44(b) is an illustration of another example layout of polarizers with which polarizing capability improvement is achieved to lower leakage from crossed Nicols.
Figure 44:
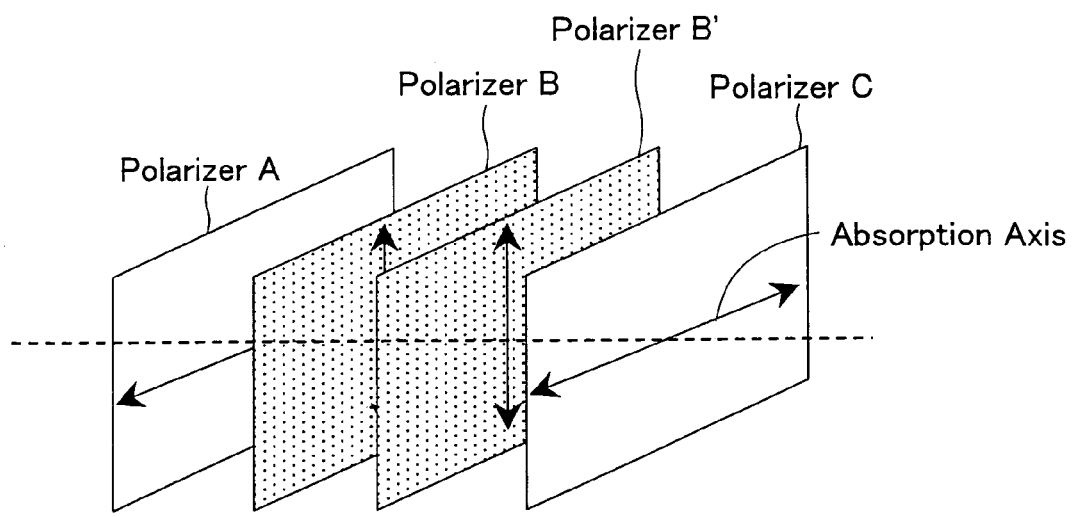
Figure 45:
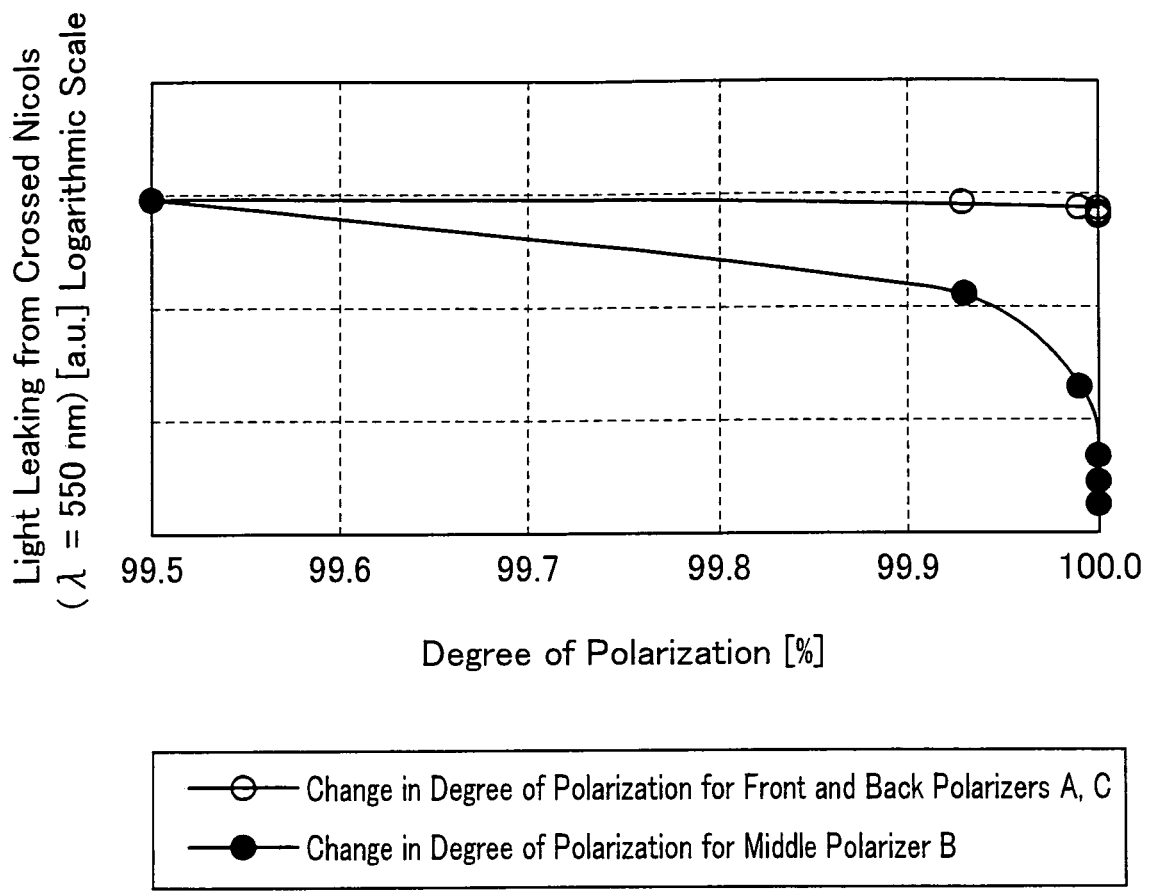
FIG. 45 is a graph representing a relationship between polarizing capability and leakage from crossed Nicols.

For example, three polarizers (polarized light absorbing layers) A, B, C are arranged so that each adjacent pair of polarizers forms crossed Nicols as shown in FIG. 44(a). FIG. 45 is a graph representing computed amounts of leaking light from crossed Nicols under the two sets of conditions below.

Set of Conditions 1: The thicknesses of polarizers A, C are changed, whilst the thickness of polarizer B is fixed.

Set of Conditions 2: Only the thickness of polarizer B is changed, whilst the thicknesses of polarizers A, C are fixed.

The graph in FIG. 45 shows the polarizing capability (%) on the horizontal axis and the amount of leaking light from crossed Nicols (crossed Nicols leakage: wavelength=550 nm) on the vertical axis. The graph demonstrates that under set of conditions 1, the crossed Nicols leakage changes little with an increase in the thicknesses of polarizers A, C and also that under set of conditions 2, the crossed Nicols leakage decreases with an increase in the thickness of polarizer B. It would be appreciated that the crossed Nicols leakage depends largely on the thickness of polarizer B which is positioned in the middle.

Therefore, when three polarizers (polarized light absorbing layers) A, B, C are arranged as shown in FIG. 44(a), the polarizing capability is increased by increasing the thickness of polarizer B located in the middle, which in turn lowers crossed Nicols leakage and enables the reproduction of deep blacks. As a result, contrast is further improved.

There is a tradeoff between the polarizing capability and transmittance of a polarizer. An excessively high polarizing capability leads to decreases in transmittance. Striking a good balance between the polarizing capability and transmittance enables improvements in contrast while restraining decreases in transmittance to a minimum.

The polarizing capability is improved by increasing the thickness of the polarizer. This is by no means limiting. Alternatively, the middle polarizer may be replaced with a double polarizer structure (polarizers B, B') as shown in FIG. 44(b) without significantly affecting effects. In the structure, the two middle polarizers are positioned so that their absorption axes are parallel. Two or more polarizers may be substituted for the middle polarizer provided that their absorption axes are parallel.

Generally, a polarizer is made of a polarizer element to which iodine is adsorbed. If iodine adsorption is not uniform, the polarizer may cause irregular color density in black display (hereinafter, "irregular polarizer element coloring").

Increasing the polarizing capability of a polarizer as mentioned earlier is one method of lowering irregular polarizer element coloring. Table 2 shows relationships between irregular polarizer element coloring, relative polarization performance, and contrast in the polarizer structure shown in FIGS. 44(a), 55(b).

TABLE 2

| Relative polarization performance | | Degree of polarization (%) | Contrast | Irregular coloring |
|---|---|---|---|---|
| A = B = C | A | 99.993 | 20,000:1 | Poor: |
| | B | 99.993 | | Noticeable |
| | C | 99.993 | | |
| A = B < C | A | 99.993 | 40,000:1 | Fair: |
| | B | 99.997 | | Slightly |
| | C | 99.993 | | noticeable |
| A = C < B + B' (double layer) | A | 99.993 | 200,000:1 | Very good: |
| | B | 99.997 | | Unnoticeable |
| | B' | 99.993 | | |
| | C | 99.993 | | |

Table 2 demonstrates that when all polarizers A, B, C had the same polarization performance (polarizing capability) of 99.993%, the contrast was 20,000:1. Irregular polarizer element coloring was clearly observed.

Accordingly, the polarizing capability of polarizer B located in the middle was set to 99.997%, and those of remaining polarizers A, C to 99.993% as shown in FIG. 44(a). The resultant contrast was 40,000:1. This represents an improvement over the polarizers sharing the same polarizing capability; however, a low degree of irregular polarizer element coloring was observed.

A double polarizer structure (polarizers B, B') was substituted for the middle polarizer as shown in FIG. 44(b). The polarizing capability of polarizer B was set to 99.997%, and those of remaining polarizers A, B', C to 99.993%. The resultant contrast was 200,000:1. This represents a great improvement in contrast; no irregular polarizer element coloring was observed at all.

As described in the foregoing, a double middle polarizer structure enables improvement in contrast and elimination of irregular polarizer element coloring, which contributes to display quality improvement.

Therefore, in a liquid crystal display containing: two or more liquid crystal panels stacked, a light diffusion layer having light diffusing properties provided on at least one of the liquid crystal panels, and polarized light absorbing layers positioned to form crossed Nicols sandwiching the liquid crystal panels, contrast is further improved by incorporating the following structure.

Of polarizers A, B, C (polarized light absorbing layers) positioned to form crossed Nicols, crossed Nicols leakage is lowered by setting the polarizing capability of internal polarizer B than the polarizing capability of external polarizers A, C to at least a predetermined value or greater. In this case, the predetermined value is preferably as close to 100% as possible and determined in relation with transmittance.

The polarizing capability of polarizer B is preferably set to a value higher than the polarizing capability of other polarizers A, C.

The polarizing capability may be improved by increasing the thickness of polarizer B. In that case, polarizer B is preferably thicker than other polarizers A, C.

Alternatively, the polarizing capability may be improved by using two polarizers B, B' (double polarizer structure). In that case, polarizers B, B' may have the same polarizing capability or different polarizing capabilities.
Polarizers B, B' may have the same polarizing capability as other polarizers A, C. The two middle polarizers may be replaced with three or more polarizers. The number of polarizers stacked may be suitably, determined in connection with transmittance.

Embodiment 7

Figure 34:
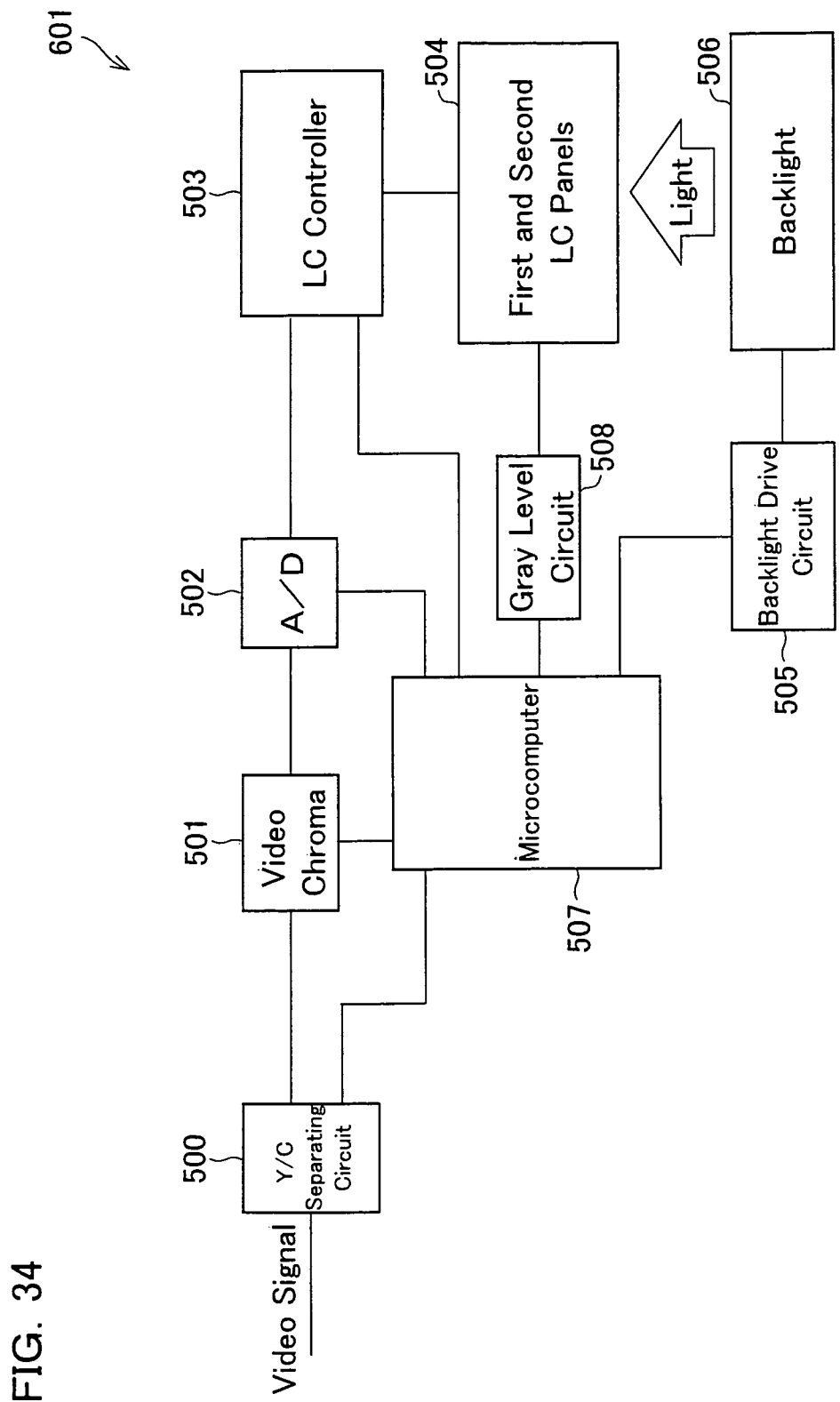
FIG. 34 is a schematic block diagram of a television receiver incorporating the liquid crystal display of the present invention.
Figure 35:
FIG. 35 is a block diagram illustrating a relationship between a tuner section and a liquid crystal display in the television receiver shown in FIG. 34.
Figure 36:
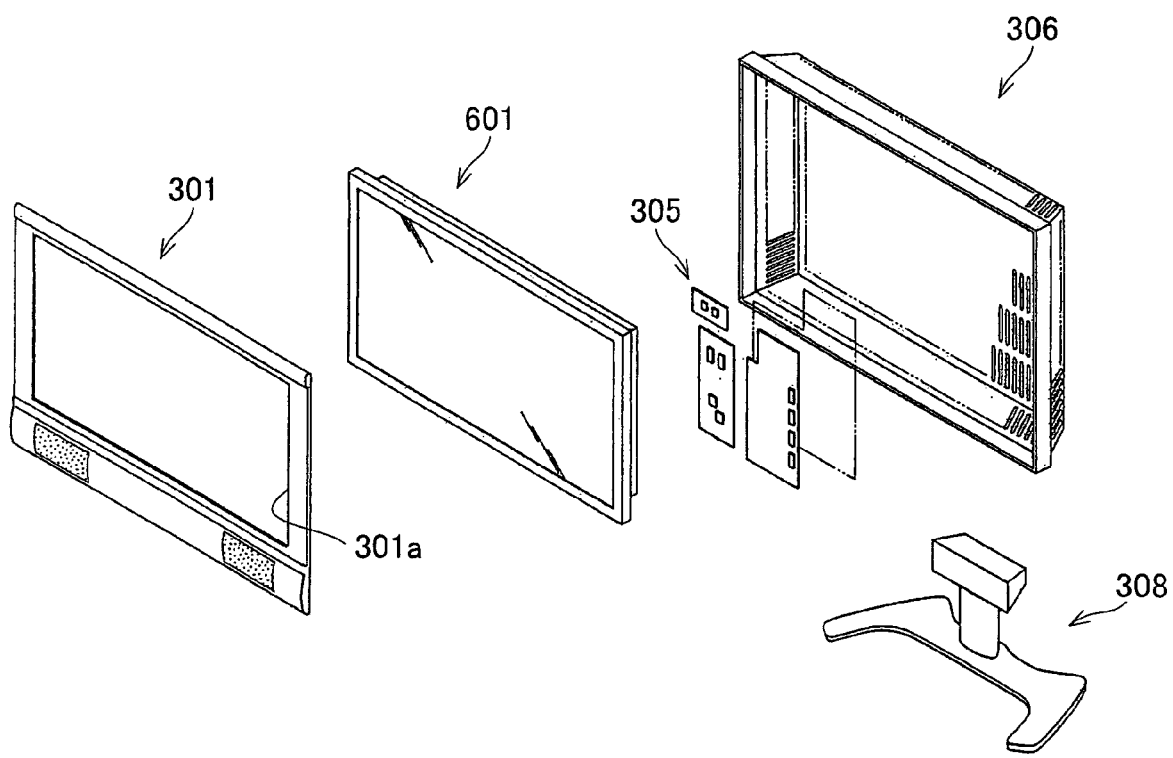
FIG. 36 is an exploded perspective view of the television receiver shown in FIG. 34.

Referring to FIGS. 34 to 36, the following will describe an application of the liquid crystal display of the present invention to a television receiver.

FIG. 34 shows circuit blocks of a liquid crystal display 601 for the television receiver.

The liquid crystal display 601 includes, as shown in FIG. 34, a Y/C separating circuit 500, a video chroma circuit 501, an A/D converter 502, a liquid crystal controller 503, liquid crystal panels 504, a backlight drive circuit 505, a backlight 506, a microcomputer 507, and a gray level circuit 508.

The liquid crystal panels 504 has a double panel structure including a first liquid crystal panel and a second liquid crystal panel. The panels may be of any of the structures described in the foregoing embodiments.

In the liquid crystal display 601 arranged as above, first, an input video signal (television signal) is supplied to the Y/C separating circuit 500 where the signal is separated into a luminance signal and a color signal. The luminance and color signals are converted to R, G, B, or the three primary colors of light, in the video chroma circuit 501. Furthermore, the analog RGB signals are converted to digital RGB signals by the A/D converter 502 for output to the liquid crystal controller 503.

The liquid crystal panels 504 is fed with the RGB signals from the liquid crystal controller 503 at predetermined timings and also with RGB gray level voltages from the gray level circuit 508. From these signals, the panels 504 output images. The control of the whole system, including the foregoing processes, is performed by the microcomputer 507.

Various video signals may be used for display, including a video signal based on television broadcast, a video signal representing images captured on a camera, or a video signal fed over the Internet.

Furthermore, in FIG. 35, a tuner section 600 receives television broadcast and outputs a video signal. A liquid crystal display 601 displays images (video) based on the video signal supplied from the tuner section 600.

If the liquid crystal display arranged as above is a television receiver, for example, the display is structured so that the liquid crystal display 601 is sandwiched by and enclosed in a first housing 301 and a second housing 306 as shown in FIG. 36.

An opening 301a is formed through the first housing 301. The video display produced on the liquid crystal display 601 is visible through the opening 301a.

The second housing 306 provides a cover for the back of the liquid crystal display 601. The housing 306 is provided with an operation circuit 305 for operation of the liquid crystal display 601. The housing 306 has a support member 308 attached to the bottom.

Applying, as described in the foregoing, the liquid crystal display of the present invention to a monitor for the television receiver arranged as above enables the output of high contrast, super high quality video free from saturation reduction.

The present invention is not limited to the description of the embodiments above, but may be altered by a skilled person within the scope of the claims. An embodiment based on a proper combination of technical means disclosed in different embodiments is encompassed in the technical scope of the present invention.

Industrial Applicability

The liquid crystal display of the present invention delivers greatly improved contrast and is therefore suitably applicable, for example, to television receivers and broadcast monitors.

The invention claimed is:

1. A method of driving a liquid crystal display including two or more stacked liquid crystal panels and polarized light absorbing layers provided to form crossed Nicols across the liquid crystal panels, the first liquid crystal panel of the stack liquid crystal panel is a color liquid crystal panel, and at least one of the other liquid crystal panels is a black and white liquid crystal panel and the stacked liquid crystal panels, wherein the liquid crystal panel outputting individual images according to a video source, wherein if a γ value of an image data output of the liquid crystal display, $\gamma_1$, equals G(x), where x is a gray level, $\gamma_1$ for an image data output of a first liquid crystal panel equals G1(x), where the first liquid crystal panel is one of the stacked liquid crystal panels which is disposed closer to a front of said display than the other liquid crystal panels, and $\gamma_2$ for image data outputs of the other liquid crystal panels equals G2(x), then γout=G(x) at least one gray level X satisfy:

$$G(x)=G1(X)+G2(X) \text{ and } G1(X)>G2(X);$$

wherein the liquid crystal panel outputs image data with smoothing, the smoothing including obtaining a maximum gray level in an M×N dot region, where M and N are natural numbers, substituting an obtained gray level for a gray level of a central one of the M×N dots, and smoothing the gray level of the central dot, N and M are set so that a ratio of a distance Dn in an N direction and a distance Dm in an M direction is substantially 1; and an average Dave of Dn and Dn is $$Dave \geq Dgap \times \tan(\mathrm{Sin}{-}1(1/n) \times \mathrm{Sin}(90°)),$$

Dgap is a distance between a liquid crystal layer in the color liquid crystal panel and a liquid crystal layer in the black and white liquid crystal panel, and n is an average refractive index of materials disposed between the two liquid crystal layers.

2. The method of claim 1, wherein a gray level for a dot of the black and white liquid crystal panel corresponds to a signal representing a maximum gray level derived from dot signals for a pixel in the video source.

3. The method of claim 1, wherein the average refractive index N=1.3.

4. The method of claim 1, wherein $D_{ave} \leq 2.2$ mm.

5. The method of claim 1, wherein $G_1(X_2) < G_2(X_2)$ near a black gray level $X_2$.

6. The method of claim 1, wherein a value of $\gamma_1$ for an image data output of the color liquid crystal panel is $G_1(x) > 0$ (not equal to 0) at all gray levels.

7. The method of claim 1, wherein $G_1(X) \geq 1.8$ at a gray level X.

8. A method of driving a liquid crystal display
including two or more stacked liquid crystal panels and polarized light absorbing layers provided to form crossed Nicols across the liquid crystal panels, the liquid crystal panels outputting individual images according to a video source, said method comprising: implementing luminance extension on a first liquid crystal panel, the first liquid crystal panel being one of the stacked liquid crystal panels which is disposed closer to a front of said display than are the other liquid crystal panels, wherein a first display signal for the first liquid crystal panel and a second display signal for a second liquid crystal panel of the stacked liquid crystal panels have different spatial;
- a maximum gray level in an M×N dot region (M and N are natural numbers), substituting the obtained gray level for a gray level of a central one of the M×N dots, and smoothing the gray level of the central,
Wherein N and M are set so that a ratio of a distance Dn in an N direction and a distance Dm in an M direction is substantially 1; and
an average Dave of Dn and Dn is $$Dave \geq Dgap \times \tan(\mathrm{Sin}{-}1(1/n) \times \mathrm{Sin}(90°)),$$

Dgap is a distance between a liquid crystal layer in the color liquid crystal panel and a liquid crystal layer in the black and white liquid crystal panel, and n is an average refractive index of materials disposed between the two liquid crystal layers.

\* \* \* \* \*